(12) United States Patent
Torrico et al.

(10) Patent No.: US 12,744,606 B2
(45) Date of Patent: Sep. 22, 2026

(54) METHODS AND APPARATUS FOR DETERMINING AND/OR USING PROPAGATION LOSS BETWEEN A TRANSMITTER AND A RECEIVER BASED ON TERRAIN AND CLUTTER DATA

(71) Applicant: Charter Communications Operating, LLC, St. Louis, MO (US)

(72) Inventors: Saúl A. Torrico, Bethesda, MD (US); Rauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 226 days.

(21) Appl. No.: 18/785,503

(22) Filed: Jul. 26, 2024

(65) Prior Publication Data

US 2026/0031920 A1 Jan. 29, 2026

(51) Int. Cl.
*H04B 17/309* (2015.01)
*H04B 17/391* (2015.01)
*H04W 16/18* (2009.01)

(52) U.S. Cl.
CPC ......... *H04B 17/347* (2023.05); *H04B 17/391* (2015.01); *H04W 16/18* (2013.01)

(58) Field of Classification Search
CPC .... H04B 17/30; H04B 17/309; H04B 17/347; H04B 17/391; H04W 16/18
See application file for complete search history.

(56) References Cited

U.S. PATENT DOCUMENTS

2003/0146871 A1* 8/2003 Karr ...................... G01S 5/0009 342/465
2009/0319236 A1* 12/2009 Blaunshtein .......... H04W 16/22 455/446
2017/0338901 A1* 11/2017 Zhihua .............. H04B 17/3912
(Continued)

OTHER PUBLICATIONS

George Hufford, The ITS Irregular Terrain Model, version 1.2.2 The Algorithm, National Telecommunications and Information Administration (NTIA) of the United States Department of Commerce, Jan. 1999, downloaded from http://its.ntia.gov/software/itm, 18 pages.
(Continued)

*Primary Examiner* — Jeong S Park
(74) *Attorney, Agent, or Firm* — Straub & Straub; Stephen T. Straub; Michael P. Straub

(57) ABSTRACT

The present invention relates to methods and apparatus for determining propagation loss between a transmitter and a receiver using terrain and clutter data and/or the utilization of the determined propagation loss for managing spectrum usage. An exemplary method includes the steps of: determining a free space loss (FSL) for a propagation path extending from a first endpoint to a second endpoint, determining a clutter loss for a first portion of the propagation path, the first portion of the propagation path extending from the first endpoint to a horizon point which is located atop of clutter, determining a diffraction or tropo-scattering loss for a second portion of the propagation path extending from the horizon point to the second endpoint; generating a total loss for the propagation path based on the FSL, the clutter loss, and the diffraction or tropo-scattering loss; and making a spectrum usage decision based on the total loss.

24 Claims, 16 Drawing Sheets

(56) References Cited

U.S. PATENT DOCUMENTS

| | | | | |
|---|---|---|---|---|
| 2021/0195429 | A1 * | 6/2021 | Macmullan | H04W 72/0453 |
| 2021/0389474 | A1 * | 12/2021 | Hamzeh | G01S 19/21 |
| 2023/0231639 | A1 * | 7/2023 | Khalid | H04B 17/253 455/446 |
| 2024/0291577 | A1 * | 8/2024 | Lee | H04B 17/347 |

OTHER PUBLICATIONS

George A. Hufford, Dr. George Hufford's 1985 Memo describing the changes to ITM version 1.2.1 (dated Apr. 1979) in ITM version 1.2.2 (dated Sep. 1984), National Telecommunications and Information Administration (NTIA) of the United States Department of Commerce, Jan. 30, 1985, downloaded from http://its.ntia.gov/software/itm, 4 pages.

The "definitive" representation of the ITS Irregular Terrain Model, National Telecommunications and Information Administration (NTIA) of the United States Department of Commerce, Aug. 5, 2002, downloaded from http://its.ntia.gov/software/itm, 33 pages.

The International Telecommunication Union Recommendation ITU-R P.2108-1, Prediction of clutter loss, P Series Radiowave propagation, International Telecommunication Union, Sep. 2021, 10 pages.

The International Telecommunication Union Recommendation ITU-R P.452-18, P Series: Radiowave propagation, Prediction procedure for the evaluation of interference between stations on the surface of the Earth at frequencies above about 100 MHz, Aug. 2023, 55 pages.

Hafeez et al., Optimizing Frequency Spectrum Assignment Based on High-Fidelity Obstruction Heights, U.S. Appl. No. 18/415,214, filed Jan. 17, 2024, 35 pages.

Longley et al., Essa Technical Report ERL 79-ITS 67 Prediction of Tropospheric Radio Transmission Loss Over Irregular Terrain A Computer Method—1968, Institute for Telecommunication Sciences, Boulder Colorado, US, published Jul. 1968 with Comments and errata published Apr. 1970, 145 pages.

* cited by examiner

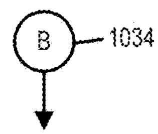

DETERMINE, BY THE COMPUTING SYSTEM, A SECOND HORIZON POINT ON THE FIRST RADIO FREQUENCY PROPAGATION PATH FROM THE FIRST ENDPOINT TO THE SECOND ENDPOINT, SAID SECOND HORIZON POINT BEING LOCATED AT THE TOP OF A CLUTTER OBJECT ALONG THE FIRST RADIO FREQUENCY PROPAGATION PATH AND BEING DETERMINED FROM THE PERSPECTIVE OF THE SECOND ENDPOINT LINE OF SIGHT TO THE HORIZON LOOKING ALONG THE FIRST RADIO FREQUENCY PROPAGATION PATH TOWARD THE FIRST ENDPOINT, SAID SECOND HORIZON POINT HAVING A SECOND HORIZON POINT HEIGHT WITH RESPECT TO THE REFERENCE POINT (E.G., SEA LEVEL), SAID SECOND HORIZON POINT HEIGHT BEING HIGHER THAN SAID SECOND ENDPOINT HEIGHT

1040

DETERMINE, BY THE COMPUTING SYSTEM, A SECOND RADIO FREQUENCY CLUTTER LOSS FOR THE PORTION OF THE FIRST RADIO FREQUENCY PROPAGATION PATH EXTENDING FROM THE SECOND HORIZON POINT TO THE SECOND ENDPOINT

1042

DETERMINE, BY THE COMPUTING SYSTEM, THE SECOND RADIO FREQUENCY CLUTTER LOSS FOR THE PORTION OF THE FIRST RADIO FREQUENCY PROPAGATION PATH FROM THE SECOND HORIZON POINT TO THE SECOND ENDPOINT USING ONE OF THE CLUTTER LOSS MODELS IN ITU-R P.2108 OR ITU-R P.452

1044

DETERMINE, BY THE COMPUTING SYSTEM, A THIRD RADIO FREQUENCY PROPAGATION LOSS, SAID THIRD RADIO FREQUENCY PROPAGATION LOSS BEING FOR THE PORTION OF THE FIRST RADIO FREQUENCY PROPAGATION PATH EXTENDING FROM THE FIRST HORIZON POINT TO THE SECOND HORIZON POINT, SAID THIRD RADIO FREQUENCY PROPAGATION LOSS INCLUDING: (i) A DIFFRACTION LOSS OR (ii) A TROPO-SCATTERING LOSS FOR THE PORTION OF THE FIRST RADIO FREQUENCY PROPAGATION PATH EXTENDING FROM THE FIRST HORIZON POINT TO THE SECOND HORIZON POINT

1046

DETERMINE, BY THE COMPUTING SYSTEM, THE THIRD RADIO FREQUENCY PROPAGATION LOSS USING AN ITM OR LONGLEY-RICE MODEL, TERRAIN HEIGHT INFORMATION AND CLUTTER HEIGHT INFORMATION FOR POINTS ALONG THE PORTION OF THE FIRST RADIO FREQUENCY PROPAGATION PATH EXTENDING FROM THE FIRST HORIZON POINT TO THE SECOND HORIZON POINT

1048

GENERATING, BY THE COMPUTING SYSTEM, A TOTAL RADIO FREQUENCY PROPAGATION LOSS FOR THE FIRST RADIO FREQUENCY PROPAGATION PATH BASED ON THE RADIO FREQUENCY FREE SPACE LOSS, THE FIRST RADIO FREQUENCY CLUTTER LOSS, THE SECOND RADIO FREQUENCY CLUTTER LOSS, AND THE THIRD RADIO FREQUENCY PROPAGATION LOSS

1050

DETERMINE THE TOTAL RADIO FREQUENCY PROPAGATION LOSS FOR THE FIRST RADIO FREQUENCY PROPAGATION PATH BY ADDING THE FREE SPACE LOSS, THE FIRST CLUTTER LOSS, THE SECOND CLUTTER LOSS, AND THE THIRD RADIO FREQUENCY PROPAGATION LOSS

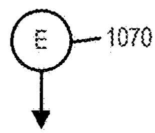

DETERMINE, BY THE COMPUTING SYSTEM, A SECOND HORIZON POINT ON THE FIRST RADIO FREQUENCY PROPAGATION PATH FROM THE FIRST ENDPOINT TO THE SECOND ENDPOINT, SAID SECOND HORIZON POINT BEING LOCATED AT THE TOP OF A CLUTTER OBJECT ALONG THE FIRST RADIO FREQUENCY PROPAGATION PATH AND BEING DETERMINED FROM THE PERSPECTIVE OF THE SECOND ENDPOINT LINE OF SIGHT TO THE HORIZON LOOKING ALONG THE FIRST RADIO FREQUENCY PROPAGATION PATH TOWARD THE FIRST ENDPOINT, SAID SECOND HORIZON POINT HAVING A SECOND HORIZON POINT HEIGHT WITH RESPECT TO THE REFERENCE POINT (E.G., SEA LEVEL), SAID SECOND HORIZON POINT HEIGHT BEING HIGHER THAN SAID SECOND ENDPOINT HEIGHT

1074

DETERMINE, BY THE COMPUTING SYSTEM, A SECOND RADIO FREQUENCY CLUTTER LOSS FOR THE PORTION OF THE FIRST RADIO FREQUENCY PROPAGATION PATH EXTENDING FROM THE SECOND HORIZON POINT TO THE SECOND ENDPOINT

1076

DETERMINE, BY THE COMPUTING SYSTEM, THE SECOND RADIO FREQUENCY CLUTTER LOSS FOR THE PORTION OF THE FIRST RADIO FREQUENCY PROPAGATION PATH FROM THE SECOND HORIZON POINT TO THE SECOND ENDPOINT USING ONE OF THE CLUTTER LOSS MODELS IN ITU-R P.2108 OR ITU-R P.452

1078

DETERMINE, BY THE COMPUTING SYSTEM, A THIRD RADIO FREQUENCY PROPAGATION LOSS, SAID THIRD RADIO FREQUENCY PROPAGATION LOSS BEING FOR THE PORTION OF THE FIRST RADIO FREQUENCY PROPAGATION PATH EXTENDING FROM THE FIRST ENDPOINT TO THE SECOND HORIZON POINT, SAID THIRD RADIO FREQUENCY PROPAGATION LOSS INCLUDING: (i) A DIFFRACTION LOSS OR (ii) A TROPO-SCATTERING LOSS FOR THE PORTION OF THE FIRST RADIO FREQUENCY PROPAGATION PATH EXTENDING FROM THE FIRST ENDPOINT TO THE SECOND HORIZON POINT

1080

DETERMINE, BY THE COMPUTING SYSTEM, THE THIRD RADIO FREQUENCY PROPAGATION LOSS USING AN ITM OR LONGLEY-RICE MODEL, TERRAIN HEIGHT INFORMATION AND CLUTTER HEIGHT INFORMATION FOR POINTS ALONG THE PORTION OF THE FIRST RADIO FREQUENCY PROPAGATION PATH EXTENDING FROM THE FIRST ENDPOINT TO THE SECOND HORIZON POINT

1082

GENERATING, BY THE COMPUTING SYSTEM, A TOTAL RADIO FREQUENCY PROPAGATION LOSS FOR THE FIRST RADIO FREQUENCY PROPAGATION PATH BASED ON THE RADIO FREQUENCY FREE SPACE LOSS, THE SECOND RADIO FREQUENCY CLUTTER LOSS, AND THE THIRD RADIO FREQUENCY PROPAGATION LOSS

1084

DETERMINE THE TOTAL RADIO FREQUENCY PROPAGATION LOSS FOR THE FIRST RADIO FREQUENCY PROPAGATION PATH BY ADDING THE FREE SPACE LOSS, THE SECOND CLUTTER LOSS, AND THE THIRD RADIO FREQUENCY PROPAGATION LOSS

Figure 10F:
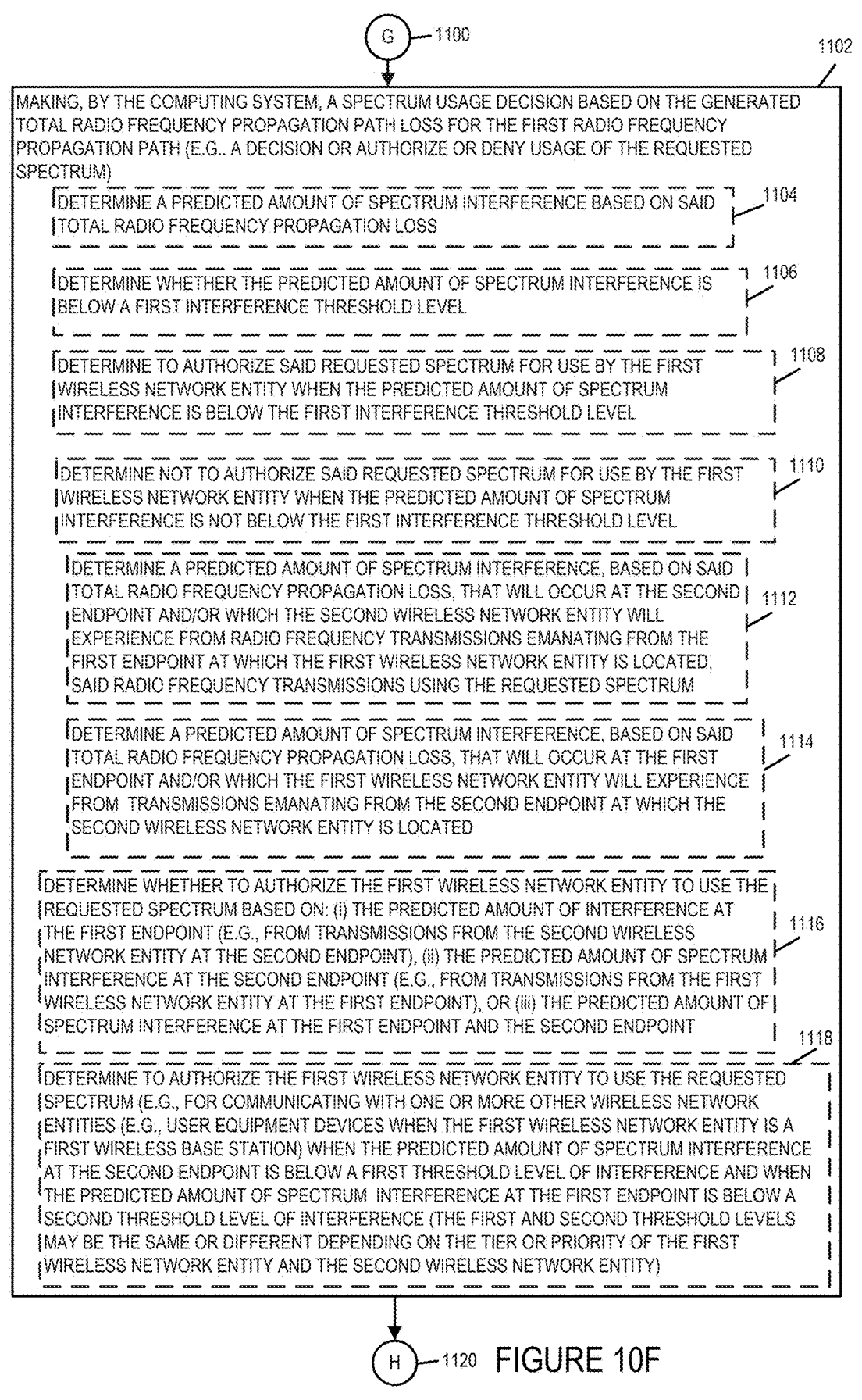

MAKING, BY THE COMPUTING SYSTEM, A SPECTRUM USAGE DECISION BASED ON THE GENERATED TOTAL RADIO FREQUENCY PROPAGATION PATH LOSS FOR THE FIRST RADIO FREQUENCY PROPAGATION PATH (E.G.. A DECISION OR AUTHORIZE OR DENY USAGE OF THE REQUESTED SPECTRUM)

1104: DETERMINE A PREDICTED AMOUNT OF SPECTRUM INTERFERENCE BASED ON SAID TOTAL RADIO FREQUENCY PROPAGATION LOSS

1106: DETERMINE WHETHER THE PREDICTED AMOUNT OF SPECTRUM INTERFERENCE IS BELOW A FIRST INTERFERENCE THRESHOLD LEVEL

1108: DETERMINE TO AUTHORIZE SAID REQUESTED SPECTRUM FOR USE BY THE FIRST WIRELESS NETWORK ENTITY WHEN THE PREDICTED AMOUNT OF SPECTRUM INTERFERENCE IS BELOW THE FIRST INTERFERENCE THRESHOLD LEVEL

1110: DETERMINE NOT TO AUTHORIZE SAID REQUESTED SPECTRUM FOR USE BY THE FIRST WIRELESS NETWORK ENTITY WHEN THE PREDICTED AMOUNT OF SPECTRUM INTERFERENCE IS NOT BELOW THE FIRST INTERFERENCE THRESHOLD LEVEL

1112: DETERMINE A PREDICTED AMOUNT OF SPECTRUM INTERFERENCE, BASED ON SAID TOTAL RADIO FREQUENCY PROPAGATION LOSS, THAT WILL OCCUR AT THE SECOND ENDPOINT AND/OR WHICH THE SECOND WIRELESS NETWORK ENTITY WILL EXPERIENCE FROM RADIO FREQUENCY TRANSMISSIONS EMANATING FROM THE FIRST ENDPOINT AT WHICH THE FIRST WIRELESS NETWORK ENTITY IS LOCATED, SAID RADIO FREQUENCY TRANSMISSIONS USING THE REQUESTED SPECTRUM

1114: DETERMINE A PREDICTED AMOUNT OF SPECTRUM INTERFERENCE, BASED ON SAID TOTAL RADIO FREQUENCY PROPAGATION LOSS, THAT WILL OCCUR AT THE FIRST ENDPOINT AND/OR WHICH THE FIRST WIRELESS NETWORK ENTITY WILL EXPERIENCE FROM TRANSMISSIONS EMANATING FROM THE SECOND ENDPOINT AT WHICH THE SECOND WIRELESS NETWORK ENTITY IS LOCATED

1116: DETERMINE WHETHER TO AUTHORIZE THE FIRST WIRELESS NETWORK ENTITY TO USE THE REQUESTED SPECTRUM BASED ON: (i) THE PREDICTED AMOUNT OF INTERFERENCE AT THE FIRST ENDPOINT (E.G., FROM TRANSMISSIONS FROM THE SECOND WIRELESS NETWORK ENTITY AT THE SECOND ENDPOINT), (ii) THE PREDICTED AMOUNT OF SPECTRUM INTERFERENCE AT THE SECOND ENDPOINT (E.G., FROM TRANSMISSIONS FROM THE FIRST WIRELESS NETWORK ENTITY AT THE FIRST ENDPOINT), OR (iii) THE PREDICTED AMOUNT OF SPECTRUM INTERFERENCE AT THE FIRST ENDPOINT AND THE SECOND ENDPOINT 1118: DETERMINE TO AUTHORIZE THE FIRST WIRELESS NETWORK ENTITY TO USE THE REQUESTED SPECTRUM (E.G., FOR COMMUNICATING WITH ONE OR MORE OTHER WIRELESS NETWORK ENTITIES (E.G., USER EQUIPMENT DEVICES WHEN THE FIRST WIRELESS NETWORK ENTITY IS A FIRST WIRELESS BASE STATION) WHEN THE PREDICTED AMOUNT OF SPECTRUM INTERFERENCE AT THE SECOND ENDPOINT IS BELOW A FIRST THRESHOLD LEVEL OF INTERFERENCE AND WHEN THE PREDICTED AMOUNT OF SPECTRUM INTERFERENCE AT THE FIRST ENDPOINT IS BELOW A SECOND THRESHOLD LEVEL OF INTERFERENCE (THE FIRST AND SECOND THRESHOLD LEVELS MAY BE THE SAME OR DIFFERENT DEPENDING ON THE TIER OR PRIORITY OF THE FIRST WIRELESS NETWORK ENTITY AND THE SECOND WIRELESS NETWORK ENTITY)

METHODS AND APPARATUS FOR DETERMINING AND/OR USING PROPAGATION LOSS BETWEEN A TRANSMITTER AND A RECEIVER BASED ON TERRAIN AND CLUTTER DATA

FIELD OF INVENTION

The present invention relates to methods and apparatus for determining propagation loss between a transmitter and a receiver using terrain and clutter data. The present invention further relates to methods and apparatus which utilize propagation loss between a transmitter and a receiver determined based on terrain and clutter data for managing spectrum allocation and/or usage in a wireless system, e.g., a shared spectrum wireless system.

BACKGROUND OF THE INVENTION

Some wireless networks, or particular regions of wireless spectrum, have introduced tiered access in which some entities have higher access priority than others. Various wireless systems share spectrum among tiers of users. Radio frequency propagation path loss models have been used for spectrum sharing among tiers of users in bands such as for example, the 3.5 GHz spectrum frequency band used for Citizens Broadband Radio Service (CBRS) and 6 GHz spectrum frequency band which in some instances is used for Wi-Fi. In CBRS systems the tiers of users include incumbent users, licensed users, and unlicensed users.

Path losses allow a spectrum access controller to determine if two users (in the same tier or different tiers) can use the same frequency in a geographic location given their transmission characteristics and the terrain profile between them. Over short distances (less than 5 kilometers), WINNER and Extended Hata (eHata) propagation path loss models are used to predict Radio Frequency (RF) path losses in a statistical manner in generic topologies, such as for example urban, suburban, and rural topologies. Over long distances (e.g., distances greater than 5 kilometers), the Irregular Terrain Model (ITM) also referred to as the Longley-Rice model and Terrain Integrated Rough Earth Model (TIREM) models are used to predict Radio Frequency path losses in a statistical manner using terrain heights. The problem with the aforementioned models is that these models only account for terrain heights along the path, they do not model clutter heights. Clutter being objects such as for example buildings and vegetation along the propagation path atop the terrain. Clutter heights in these models are only accounted for at the transmitter and/or receiver end to determine clutter losses in addition to path losses determined using terrain only. Furthermore, the ITM propagation model equations used to compute the diffraction or Tropo-scattering Losses are not designed for large scattering angles (i.e., angles larger than one degree) which result from large height differences between two neighboring sampled points along the profile especially for a transmitter and/or receiver embedded in the clutter.

From the foregoing, it should be understood that there is a need for new and/or improved methods and apparatus for determining propagation loss between a transmitter and a receiver based on terrain and clutter data. From the foregoing, it should be understood that there is a need for new and/or improved methods of determining Radio Frequency propagation loss between a transmitter and receiver when the transmitter and/or receiver is located below clutter. From the foregoing, it should be understood that there is a need for new and/or improved methods and apparatus for efficiently and effectively determining and managing the allocation and usage of spectrum (e.g., spectrum shared among tiers of users) in wireless systems based on the location of transmitters and receivers and terrain and clutter. There is a need for a solution to how to effectively and efficiently solve the technical problem of determining diffraction or Tropo-scattering Losses for large scattering angles which result from large height differences between two neighboring sampled points along the path profile of a radio frequency transmission between a transmitter and a receiver. This is particularly a problem when the transmitter and/or the receiver is embedded in the clutter. There is a further need for new and/or improved methods and/or apparatus for accounting for clutter heights in ITM propagation models used for determining spectrum sharing among users in wireless systems, e.g., CBRS systems. There is a further need for new and/or improved methods and apparatus for allocating spectrum usage among wireless devices (e.g., base stations, wireless access points, etc.) to increase spectral efficiency in shared spectrum wireless systems such as for example CBRS systems.

SUMMARY OF THE INVENTION

Various embodiments of the present invention provide new and/or improved methods and apparatus for determining the radio frequency propagation loss between a transmitter and a receiver assuming that the transmitter and/or receiver is located below the clutter and/or is embedded in the clutter. Clutter includes objects, such as for example, vegetation, buildings, towers, or other man-made structures, which are located on top of the terrain of a geographic area. Various embodiments of the present invention further provide new and/or improved methods and apparatus for using this determined radio frequency propagation loss in managing the assignment/allocation and/or usage of shared spectrum among users of a wireless network. For example, by determining a predicted degree, amount, or level of spectrum interference at a point where a receiver is located from radio frequency transmission of a point at which a transmitter is located. Various embodiments provide new and/or improved methods and apparatus for more accurately determining propagation loss between two endpoints and predicting spectrum interference using terrain and clutter information. Various embodiments provide new and/or improved methods and apparatus for allocating spectrum usage among wireless devices (e.g., base stations, wireless access points, etc.) to increase spectral efficiency in shared spectrum wireless systems such as for example CBRS systems. Various embodiments of the present invention solve one or more of the problems discussed above.

The present invention relates to methods and apparatus for determining wireless base station configuration parameters. An exemplary method includes the steps of: determining a radio frequency free space path loss for a first radio frequency propagation path extending from a first endpoint to a second endpoint, said first endpoint having a first endpoint height with respect to a reference point; determining a radio frequency clutter loss for a first portion of the first radio frequency propagation path, said first portion of the first radio frequency propagation path extending from the first endpoint to a first horizon point, the first horizon point being located at the top of a clutter object along the first radio frequency propagation path, said first horizon point having a first horizon point height with respect to the reference point, said first horizon point height being higher than said first endpoint height; determining a third radio frequency propagation loss for a second portion of the first radio frequency propagation path, said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint; generating a total radio frequency propagation path loss for the first radio frequency propagation path based on the radio frequency free space path loss, the radio frequency clutter loss, and the third radio frequency propagation loss; and making a spectrum usage decision based on the generated total radio frequency propagation path loss for the first radio frequency propagation path. These steps may be performed by one or more entities, for example in some embodiment a computing system performs all of the steps. In some embodiments a propagation loss entity (e.g., device, node or system) performs the propagation determination steps of the exemplary method while a Spectrum Access System performs the spectrum usage decision step.

In some embodiments, the step of determining a radio frequency clutter loss for a first portion of the first radio frequency propagation path uses and/or is based on at least one of the models included in the ITU-R P.2108 or the ITU-R P.452. In some embodiments, the step of determining a radio frequency clutter loss for a first portion of the first radio frequency propagation path uses and/or is based on one or more or all of the models included in the ITU-R P.2108 and/or the ITU-R P.452.

In various embodiments, the steps of the method are applied in response to the computing system determining that the first horizon point and the second endpoint are separated by a distance greater than or equal to 5 kilometers. In various embodiments the third radio frequency propagation loss is determined using and/or based an Irregular Terrain Model or Longley-Rice propagation loss model.

In some embodiments, a first wireless network entity (e.g., a first wireless base station) is located at the first endpoint, said first endpoint height being the height of an antenna of the first wireless network entity; and a second wireless network entity (e.g., a second wireless base station) is located at the second endpoint, said second endpoint height being the height of an antenna of the second wireless network entity.

In some embodiments, the step of making a spectrum usage decision based on the generated total radio frequency propagation path loss for the first radio frequency propagation path includes: determining a predicted amount of spectrum interference for a range of spectrum frequencies that will occur at the second endpoint from radio frequency transmissions emanating from the first endpoint based on the total radio frequency propagation path loss; and determining whether or not a wireless network entity located at the first endpoint is authorized to communicate using the range of spectrum frequencies based on the predicted amount of spectrum interference. In some such embodiments, the step of making a spectrum usage decision based on the generated total radio frequency propagation path loss for the first radio frequency propagation path further includes: determining that the wireless network entity located at the first endpoint is authorized to communicate using the range of spectrum frequencies based on the predicted amount of spectrum interference in response to determining that the predicted amount of spectrum interference is below a spectrum interference threshold level. In some further embodiments, the step of making a spectrum usage decision based on the generated total radio frequency propagation path loss for the first radio frequency propagation path further includes: determining that the wireless network entity located at the first endpoint is not authorized to communicate using the range of spectrum frequencies based on the predicted amount of spectrum interference in response to determining that the predicted amount of spectrum interference is not below a spectrum interference threshold level.

In some embodiments, the step of making a spectrum usage decision based on the generated total radio frequency propagation path loss for the first radio frequency propagation path includes: determining that the first wireless network entity is authorized to utilize spectrum to communicate with a third wireless network entity (e.g., a user equipment device such as a smartphone) in response to determining that a predicted amount of spectrum interference that will occur at the second endpoint from radio frequency transmissions emanating from the first endpoint is below a first threshold level of interference.

In some embodiments, the step of determining a third radio frequency propagation loss for a second portion of the first radio frequency propagation path includes utilizing terrain information (e.g., terrain height information) and clutter information (e.g., clutter height information) for one or more additional points along the second portion of the first radio frequency propagation path. In some embodiments, the one or more additional points along the second portion of the first radio frequency propagation path includes a plurality of additional points (e.g., spaced approximately the same distance apart (e.g., every 30 meters) along the first radio frequency propagation path); wherein the terrain information includes terrain height information with respect to the reference point (e.g., sea level) for points (e.g., the additional points) on the first radio frequency propagation path; wherein the clutter information includes clutter height information with respect to the terrain on which the clutter is located for points on the first radio frequency propagation path (e.g., for the one or more of additional points along the second portion of the first radio frequency propagation path having clutter).

In some embodiments, the one or more additional points along the second portion of the first radio frequency propagation path includes a plurality of additional points (e.g., spaced approximately the same distance apart (e.g., every 30 meters) along the first radio frequency propagation path; and wherein the terrain information includes terrain height information with respect to the reference point (e.g., sea level) for points on the first radio frequency propagation path; wherein the clutter information includes clutter height information with respect to the terrain on which the clutter is located for points on the first radio frequency propagation path; and wherein the height of a point on the propagation path is determined by adding the clutter height corresponding to the point to the terrain height at the point.

In some embodiments, the method further includes the steps of: determining, by the computing system, from the plurality of additional points along the second portion of the first radio frequency propagation path a set of critical points from the plurality of additional points; and utilizing, by the computing system, point height information for one or more or all of the critical points from the set of critical points to determine the third radio frequency propagation path loss.

In some embodiments, the method further includes the steps of: receiving, by the computing system, a spectrum access request message from a first wireless network entity (e.g., first wireless base station) located at the first endpoint (e.g., antenna of first wireless base station has transmission point at the first endpoint), said spectrum access request message requesting authorization for use of spectrum and providing information identifying the spectrum requested for usage (e.g., spectrum frequency, range of frequencies, channel, band, etc.); generating, by the computing system, the total radio frequency propagation path loss for the first radio frequency propagation path based on the radio frequency free space path loss, the radio frequency clutter loss, and the third radio frequency propagation loss in response to the received spectrum access request message using the information identifying the spectrum requested for usage (e.g., frequency or frequencies of requested spectrum for usage).

In various embodiments, the method is implemented in shared spectrum wireless networks (e.g., CBRS networks). In some embodiments, the computing system which performs the steps of the method is an Spectrum Access System which manages the usage of the shared spectrum.

The present invention is also applicable to and includes apparatus and systems such as for example, apparatus and systems that implement the steps and/or functions of the method embodiments. For example, a system in accordance with one embodiment of the present invention includes: memory; and one or more processors, said one or more processors controlling the system to perform the following operations: determining a radio frequency free space path loss for a first radio frequency propagation path extending from a first endpoint to a second endpoint, said first endpoint having a first endpoint height with respect to a reference point; determining a radio frequency clutter loss for a first portion of the first radio frequency propagation path, said first portion of the first radio frequency propagation path extending from the first endpoint to a first horizon point, the first horizon point being located at the top of a clutter object along the first radio frequency propagation path, said first horizon point having a first horizon point height with respect to the reference point, said first horizon point height being higher than said first endpoint height; determining a third radio frequency propagation loss for a second portion of the first radio frequency propagation path, said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint; generating a total radio frequency propagation path loss for the first radio frequency propagation path based on the radio frequency free space path loss, the radio frequency clutter loss, and the third radio frequency propagation loss; and making a spectrum usage decision based on the generated total radio frequency propagation path loss for the first radio frequency propagation path.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 comprises FIG. 10A, FIG. 10B, FIG. 10C, FIG. 10D, FIG. 10E, FIGS. 10F and 10G.

FIG. 10C is the third part of a flowchart of an exemplary method in accordance with an embodiment of the present invention.

FIG. 10E is the fifth part of a flowchart of an exemplary method in accordance with an embodiment of the present invention.

FIG. 10F is the sixth part of a flowchart of an exemplary method in accordance with an embodiment of the present invention.

DETAILED DESCRIPTION

Figure 1:
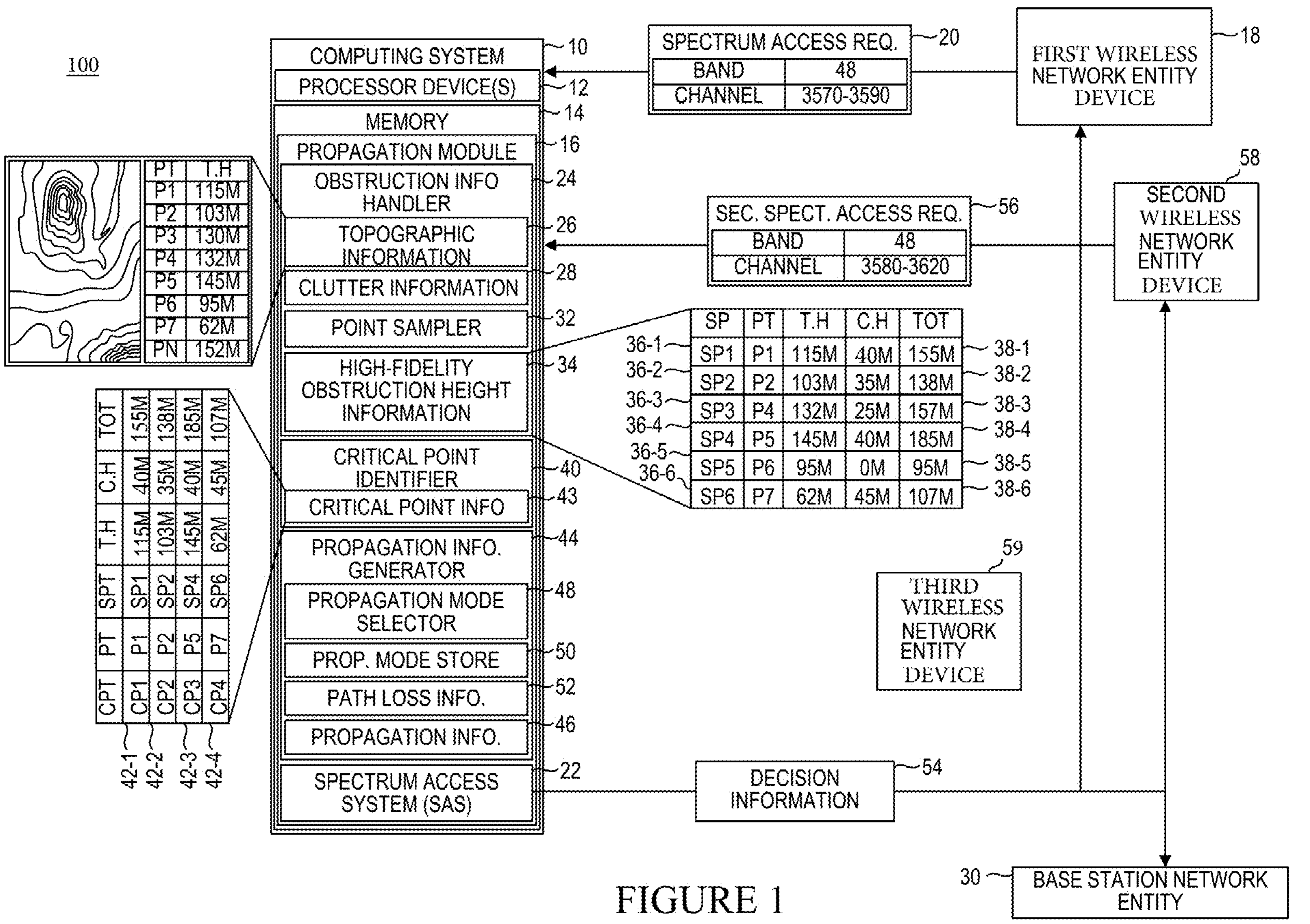
FIG. 1 illustrates an exemplary system in accordance with an embodiment of the present invention.

The examples set forth below represent the information to enable individuals to practice various embodiments of the present invention. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims. As used herein of ordinals in conjunction with an element is solely for distinguishing what might otherwise be similar or identical labels, such as "first loss" and "second loss," and does not imply an initial occurrence, a quantity, a priority, a type, an importance, or other attribute, unless otherwise stated herein.

As previously discussed, some wireless networks, or particular regions of wireless spectrum, have introduced tiered access frameworks in which some entities have higher access priority than others. For example, the Citizens Broadband Radio Service (CBRS) refers to a shared region of wireless spectrum that allows different entities to utilize the same frequency bands dynamically. The Federal Communications Commission (FCC), which manages aspects of the CBRS, has introduced multiple tiers of access for the CBRS (e.g., incumbent entities, Priority Access License (PAL) holding entities, General Authorized Access (GAA) entities). Management of access to such wireless networks is often handled by a managing entity, such as a Spectrum Access System (SAS). To follow the previous example, in CBRS incumbent entities include federal entities including the U.S. Navy which have radar systems which use the CBRS 3.5 GHz band for radar. The Priority Access tier consists of Priority Access Licenses (PALs) users that are licensed use of a portion of the CBRS spectrum within a geographic area. The General Authorized Access (GAA) tier is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. Incumbent entities/users have the highest priority, PAL entities/users have the second highest priority and GAA entities have the lowest priority). In CBRS, the SAS determines the available frequencies at a given geographic location and assign them to wireless base stations referred to as CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs. Through the management of the access to CBSD spectrum and CBSDs power transmission levels in a geographical area the SAS manages the radio interference in the geographical area.

When managing spectrum access in CBRS, the SAS typically incorporate information from an Environmental Sensing Capability (ESC), a sensor network that detects transmissions from Department of Defense radar systems and transmits that information to the SAS. The SAS will then coordinate operations between and among users in the three tiers of authorization in the 3.5 GHz band: Incumbent Access, Priority Access, and General Authorized Access.

In CBRS, the SAS may receive a CBRS access request from an incumbent entity and/or information from an Environmental Sensing Capability system that reports the detection of a transmission from the Department of Defense radar systems, and in response, identify and revoke access grants and/or reduce power transmission levels from the non-incumbent entities likely to cause interference.

Some tiered access networks are capable of assigning multiple network entities to the same part of frequency band (i.e. co-channel or adjacent channel) based on a predicted degree of interference. The predicted degree of interference can be determined by a SAS based on terrain information, which generally includes accurate measurements of terrain height within specific geographic areas. For example, if a SAS receives spectrum access requests for the same frequency band from two network entities located in the same area, the SAS may accept or reject the requests based on a predicted degree, amount or level of interference for each of the entities. This degree, amount or level of interference can be predicted based on path loss. Path loss, in turn, can be predicted at least partially based on the height of terrain located between the network entities. In this manner, the SAS can utilize terrain height information to determine whether to grant spectrum access to a requesting entity and the maximum transmission power level the requesting entity is allowed to utilize so as to minimize interference with other network entities.

More specifically, a SAS can determine a predicted degree of interference for a device requesting or requiring spectrum access based on the height of terrain existing between two entities (e.g., a Navy ship radar and a network base station). If there is relatively high terrain with sufficient blocking to avoid interference between the requesting and receiving entities (e.g., obstructing a line of sight between the entities), the predicted degree of interference is likely to be low. In addition to spectrum access and/or usage decisions, terrain information (e.g., information describing local terrain heights) can be utilized to make a number of organizational and architectural network planning decisions (e.g., such as where to locate base stations to minimize interference between base stations while maximizing wireless network coverage area).

However, conventional terrain information usually fails to account for "clutter" that is located atop the terrain. Clutter can reduce wireless interference via "blocking," which refers to physically obstructing wireless signals before one can interfere with the other. "Clutter" includes any object (e.g., vegetation, billboard, infrastructure, etc.), building, man-made entity, etc. located atop the terrain of a geographic area. In some instances, the differences between terrain height and the combination of terrain and existing clutter height can be substantial. Terrain height or evaluation being the vertical distance from mean sea level to a point or object on the Earth's surface. For example, while the terrain of New York City in some locations is only 2-3 meters above sea level, clutter located atop the terrain of New York City can be over 400 meters in height (e.g., the One World Trade Center, the Empire State Building, etc.).

To summarize, predicted interference can be determined based on terrain information (e.g., terrain elevation or height information) which does not include clutter heights, and clutter can cause substantial blockage of the transmission of wireless signals. As such, decisions made using predicted interference determined based on terrain information are necessarily inaccurate. To mitigate these inaccuracies, some decision making entities (e.g., network service providers and/or their spectrum usage decision making devices/systems) conservatively assume low or no clutter exists in particular geographic regions due to the actual degree of clutter being unknown.

To follow the previous example regarding a CBRS system, assume that two network entities (e.g., two wireless base stations which may, and in some embodiments do, belong to the same or different network wireless operators) are located in a New York City suburb with relatively high clutter (e.g., tall buildings), and that both entities submit spectrum access requests to a SAS. With accurate clutter information, the SAS may predict a degree of interference sufficiently low as to grant both requests. However, without accurate clutter information, the SAS may predict a degree/level/amount of interference based on clutter that is low or non-existent to prevent the two network entities from interfering with each other, so it would not grant both requests. In this manner, a lack of accurate obstruction information (e.g., clutter and terrain information) can impede the SAS (and other network functions) from fully utilizing available frequency spectrum, thus substantially reducing network capacity.

Accordingly, implementations of the present disclosure propose optimizing spectrum assignment and/or maximum power transmission limits based on high-fidelity obstruction heights. More specifically, a computing system (e.g., physical or virtualized device(s), network function(s), etc.) can obtain information for a particular geographic area (e.g., a town, a city, a state, a geographic region, a country, a portion thereof, etc.). The information can include topographic information and clutter information. The topographic information can include terrain height values for a plurality of points within the geographic area. For example, if the terrain for a geographic area included a mountain, the topographic information would indicate a terrain height for a point located at the base of the mountain, the summit of the mountain, and any point in between.

Similarly, the clutter information can include clutter height values for at least some points within the geographic area. More specifically, the clutter information can include clutter height values at some points at which clutter exists. To follow the previous example, assume that a radio tower with a height of 80 m is located atop the summit of the mountain, and that the slopes of the mountain are bare and lack any appreciable clutter (e.g., clutter above a threshold degree of height). The clutter information may indicate a clutter height of 0 m for the slopes and 80 m for the summit. Alternatively, the clutter information may indicate 80 m for the summit, but may lack any indication of clutter height for the slopes (e.g., due to the lack of clutter).

The computing system can determine a plurality of high-fidelity obstruction height values for a plurality of sampled points from the plurality of points. The plurality of sampled points can be sampled within a portion of the geographic area located between two network entities within the geographic area. Each of the high-fidelity obstruction height values can be determined by adding the corresponding terrain height to the corresponding clutter height. For example, assume that two networks' base stations are located within a national park. The plurality of sampled points can be sampled at regular intervals along a line drawn between the two base stations. At each of the sampled points, a terrain height value for the sampled point can be added to a clutter height value for the sampled point to determine a high-fidelity obstruction height for the sampled point.

The computing system can identify critical points from the sampled points based on the high-fidelity obstruction height values, and/or the distance between each of the sampled points and the network entities (e.g., a distance between a first network entity and a sampled point, a distance between a second network entity and a sampled point, etc.). For example, the critical points may be selected from sampled points that are located within (or outside of) a distance from either of the network entity(s) and that have a total height (e.g., terrain height added to clutter height) above a threshold.

Based on the critical points, propagation information can be generated that is indicative of a predicted degree of interference for the two network entities. For example, in some implementations, the computing system can generate a propagation profile that includes a predicted degree of interference for the first network entity (e.g., a first wireless base station or endpoint device). If the predicted degree of interference is less than a threshold degree of interference, the computing system can make a spectrum access decision to grant the spectrum access request provided by the first network entity. In such a fashion, the computing system can more accurately evaluate predicted interference for a network entity, thus enabling the computing system to grant spectrum access requests that it may otherwise reject.

Various embodiments of the present invention provide a number of technical effects and benefits. As one example technical effect and benefit, implementations described herein substantially increase network utilization efficiency and spectrum efficiency. Specifically, conventional systems that mediate access to networks, such as SASs, do so based on interference predictions. Interference predictions are conventionally determined based on information describing terrain heights but not clutter heights. Without clutter height information, interference predictions can be substantially inaccurate, and as such, conventional systems must make conservative spectrum access decisions to account for these inaccuracies. The ability to increase and/or maximize spectral efficiency of shared spectrum is extremely important and objective of not only network operators but also the Federal Communications Commission which licenses and controls the usage of spectrum (e.g., in U.S. locations).

This is often accomplished by assuming a low or no clutter height scenario for a particular geographic region. Based on this "worst-case" scenario, the SAS will often deny a spectrum access request that, with access to accurate clutter information, it would otherwise grant. However, implementations described herein enable generation of propagation profiles which taken into account diffraction or tropo-scattering losses for large scattering angles (e.g., larger than one degree) based on high-fidelity obstruction height values, which synthesizes terrain height information with high-fidelity clutter height information (e.g., Light Detection and Ranging (LIDAR), Radar, mmWave measurements, etc.), thus enabling substantially more accurate propagation profiles and corresponding interference predictions. In turn, the capacity to more accurately predict interference enables SASs to increase spectral efficiency by for example, making less conservative spectrum access decisions, thus substantially increasing network capacity.

The more accurate propagation profiles also allow SASs to more accurately determine power transmission levels (e.g., maximum power transmission levels) to be used by network equipment entities (e.g., wireless base stations) for assigned and/or allocated spectrum in order to minimize interference between network equipment entities (e.g., wireless base stations, user equipment devices, endpoint devices, wireless receiver and/or transmitter devices, wireless sensors, radar system devices, etc.) to be below predetermined threshold interference levels.

FIG. 1 is a block diagram of an environment suitable and/or exemplary system 100 for implementing optimization of frequency spectrum assignment, grant and/or usage based on high-fidelity obstruction heights according to some implementations of the present disclosure. In some implementations, a computing system 10 includes processor device(s) 12 and memory 14. In some implementations, the computing system 10 may be a computing system that includes multiple computing devices.

Alternatively, in some implementations, the computing system 10 may be one or more computing devices within a computing environment that includes multiple distributed devices and/or systems. Similarly, the processor device(s) 12 may include any computing or electronic device capable of executing software instructions to implement the functionality described herein.

The following description refers to network entities. As described herein, a network entity refers to any type or manner of entity that requests access to or has access to a network (e.g., a tiered-access network) or a region of frequency spectrum within a network (e.g., a tiered-access region of frequency spectrum, etc.). For example, a network entity may refer to network service providers (e.g., internet service providers, wireless telephony service providers, geolocation service providers, etc.), governmental organizations (e.g., police, military, first responders, etc.), medical personnel, private organizations, businesses, users (e.g., subscribers to network service providers), etc. The term network entity may also be interchangeably used herein to refer to device(s) used by the above-mentioned entities, such as user devices (e.g., smartphones, laptops, tablets, etc.), network devices (e.g., wireless base stations, access points, network nodes, endpoint devices, routers, modems, Cable Modem Termination Systems (CMTSs), radar systems, etc.), network functions (e.g., SASs), etc. The term wireless network entity device includes any of the aforementioned network entities which include a wireless interface.

The environment and/or exemplary system 100 shown in FIG. 1 illustrates a plurality of network entities including a first wireless network entity device 18 (e.g., a user equipment device, base station, access point, etc.), a second wireless network entity device 58 (e.g., a user equipment device, base station, access point, etc.), a third wireless network entity device 59 (e.g., a user equipment device, base station, access point, radar system, etc.) and a base station network entity 30.

Specifically, to demonstrate various implementations and/or embodiments of the present invention more clearly, the computing system 10 is depicted as a computing system. However, the computing system 10 can be, or otherwise include, a variety of computing device(s) and/or network-specific device(s). Specifically, in some implementations, the computing system 10 can be, or otherwise include, a network node. The network node can perform various functions, and can include or otherwise implement various network functions. For example, the network node may implement a SAS. Alternatively, the network node may implement services for communicating with the SAS.

Alternatively, in some implementations, the computing system 10 can be a computing device or system that is communicatively coupled to a network node (e.g., via existing wired or wireless network infrastructure). For example, the computing system 10 can be a distributed network of computing device(s) and/or system(s) that collectively implement various wireless networking services of an Internet Service Provider (ISP).

The memory 14 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 14 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 14 can include a propagation module 16. The propagation module 16 can generate radio frequency propagation path loss information for radio frequency propagation paths between wireless transmitting entities/devices and wireless devices which receive the transmitted signals using location information for the wireless transmitting devices and the wireless devices which receive the transmitted signals and terrain and clutter information along the radio frequency propagation paths between the transmitting and receiving devices. The propagation module 16 in various embodiments can also generate propagation information, such as for example radio frequency propagation path loss information, which is indicative of a predicted degree, amount and/or level of interference for the wireless devices which receive the transmitted signal but are not the intended destination of the transmitted wireless signal. The propagation module 16 in various embodiments can also generate propagation information indicative of a predicted degree, amount and/or level of interference for a device that requests access to a network and/or usage of a region of frequency spectrum within a network. The propagation module 16 can generate predicted total propagation losses from a first endpoint (e.g., a transmission) to a second endpoint (e.g., transmission reception point). The propagation module 16 can also generate propagation information indication of a predicted degree, amount and/or level of interference for other wireless network entity devices. For example, the first wireless network entity device 18 can provide a spectrum access request 20. The spectrum access request 20 can indicate a band and channel for which access and/or usage is requested by the first wireless network entity device 18. The first wireless network entity device may be, and in some embodiments is, an endpoint device network entity, which as described herein, refers to an endpoint device utilized by a network entity, such as a user computing device, a modem, a router, a CMTS, a network node, base station, etc.

In some implementations, the computing system 10 can determine whether to grant the spectrum access request 20 based on a predicted degree of interference caused by granting the spectrum access request 20. More specifically, the computing system 10 can, in some implementations, include a Spectrum Access System (SAS) 22. The SAS 22 can make spectrum access decisions for a wireless network implemented by a network service provider. The SAS 22 can make the spectrum access decisions based on a predicted degree of interference determined using the propagation module 16. For example, the network service provider may utilize a tiered access network such as used in Citizen Broadband Radio Service (CBRS) network, and the SAS 22 can mediate access to the network and/or shared spectrum utilized by subscribers to obtain services from their network service provider. For example, the SAS 22 can determine whether or not to authorize use of requested spectrum by a requesting device (e.g., first wireless network entity device 18) based on the requesting device's tier of service and the amount and/or level of interference the usage is predicted to cause with other wireless network entity devices and/or the interference other wireless network entity devices transmission will have on the transmissions of the first wireless network entity device 18 using the requested spectrum if the requested spectrum usage was authorized by the SAS 22 for usage by the first wireless network entity device 18.

For example, if the first wireless network entity device 18 is a base station which is requesting usage of the spectrum to communicate with user equipment devices within its coverage area (e.g., assume the first wireless network entity device 18 wishes to communicate with the third wireless network entity device 59 which is located in its coverage area for this example), the amount of interference which will result at the base station network entity 30 can be determined and authorization of the usage of the requested spectrum can be authorized or denied based on the determined amount of interference which will result at the base station network entity 30. For example, if the determined amount of interference at base station network entity 30 is below a threshold interference level or value then the usage of the requested spectrum may be authorized by the SAS 22. If the amount of interference is not below the threshold interference level or value then the request for usage of the spectrum is denied. In some embodiments, the SAS 22 may also determine the maximum transmit power level when authorizing usage of the requested spectrum as the amount of interference will be a function of a plurality of elements including for example, the transmission power, the radio frequency propagation path loss between the transmitting and receiving devices, frequency of the transmitted signal and the frequency of the spectrum authorized for utilization by the base station network entity 30. In another example, the spectrum access request 20 may be a request for continued usage of the spectrum which has already been granted and is being used by the first wireless network entity device (e.g., a spectrum grant re-authorization request or heartbeat request). The request may be denied based on receipt of a sensor notification of detection of a higher tiered user's signal (e.g., navy radar signal) with which the requested re-authorization of continued usage of spectrum would interfere as determined for example based on the propagation path loss between the first wireless network entity device 18 and the location of the higher tiered user's device (e.g., location of navy ship radar system transmitting the radar signal detected by the sensor).

While in the exemplary computing system 10, the SAS is shown as an element of the system, in some implementations, the SAS 22 can be separate from the computing system 10, and the computing system 10 can determine a propagation profile and/or predicted degree of interference and can transmit the information to the SAS 22. The SAS 22 then uses this information to determine whether or not to accept or reject the request for spectrum access/usage.

Because the propagation module 16, and/or the SAS 22, is a component of the computing system 10, functionality implemented by the propagation module 16 and/or SAS 22 may be attributed to the computing system 10 generally. Moreover, in examples where the propagation module 16 and/or SAS 22 comprises software instructions that program the processor device(s) 12 to carry out functionality discussed herein, functionality implemented by the propagation module 16 and/or SAS 22 may be attributed herein to the processor device(s) 12.

To determine the predicted degree of interference, the propagation module 16 can include an obstruction information handler 24. The obstruction information handler 24 can obtain, store, modify, or otherwise handle multiple types and sources of obstruction information. In some implementations, the obstruction information handler 24 can process information to extract or otherwise obtain the obstruction information. For example, the obstruction information handler 24 may process high-fidelity LIDAR information to determine clutter height information.

In particular, the obstruction information handler 24 can include topographic information 26 and clutter information 28 for a particular geographic area. As described herein, a "geographic area" refers to any type or manner of physical area, and may be demarcated to any degree of specificity, such as a street, city block, town, city, county, state, country, zip code, telecommunications sector, etc. The topographic information 26 can describe a terrain height at multiple points within the geographic area. In some implementations, the topographic information 26 can describe the terrain height at every point within the geographic area. In some embodiments topographic information is obtained from geographical databases and/or survey information such as United States Geological Survey (USGS) and National Land Cover Dataset (NLCD).

As depicted, the topographic information 26 includes height information for N points within the geographic area. However, it should be noted that the topographic information 26 is depicted in this manner only to more easily illustrate various implementations of the present disclosure. Rather, in some implementations, the topographic information may assign height values to certain regions within the geographic area. For example, the topographic information 26 may be, include, or be coupled to a model (e.g., the Longley-Rice model/Irregular Terrain model (ITM), the Terrain Integrated Rough Earth Model (TIREM), the models of the ITU-R P.2108, the ITU-R P.452, etc.) and such height values may be retrieved by sampling at points within the geographic area.

The clutter information 28 can include, or otherwise indicate, clutter height values for clutter located atop the terrain within the particular geographic area. "Clutter" includes any object (e.g., vegetation, billboard, infrastructure, etc.), building, man-made entity, etc. located atop the terrain of a geographic area. In some instances, the differences between terrain height and the combination of terrain and existing clutter height can be substantial. For example, while the terrain of New York City in some locations is only 2-3 meters above sea level, clutter located atop the terrain of New York City can be over 400 meters in height (e.g., the One World Trade Center, the Empire State Building, etc.).

In some implementations, the clutter information 28 can be, or can be derived from, high-resolution imagery information. Specifically, in some implementations, the clutter information 28 can be, or can be derived from, LIDAR information. For example, LIDAR imagery (e.g., imagery from autonomous vehicle data sets, etc.) can be obtained for a particular point, and ray tracing can be utilized to determine clutter heights from that particular point. The clutter information 28 may include the LIDAR imagery, the clutter heights derived from the LIDAR imagery, or both. For another example, the clutter information 28 may include high-resolution images depicting clutter from the perspective of a particular point (e.g., street-view imagery, etc.), satellite imagery, infrared imagery, point clouds, etc.

In some embodiments, terrain information and/or clutter information (e.g., elevation and height information) is obtained from information from the United States Geological Survey on land use and land cover (e.g., USGS LULC database and/or USSG National Land Cover database) and/or from the Sentinel-2 10 meter land use/land cover time series of the world produced by Impact Observatory and Esri.

In some embodiments, the topographic information 26 and/or the clutter information 28 can be obtained by the propagation module 16 in response to receipt of the spectrum access request 20. For example, specifically, upon receipt of the spectrum access request 20, the propagation module 16 can determine a location of the first wireless network entity 18 and another wireless network entity device (e.g., base station network entity 30) to determine potential interference from wireless transmissions from the first wireless network entity 18 at the base station network entity 30 if usage of the requested spectrum in spectrum access request 20 was authorized and/or potential interference from wireless transmissions of the base station network entity 30 at the first wireless network entity device 18 such as for example when the base station network entity 30 is serving a different network entity such as a user equipment device within its coverage area (e.g., third wireless network entity). In some embodiments, the first wireless network entity device 18 is a mobile endpoint device such as a user equipment device (e.g., a smartphone) which already has a connection to the SAS 22 (e.g., a direct wireless connection to the computing system 10 on an already authorized spectrum channel, on a special control channel, or via a base station providing wireless services to the first wireless network entity device 18 on a different spectrum channel). The spectrum access request in such a case may be for an additional channel so that the user equipment device can have more bandwidth for communications and/or can also act as wireless node, hot spot or wireless relay for one or more wireless network entity devices (e.g. other user equipment devices, wireless base stations, access points, etc. using the additional requested spectrum in the spectrum access request 20). This can be done for example to provide additional network coverage, backhaul for other wireless devices such as other base station network entities, etc.). In such a case the additional spectrum requested can also be for side link communications between the first wireless network entity device 18 and another wireless user equipment device or wireless network equipment device (e.g., the second wireless network equipment entity device 58). The spectrum access request in such cases may include location information for the first wireless network equipment device (e.g., GPS coordinates generated by the first wireless network entity device 18). In some embodiments, the location of the first wireless network entity 18 may not be known exactly and can, for example, be hypothesized to be in the coverage area of its serving base station entity when the SAS request 20 is received via a serving base entity. Once, the location of the first wireless network entity device 18 and the base station network entity 30 in this example are identified. The propagation module 16 can then determine the geographic area in which both the first wireless network entity device 18 and the base station network entity 30 are located. For example, the spectrum access request 20 may indicate the location of the first wireless network entity device 18 and the base station network entity 30, or the locations could be indicated in a registration request received earlier, or identified in a known database (e.g., when the first wireless network entity device 18 and base station network entity 30 are at fixed locations such as when both are base stations). Alternatively, the propagation module 16 may identify the particular geographic area in some other manner (e.g., pinging the first wireless network entity device 18 for location information, etc.).

The propagation module 16 can include a point sampler 32. The point sampler 32 can sample a plurality of sampled points 36-1-36-6 (generally, sampled points 36) from the plurality of points within the particular geographic area with terrain height values included in the topographic information 26. More specifically, the point sampler 32 can sample the plurality of sampled points 36 from points located between the first wireless network entity device 18 and the base station network entity 30 for which height information is included in the topographic information 26. For example, if a line was drawn between the location of the first wireless network entity device 18 and the base station network entity 30 within the geographic area, the plurality of sampled points 36 may be located at regular intervals (e.g., every 30 meters) along the line.

The propagation module 16 can generate high-fidelity obstruction height information 34. The high-fidelity obstruction height information 34 can include a plurality of high-fidelity obstruction height values 38-1-38-6 (generally, high-fidelity obstruction height values 38) for the sampled points 36. The high-fidelity obstruction height values can synthesize the topographic height values with the clutter height values described by the topographic information 26 and the clutter information 28, respectively. To follow the depicted example, the sampled point 36-1 has a terrain height of 115 M, a clutter height of 40 M, and thus the value of high-fidelity obstruction height value 38-1 is 155 M. M representing the units meters. For another example, the sampled point 36-2 has a terrain height of 103 M, a clutter height of 35 M, and thus the value of high-fidelity obstruction height value 38-2 is 138 M.

It should be noted that the plurality of sampled points 36 do not include all of the points included in the geographic area, or even the points described by the topographic information 26. For example, the points P3 and PN depicted in FIG. 1 are not included among the plurality of sampled points 36. Similarly, it should be noted that the high-fidelity obstruction height values 38 are not necessarily calculated for each point, or each sampled point. For example, if a sampled point lacks appreciable clutter (e.g., clutter above a threshold height), or if clutter information does not exist for a sampled point, the computing system 10 may refrain from determining a high-fidelity obstruction height value for the sampled point, or may refrain from sampling the point altogether.

The propagation module 16 can include a critical point identifier 40. The critical point identifier 40 can identify critical points 42-1-42-4 (generally, critical points 42) from the sampled points 36. To follow the depicted example, the critical points 42 selected by the critical point identifier 40 include sampled points 36-1, 36-2, 36-4, and 36-6. Critical points are points that can be utilized to determine a radio frequency propagation path loss between the first wireless network entity device 18 and the base station network entity 30. The radio frequency propagation path loss can then be used to predict a degree, an amount and/or a level of interference at or for the first wireless network entity device 18 (e.g., when the base station network entity 30, is communicating with user equipment devices it is serving using authorized spectrum) and/or a degree, an amount and/or a level of interference at or for the base station network entity 30 if the first wireless network entity device 18 where to utilize the requested spectrum in spectrum access request 18. For example, when the first wireless network entity device 18 is a base station requesting spectrum for use in communicating with user equipment devices using the requested spectrum in spectrum request 20, the propagation path loss along with transmission power level can be utilized to determine the strength of a signal being received at the base station network entity 30 and the amount of interference the base station network entity 30 will experience. In this way, the radio frequency propagation loss information can also be used to determine whether there is a maximum transmission power level for the first wireless network entity device 18 for the requested spectrum in spectrum access request 20 which will result in an amount of interference below an interference threshold value level at the base station network entity 30 and what that maximum transmission power level is.

Critical points often correspond to locations in which a combination of clutter and terrain height is likely to physically obstruct a signal transmitted from an endpoint device to a base station (and vice-versa) that would interfere with other signaling. The critical point identifier 40 can store critical point information 43 that is descriptive of the critical points 42, the high-fidelity obstruction height values 38 for the critical points 42, etc.

The critical points 42 can be identified based on multiple types of information. In particular, the sampled points 36 can be identified as critical points 42 based on the high-fidelity obstruction height values 38 for the sampled points 36, the distance between the sampled points 36 and the first wireless network entity device 18, the distance between the sampled points 36 and the base station network entity 30, the distances between sampled points (e.g., the distance between a sampled point and another sampled point that is already selected as a critical point), etc. As such, the sampled points 36 that are selected as the critical points 42 are not necessarily the sampled points 36 with the highest high-fidelity obstruction height values 38.

For example, the sampled point 36-1 may be selected as the critical point 42-1 for having the high-fidelity height obstruction value 38-1 of 155 M, while the sampled point 36-5 may be identified as not being one of the critical points 42 for having the high-fidelity height value 36-5 of 95 M while also being most proximate to a sampled point already selected as a critical point (e.g., sampled point 36-6 selected as critical point 42-4).

The propagation module 16 can include a propagation information generator 44. The propagation information generator 44 can generate propagation information 46. The propagation information 46 can include, or otherwise indicate, a radio frequency propagation path loss between the first wireless network entity 18 and the base station network entity 30, predicted degree and/or amount and/or level of interference for and/or at the base station network entity 30 from transmission from the first wireless network entity device 18 utilizing the requested spectrum, predicted degree and/or amount and/or level of interference at the first wireless network device 18 from base station network entity 30 using information on the spectrum the base station network entity 30 is authorized to use for transmission and maximum transmission power level. The propagation information may, and in some embodiments does, include propagation profile information from which a predicted degree, amount, and/or level of interference can be derived for the base station network entity 30 and/or the first wireless network entity device 18.

To do so, the propagation information generator 44 can include a propagation mode selector 48. The propagation mode selector 48 can select one or more of a number of candidate propagation modes stored in propagation mode store 50. As described herein, a "propagation mode" refers to a mode in which a predicted degree, amount and/or level of interference can be determined, or a mode used to generate information from which a predicted degree, amount and/or level of interference can be derived (e.g., a path loss estimation, etc.). Examples of propagation modes include Free Space Loss (FSL), Line of Sight (LOS), Diffraction loss, Tropo-scatter loss, etc.).

The propagation mode selector 48 can select one or more propagation modes from the propagation mode store 50. For example, the propagation mode selector 48 may select one propagation mode to determine a path loss prediction, or may select multiple propagation modes to determine multiple path loss predictions. The propagation mode selector 48 can select the propagation mode(s) based on the critical points 42. It should be noted that, in some instances, the selected propagation mode can have a substantial effect on the path loss prediction and/or the interference prediction. Further, the propagation mode(s) are selected based on one or more of the following transmission and/or reception points, horizon point(s), and critical points, which may be, and typically are, selected based on the high-fidelity obstruction height values 38, which in turn are synthesized from clutter height values from the clutter information 28 and terrain information. As such, the synthesis of the topographic information 26 and the clutter information 28 can have substantial downstream effects on the predicted degree, amount, and/or level of interference. Different propagation modes can further be selected for different portions of the path between a first endpoint (e.g., a transmission point) and a second endpoint (e.g., a reception endpoint).

In some embodiments, the selected propagation mode can be utilized to generate the propagation information 46. Alternatively, in some implementations, the selected propagation mode can be used to generate path loss information 52. The path loss information 52 can include a path loss prediction for communications from one wireless network entity device to another wireless network entity device (e.g., from the first wireless network entity device 18 to base station network entity 30). The path loss information 52 can be utilized by the propagation information generator 44 to generate the propagation information 46. For example, path loss values indicated by the path loss information 52 may be used to determine projected received interference levels for the first wireless network entity device 18, the second wireless network entity device 58, the fourth wireless network entity device and/or the base station network entity 30. In some embodiments, a total propagation loss for radio frequency transmissions from a first endpoint to a second endpoint are determined and a plurality of frequencies within a spectrum range are then utilized to determine the range of spectrum interference that may occur at for a plurality of different power transmission levels.

In some implementations, the computing system 10 can include the SAS 22, and the SAS 22 can generate decision information 54. The decision information 54 can indicate whether the spectrum access request 20 has been granted by the SAS 22. To follow the depicted example in FIG. 1, assume that the SAS 22 receives the spectrum access request 20 and a second spectrum access request 56 from a second wireless network entity device 58. The second spectrum access request 56 can request access and/or authorization to a frequency band that at least partially overlaps with the frequency band indicated by the spectrum access request 20.

To determine whether such overlap is acceptable, the SAS can request the propagation information 46 for the first wireless network entity device 18 and/or the second wireless network entity device 58 from the propagation module 16. The propagation information 46 can include the radio frequency propagation path loss between the first wireless network entity device 18 and the second wireless network entity device 58 and/or a predicted amount of interference at the first wireless network entity device 18 and/or the second wireless network entity device 58. The radio frequency propagation path loss between the first wireless network entity device 18 and the second wireless network entity device 58 for example can be and typically is used to determine whether an amount or level of predicted interference at the first wireless network entity device from the second wireless network entity device 18 and at the second wireless network entity device 58 from the first wireless network entity device 18 is less than a threshold amount or level of interference, the decision information 54 can indicate that the spectrum access request 20 has been granted. Alternatively, if the propagation information 46 indicates a degree of predicted interference greater than or equal to a threshold amount or level of interference at the first wireless network entity device 18 or at the second wireless network entity device 58, the decision information 54 can indicate that the spectrum access request 20, and/or the second spectrum access request 56, has been denied.

While the examples discussed above have focused on the determination of interference between two wireless network entities (e.g., first wireless network entity device 18 and the base station network entity 30, the first wireless network entity device 18 and the second wireless network entity device 58). In determining the interference which will be caused by a wireless network entity device requesting spectrum access/usage such as the first wireless network entity 18 in system 100 should the spectrum requested be authorized for use, predicted interference amounts and/or levels may be generated for one or more of the other wireless network entity devices (e.g., other wireless network entity devices (e.g., base station network entity 30, second wireless network entity device 58, and third wireless network entity device 59) which may be affected by the transmission of the wireless network entity device requesting the spectrum access/usage (e.g., first wireless network entity device 18). The interference amount or level experienced at each of these other wireless network entity devices may then be evaluated to determine whether the amount of interference at each of these other devices is below a threshold level or amount before authorizing the usage of the requested spectrum by the requesting wireless network entity device (e.g., first wireless network entity device 18). In some embodiments, the interference at the requesting wireless network entity device (e.g., the first wireless network entity device 18) from one or more other wireless network entity devices (e.g., base station network entity 30, second wireless network entity device 58, third wireless network equipment entity device 59) is determined and the requested spectrum is only authorized for usage if the amount or level of interference at the requesting wireless network entity device from the one or more other wireless network entity devices is below a threshold amount or level of interference. In various embodiments, the interference which may be caused by and which may be experienced by the requesting wireless network entity device should the requested spectrum be authorized for use by the requesting wireless network entity device is determined and only when both the interference experience at the requesting wireless network entity device and the interference caused by the requesting wireless network entity device are both below predetermined interference level and/or amounts is the spectrum request granted. In some embodiments, the wireless network equipment devices for which spectrum interference is to be determined is based on the spectrum range, frequency, band, and/or channel being requested and the spectrum range, frequency, band, and/or channel currently in usage by other wireless network entity devices (e.g., within a specified distance). For example, other wireless network entity devices using and/or authorized for use for the same, adjacent or overlapping spectrum range, bands, and/or channels as the requested spectrum range, bands and/or channel(s) may be selected.

In various embodiments, when generating a predicted degree, amount or level of interference at a first wireless network entity device which may be caused by the transmissions of a second wireless network entity device, a radio frequency propagation path loss is generated for a radio frequency propagation path between the two entities. The radio frequency propagation path loss is a function of the radio frequency spectrum to be utilized. The radio frequency propagation path loss is then used, along with the maximum transmission power level of the second wireless network entity device to determine the predicted degree, amount or level of interference at the first wireless network entity device from transmissions of the second wireless network entity. When the principle of radio frequency reciprocity is applied, the radio frequency propagation path loss between the two entities is the same regardless of which is the transmitter and which is the receiver. That is the propagation path loss for a path from a first wireless network device to a second wireless network entity device is the same as the propagation loss for the same path from the second wireless network entity device to the first wireless network entity device.

Figure 2:
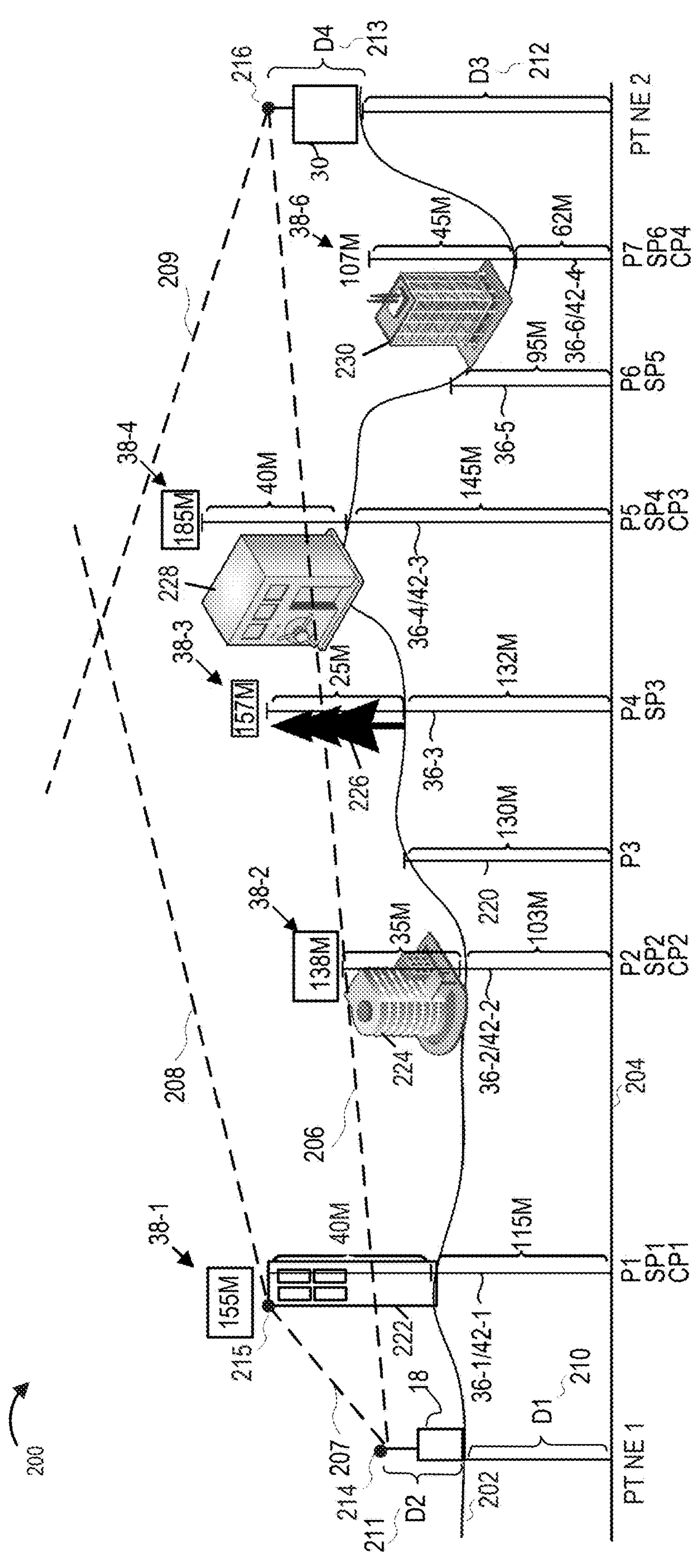
FIG. 2 illustrates a geographic area including wireless network entities, terrain information, clutter information, and propagation path information in accordance with an embodiment of the present invention.

FIG. 2 depicts an example geographic area 200 including network entities for which high-fidelity obstruction height values are synthesized for determining radio frequency propagation path loss and optimizing frequency spectrum assignment and/or usage in accordance with various embodiments of the present invention.

FIG. 2 will be discussed in conjunction with FIG. 1. Specifically, the geographic area 200 is depicted with a two-dimensional view of a terrain 202 and a line to indicate a reference sea level height 204.

The first wireless network entity device 18 and the base station network entity 30 are located on the surface of the terrain 202. It is to be understood in this example, that the first wireless network entity device 18 and base station network entity 18 are attempting to utilize spectrum (e.g., overlapping spectrum regions and/or channels) to communicate with other wireless network entity devices and not with each other. For example, first wireless network entity device may be a base station that is requesting spectrum for use in communicating with user equipment devices in its coverage area while the base station network entity 30 may be using the same or overlapping spectrum to communicate with user equipment devices within its coverage area which is different from the coverage area of the first wireless network equipment device. The distances between the first wireless network entity device 18 and the base station network entity 30 may be, and in some embodiments is, a long distance such as for example greater than 5 miles.

The first wireless network entity device 18 is located atop terrain 202 which has a height value of D1 210 with respect to the reference sea level height 204. D2 211 is the distance or height value to a point 214 on the top of the antenna of the first wireless network entity device 18 from the terrain 202 on which the first wireless network entity device 18 is located. The point 214 shown as point network entity 1 (PT NE 1) has a height value of D1+D2 with respect to the reference sea level 204. D1 may be for example 100 meters. D2 may be for example 30 meters so that the point 214 is at a height value of 130 meters above sea level. This is point of transmission and receipt of wireless signals for the first wireless network entity device 18. The base station network entity 30 is located atop terrain 202 which has a height value of D3 212 with respect to the reference sea level height 204. D4 213 is the distance or height value to a point 216 on the top of the antenna of the base station network entity device 30 from the terrain 202 on which the base station network entity 30 is located. The point 216 shown as point network entity 2 (PT NE 2) has a height value of D3+D24 with respect to the reference sea level 204. D3 may be for example 118 meters. D4 may be for example 48 meters so that the point 216 is at a height value of 166 meters above sea level 204. This is the point of transmission and receipt of wireless signals at base station 30. Clutter in the form of buildings 222, 224, 228, and 230 and tree 226 are shown atop of the terrain 202. A first radio frequency propagation path between the first wireless network entity device 18 and the base station network entity 30 is shown as by dashed lines 207, 208 and 208. The first portion 207 of the radio frequency propagation path extends from the point 214 to the first horizon point 215 located atop of the building 222 (at point P1, sample point SP1, CP 1). Extending from the first horizon point 215 to the point 216 on the base station network entity 30 is a second portion (208 and 209) of the first radio frequency propagation path. In this example the first horizon point 214 is below the height of the first clutter object (building 222) with the first horizon point 215 being the first point where the horizon can be seen from the transmitter point 214 of the first wireless network entity device 18. In this example, the point 216 which is the receiver point for the base station network entity 30 is considered to be above any clutter which would block it from seeing the horizon. The distance between the building 228 and the point 216 being far enough so that it does not obstruct the point 216 from seeing the horizon. The change in the direction of the propagation path at the first horizon point 215 is the result of diffraction as the radio frequency signal will be diffracted by the top of the building 215.

A Line-of-Sight (LOS) 206 is illustrated between the first wireless network entity device 18 and the base station network entity 30. As illustrated, the sampled points SP 1 (36-1), SP 2 (36-2), SP 3 (36-3), SP4 (36-4), SP5 (36-5), and SP 6 (36-6) are sampled along the LOS 206. The terrain height value and the clutter height value at each of the sampled points is shown. The summation of the terrain height value and the clutter height value for each sampled point results in the high-fidelity obstruction height value for the sampled point as shown in FIG. 1. For example, the sampled point SP 1 (36-1) has a terrain height of 115 M, a clutter height of 40 M, which results in a high-fidelity obstruction height value for SP 1 (38-1) of 155M as shown in FIG. 1.

As illustrated, in some instances the critical point identifier 40 can refrain from identifying one of the sampled points SP 1 (36-1), SP 2 (36-2), SP 3 (36-3), SP 4 (36-4), SP 5 (36-5), and SP 6 (36-6) as one of the critical points 42 based on a lack of corresponding clutter located at the sampled point. To follow the depicted example, there is no clutter located atop the surface of the terrain 202 at the sampled point SP 5 (36-5). As such, it is relatively unlikely that the sampled point SP 5 (36-5) will be particularly relevant for predicting interference with respect to the first wireless network entity 18. In other words, the sampled point SP 5 (36-5) is unlikely to be a "critical" point for predicting interference, because the terrain height is below the Line of Sight and there is no clutter at the sampled point SP 5 to block the transmission of the signal from being received at network entity 30 and likewise will block the transmission of signals from base station network entity 30 being received at the first wireless network entity 18. Conversely, clutter in the form of a 40 M high building is located atop the surface of the terrain 202 at the sampled point SP 4 (36-4), and as such, the critical point identifier 40 selects the sampled point SP 4 (36-4) as the critical point CP (42-3).

Additionally, or alternatively, in some implementations, the critical point identifier 40 can select, or refrain from selecting, a sampled point as a critical point based on distance(s) between the sampled point and other sampled points, the sampled point and a network entity, etc. For example, the sampled point SP 3 (36-3) has a relatively high terrain height of 132 M. Further, appreciable clutter with a height of 25 M is located atop the surface of the terrain 202 at the sampled point SP 3 (36-3) results in the high-fidelity obstruction height value (38-3) of the sampled point SP 3 (36-3) being 157 M. However, the sampled point SP 3 (36-3) is most proximate to another sampled point SP 4 (36-4) with a clutter height of 40 M, and a high-fidelity obstruction height value (38-4) of the sampled point SP 4 (36-4) that is 185 M. As such, the critical point identifier 40 may select the sampled point SP 4 (36-4) as the critical point CR 3 (42-3), and refrain from selecting the sampled point SP 3 (36-3) as a critical point.

The computing system 10 can, based on the one or more critical points, generate propagation information indicative of a predicted degree of interference for the first wireless network entity device 18 and/or the base station network entity device 30. In some embodiments, the computing system can, based on the one or more critical points, select one or more propagation modes from a plurality of propagation modes to utilize in determining a total propagation loss from the first wireless network entity device 18 to the base station network entity device 30. The computing system 10 can use the one or more propagation modes to generate one or more corresponding path loss values for the entire path between the first wireless network entity device 18 to the base station network entity device 30 and/or for different portions of a propagation path from the first wireless network entity device 18 to the base station network entity device 30. The computing system can determine the predicted degree of interference for the first wireless network entity device 18 and/or the base station network entity 30 based on the one or more path loss values. In some embodiments, the propagation modes include Free Space Loss (FSL), Line-Of-Sight (LOS), diffraction loss, troposcatter propagation loss (also know as Tropospheric propagation loss), clutter propagation loss determined using and/or based on one or more of the models of the ITU-R P.2108 or ITU-R P.452. In some embodiments, when the first wireless network entity device 18 transmitter/receiver point 214 (height D1+D2) is below the height of clutter (e.g., below building 222) so that the clutter (e.g., building 222) blocks a propagation path to the horizon and the base station network entity 30 transmitter/receiver point 216 height (D3+D4) is not below the height of the clutter (i.e., a propagation path to the horizon is not blocked by clutter) then a total propagation path loss for a radio frequency signal transmitted between the first wireless network entity device 18 and the base station network entity 30 by: (i) determining the clutter loss between the point 214 which is the top of the antenna of the first wireless network entity device 18 and the first horizon point 215 which is the top of the building 215 using a propagation loss model from the ITU-R P.2108 standard or the ITU-R P.452 standard, (ii) determining the diffraction or tropo-scattering propagation path loss from the first horizon point 215 to the point 216 is which the top of the antenna of the base station network entity 30 using and/or based on a ITM or Longley-Rice model and critical point information; (iii) determining the Free Space Loss from the point 214 to the point 216; and (iv)

adding together the clutter loss, the diffraction or tropo-scattering loss and the Free Space Loss.

If the height of point 216 (i.e., D3+D4) was below clutter such that the clutter blocked the transmission of signals from point 216 to the horizon then a second clutter loss would be calculated for the propagation path from point 216 to a second horizon point where the first clutter object blocks the path to the horizon from the point 216 which would be the height of the first clutter object. The diffraction loss or tropo-scattering propagation loss would then be calculated from the first horizon point to the second horizon point. The total propagation path loss from the first network entity device 18 point 214 to the base station network entity 30 point 216 would be determined by adding together the first clutter loss from the point 214 to horizon point 215, the second clutter loss from the point 216 to the second horizon point, the diffraction or tropo-scattering propagation loss generated using the critical point information from first horizon point to the second horizon point, and the Free Space Loss from the point 214 to the point 216.

In some implementations, the computing system 10 makes a spectrum access/usage request decision for the first wireless network entity device 18 entity based at least in part on the propagation information (e.g., a radio frequency propagation path loss from the first wireless network entity device 18 to the base station network entity 30. In some embodiments, to make the spectrum access/usage decision, the computing system can determine that the predicted degree, amount or level of interference at the first wireless network entity device 18 from the base station network entity 30 based on the determined propagation path loss between the first wireless network entity device 18 and the base station network entity 30 is less than a first threshold amount of interference and/or can determine that the predicted degree, amount or level of interference at the base station network entity device 30 from the first wireless network entity device 18 based on the determined propagation path loss between the first wireless network entity device 18 and the base station network entity 30 is less than a second threshold amount of interference. The first and second threshold interference amounts may be the same or different. For example, the computing system 10 in some embodiments, authorizes the use of the requested spectrum by the first wireless network equipment device when the predicted amount of interference at the first wireless base station 18 is less than the first threshold interference amount; otherwise, it denies the request. In some embodiments, the computing system 10, authorizes the use of the requested spectrum by the first wireless network entity device 18 when the predicted amount of interference at the base station network entity 30 is less than the second threshold amount; otherwise, it denies the request. In some embodiments, the computing device only authorizes the use of the requested spectrum by the first wireless network entity device 18 when both: (i) the predicted amount of interference at the first wireless base station 18 is less than the first threshold interference amount, and (ii) the predicted amount of interference at the base station network entity 30 is less than the second threshold amount; otherwise it denies the request. In various embodiments, the SAS 22 of the computing device 10 makes the decision on whether or not to authorize the usage of the requested spectrum by the first wireless network entity device 18.

Because the propagation module 16, and/or the SAS 22, is a component of the computing system 10, functionality implemented by the propagation module 16 and/or SAS 22 may be attributed to the computing system 10 generally. Moreover, in examples where the propagation module 16 and/or SAS 22 comprises software instructions that program the processor device(s) 12 to carry out functionality discussed herein, functionality implemented by the propagation module 16 and/or SAS 22 may be attributed herein to the processor device(s) 12.

Various embodiments of the present invention are particularly useful when the distance between the wireless network entities for which interference is being determined such as for example, the first wireless network entity device 18 and the base station network entity 30 in geographic area 200 is a long distance such as for example greater than or equal to 5 kilometers as the clutter models and propagation models (e.g., ITM or Longley-Rice models, ITU P.2108 models, and ITU-R P.452 models which are utilized in various embodiments are designed for use with propagation paths which have long distances (e.g., distances of 5 kilometers or more).

As previously discussed, prior propagation models used for determining radio frequency path loss which in turn is used for determining access and/or usage of shared spectrum has problems. In particular, the ITM propagation model equations used to compute the diffraction or Tropo-scattering Losses are not designed for large scattering angles (i.e., angles larger than one degree) which result from large height differences between two neighboring sampled points along the profile especially for a transmitter and/or receiver embedded in clutter. Therefore, the use of just ITM propagation models is limited to low scattering angles only. Various embodiments of the present invention solve this problem and provide a more accurate prediction of propagation path loss that is especially useful for situations in which the transmitter and/or receiver are below the clutter and/or embedded in the clutter.

Tropo-scattering losses will now be further explained. As a radio frequency signal passes through the troposphere, both refraction and reflection will occur. The bending of the radio signal is determined by the atmosphere refractivity gradient. The reflections are due to the interaction of the radio frequency signal with the molecules of air within the troposphere. The loss corresponding to this propagation is referred to as Tropospheric scatter loss or Tropo-scattering loss. Diffraction loss is the loss corresponding to bending of radio signal waves around an object (e.g., clutter such as a building).

Various embodiments of the present invention provide new and/or improved methods and apparatus for determining the radio frequency propagation loss between a transmitter and a receiver assuming that the transmitter and/or receiver is located below the clutter and/or is embedded in the clutter. Clutter includes objects, such as for example, vegetation, buildings, towers, or other man-made structures, which are located on top of the terrain of a geographic area. Various embodiments of the present invention further provide new and/or improved methods and apparatus for using this determined radio frequency propagation loss in managing the assignment/allocation and/or usage of shared spectrum among users of a wireless network. For example, by determining a predicted degree, amount, or level of spectrum interference at a point where a receiver is located from radio frequency transmission of a point at which a transmitter is located.

Wireless communications devices typically include one or more transmitters and one or more receivers. As such the radio frequency propagation path loss between wireless communications devices can be predicted and used for determining spectrum interference between the wireless communications devices (e.g., two base stations). Furthermore, a predicted radio frequency propagation path loss can be determined between any two geographical points provided the transmission frequency using one or more radio frequency propagation path loss models and terrain and clutter path profile information between the two endpoints. Moreover, the predicted radio frequency propagation path loss between the two geographical points is typically reciprocal meaning that the predicted radio frequency propagation path loss from a first point to a second point is the same as the predicted radio frequency propagation path loss from the second point to the first point. That is predicted radio frequency propagation path loss between a transmitter and a receiver is the same regardless of whether: (i) the transmitter is placed at first point and receiver is placed at the second point, or (ii) the transmitter is placed at the second point and the receiver is placed at the first point.

In various embodiments of the present invention, terrain elevation/height information as well as clutter height information along the radio frequency transmission path (profile) between the transmitter and receiver, sampled at a reasonable distance such as every 30 meters (m) is used to determine and/or compute the propagation loss between the transmitter and receiver. As previously described terrain elevation and clutter height information are obtained in various embodiments from geographical databases and/or survey information such as United States Geological Survey (USGS) and National Land Cover Dataset (NLCD). In some embodiments, terrain information and/or clutter information (e.g., elevation and height information) is obtained from information from the United States Geological Survey on land use and land cover (e.g., USGS LULC database and/or USSG National Land Cover database) and/or from the Sentinel-2 10 meter land use/land cover time series of the world produced by Impact Observatory and Esri. Alternatively, and/or in addition to using information from geographical databases, clutter height information can also be obtained by using high resolution imaging data, such as obtained from LiDAR, which is available for many cities. The imaging data in some embodiments is used to identify clutter heights. In determining the propagation loss between the transmitter and receiver, clutter heights are added to terrain heights along the propagation profile (i.e., path) to determine obstruction heights.

The propagation loss between the transmitter and receiver assuming the transmitter is located below the clutter is determined and/or obtained by computing the following losses: (a) Clutter loss in decibel (dB), (b) Diffraction (or Tropo-scatter loss) in dB, and (c) Free Space Loss (FSL) in dB. The clutter loss is determined and/or obtained by computing the diffraction loss between the transmitter and the first horizon seen by the transmitter. The diffraction (or tropo-scatter) loss in dB is determined and/or obtained using the Irregular Terrain Model (ITM) between the location of first horizon and the receiver location. The transmitter is assumed to be at the first horizon location and the transmitter's height is assumed to be the terrain height plus clutter height at the first horizon location. It is to be noted that the terrain profile between the first horizon and the receiver includes the terrain height plus the clutter height along the profile. The Free Space Loss in dB is determined and/or computed between the transmitter and the receiver without any obstruction along the profile. The total path loss in dB between the transmitter and the receiver is determined and/or obtained by adding the clutter loss (dB)+diffraction (or tropo-scatter) loss (dB)+Free Space Loss (dB).

Figure 3:
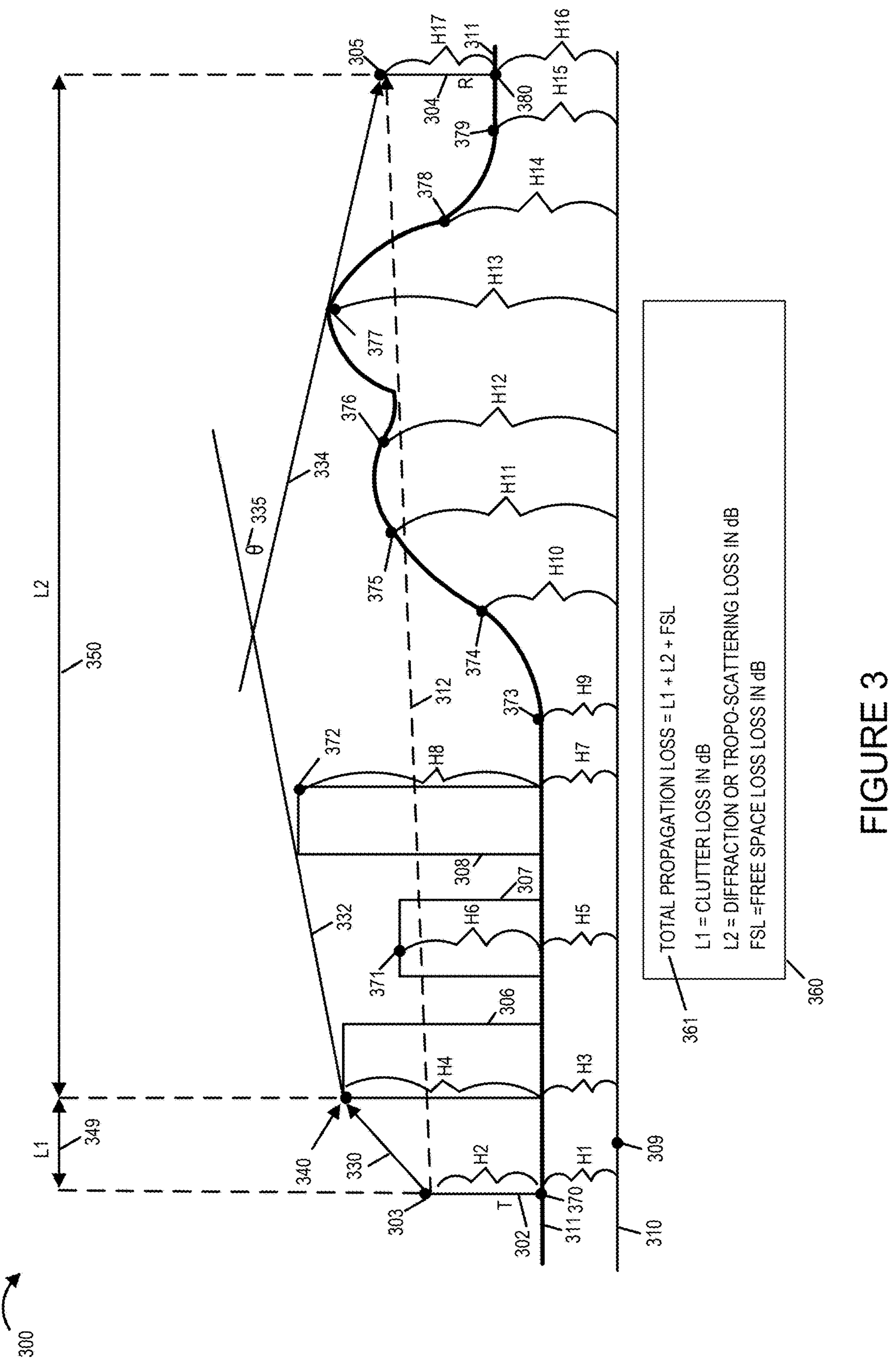
FIG. 3 illustrates an exemplary geographic area with information for generating a total propagation path loss between two points in the exemplary geographic area in accordance with an embodiment of the present invention.

FIG. 3 illustrates a geographic area 300 with an example of how to determine the total radio frequency propagation loss between a transmitter and a receiver wherein the transmitter is located below the clutter in accordance with an embodiment of the present invention. Note that in diagram of FIG. 3 while the transmitter 302 is located below the clutter, the receiver R 304 is not located below any clutter that obstructs its path to the horizon but instead is only located below terrain 311. In the diagram 300, T 302 represents the transmitter, R 304 represents the receiver, objects 306, 307, and 308 represent clutter (e.g., buildings), line 311 represents the terrain (e.g., surface of the Earth), lines 330, 332, 334 represent a path of the radio frequency signals transmitted from the transmitter T 302 to the receiver R 304. Line 312 represents a line of sight between the transmitter 302 point of transmission 303 (location of top of antenna of transmitter) to the receiver 304 point of receipt 305 (location of top of antenna of receiver 304). In this example, the distance between the transmitter T 302 and the receiver R 304 is greater than 5 kilometers. The angle θ 335 is the scatter angle which in this example is larger than 1 degree.

Legend 360 shows an equation 361 for determining the total radio frequency propagation loss from the transmitter T 302 (point of transmission 303) to the receiver R 304 (point of reception 305).

The equation 361 is: Total Propagation Loss=L1+L2+FSL, where L1 is the clutter loss in dB for the portion of the radio frequency signal path 330, L2 is the diffraction or tropo-scattering loss in dB for the portion of the radio frequency signal path including 332 and 334, and FSL is the Free Space Loss from the transmitter T2 302 to the receiver R 304.

The clutter loss L1 is generated, determined and/or calculated using a clutter model from International Telecommunication Union (ITU) Recommendation ITU-R P.2108 entitled, "Prediction of clutter loss" or from the International Telecommunication Union Recommendation ITU-R P.452 entitled Prediction procedure for the evaluation of interference between stations on the surface of the Earth at frequencies above about 100 MHz. ITU-R P.452. The International Telecommunication Union Recommendation ITU-R P.2108-1 which was published in September 2021 is incorporated herein by reference in its entirety. The International Telecommunication Union Recommendation ITU-R P.452-18 which was published in August 2023 is incorporated herein by reference in its entirety.

The diffraction or tropo-scattering loss L2 is generated, determined and/or calculated using the Irregular Terrain Model (ITM) (Longley-Rice) radio propagation model between the horizon point 340 and the receiver 304 reception point 304. The transmitter is assumed to be at the first horizon point 340 with its transmission point being assumed to be the terrain height (H3) plus clutter height (H4) at the first horizon point (i.e., the height of the first horizon point 303 with respect to a reference sea level 310 or a reference sea level point 309). Terrain and clutter height information for the propagation path are used in the determination of the diffraction or tropo-scattering loss L2. As previously explained, terrain heights and corresponding clutter heights are determined for a non-empty set of points 340, 370, 371, 372, 373, 374, 375, 376, 378, 379, along the propagation path profile. Clutter heights are then added to terrain heights at each of the points of the set of points along the propagation profile to determine obstruction heights (e.g., high fidelity obstruction heights). The height of the terrain 311 at point 370 at which the transmitter is located is H1 with respect to sea level 310 or the sea level reference point 309. The height to point 303 (antenna height/point of transmission) with respect to the terrain point 370 is H2. The total height of point 303 with respect to sea level 10 is H1+H2. The height of the first horizon point 340 with respect to sea level 310 is H3 the height of the terrain 311 at which the clutter 306 is located with respect to sea level plus H4 the height of the clutter with respect to the terrain 311 at which the obstruction 306 is located. The height of the obstruction point 371 with respect to sea level 310 is H5 the height of the terrain 311 with respect to sea level 310 at which the clutter 307 is located plus H6 the height of the clutter 307 with respect to the terrain 311 at which the clutter 307 is located. The height of the obstruction point 372 with respect to sea level 310 is H7 the height of the terrain 311 with respect to sea level 310 at which the clutter 308 is located plus H8 the height of the clutter 308 with respect to the terrain 311 at which the clutter 308 is located. Points 373, 374, 375, 376, 377, 378, and 379 do not have clutter. The terrain height with respect to sea level is therefore utilized for these points when determining propagation loss. In some embodiments clutter below a threshold height with respect to the terrain 311 (e.g., below 0.5 meters) is not considered as an obstruction and the terrain height is used for the point as opposed to the terrain height plus clutter height. In this example, point 373 has height H9 with respect to sea level 310; point 374 has height H10 with respect to sea level 310; point 375 has height H11 with respect to sea level; point 376 has height H 12 with respect to sea level 310, point 377 has the height H13 with respect to sea level 310, point 378 has height H14 with respect to sea level; point 379 has a height H15 with respect to sea level. The point 380 on the terrain 311 at which the receiver is located has a height H16 with respect to sea level 310. The height of the reception point 305 of the receiver 304 with respect to terrain point 380 is H17. The height of the reception point 305 with respect to sea level 310 is the height H16 plus H17. The height of the terrain and/or objects (e.g., clutter) on the terrain may be determined with respect to sea level 310 using the height of the sea level reference point 309.

Critical points may then be selected and/or determined from the set of points 371, 372, 373, 374, 375, 375, 377, 378, 379. The height information for the critical points as well as the first horizon point 340 height information and the reception point 305 height information is then used in the ITM (Longley-Rice) radio propagation diffraction or tropo-scattering path loss model to determine the diffraction or tropo-scattering loss L2. The Longley-Rice ITM propagation models for diffraction and tropo-scattering are disclosed in the ESSA TECHNICAL REPORT ERL 79-ITS 67 Prediction of Tropospheric Radio Transmission Loss Over Irregular Terrain A Computer Method-1968 authored by A. G. Longley and P. L. Rice published in July 1968 with comments and errata published in April 1970. The ESSA TECHNICAL REPORT ERL 79-ITS 67 Prediction of Tropospheric Radio Transmission Loss Over Irregular Terrain A Computer Method-1968 authored by A. G. Longley and P. L. Rice published in July 1968 with comments and errata published in April 1970 is incorporated herein by reference in its entirety. Updated versions of the Irregular Terrain Model have also been created based on the Longley-Rice ITM propagation model and these updated models are also used referred to as Irregular Terrain Model or Longley-Rice model. Information about the Irregular Terrain Model is available from The National Telecommunications and Information Administration (NTIA) of the United States Department of Commerce. The National Telecommunications and Information Administration (NTIA) of the United States Department of Commerce has published the following documents on the Internet website http://its.ntia.gov/software/itm (i) the whitepaper, "The ITS Irregular Terrain Model, version 1.2.2 Algorithm" by George Hufford published by the National Telecommunications and Information Administration Institute for Telecommunication Sciences, (ii) "Dr. George Hufford's 1985 Memo describing the changes to ITM version 1.2.1 (dated April 1979) in ITM version 1.2.2 (dated September 1984); and (iii) "The 'definitive' representation of the ITS Irregular Terrain Model" which contains both FORTRAN source code and documentation as updated on 5 Aug. 2002. These three documents are incorporated herein by reference in their entirety.

Irregular Terrain Model version 7, also known as the 'Longley Rice' model was developed by the US NTIA and is used by the FCC. In various embodiments, the diffraction or tropo-scattering loss is determined for the L2 loss based on and/or using an updated ITM model such as ITM version 7.

The Free Space Loss is the attenuation of radio energy between the feedpoints of two antennas that results from the combination of the receiving antenna's capture area plus the obstacle-free, line-of-sight (LOS) path (e.g., LOS path 312) through free space (usually air). The Free Space Loss is generated, determined, and/or calculated using a free space propagation path loss formula (e.g., $FSL=((4\pi df)/c))^2$, where d is the distance between the transmitter and receiver antennas (e.g., points 303 and 305), f is the radio frequency of the signal being transmitted, and c is the speed of light.

For geographical regions where high-resolution imaging data is not available, clutter classification data, from geographical databases including clutter information such as the National Land Coverage Database (NLCD) can be used along with clutter height models, such as ITU-R P.2108 or ITU-R P.452 models to determine clutter heights.

Once the total radio frequency propagation path loss is determined between the transmitter 302 transmission point 303 and the receiver 311 reception point 305, this propagation information can be used to predict a degree, amount or level of spectrum interference at the receiver 304 from transmission of the transmitter 302. The predicted degree, amount, or level of spectrum interference can then be used to make a decision on whether the transmitter 302 (e.g., a transmitter of a first wireless base station) which is requesting usage of spectrum (e.g., shared spectrum) is to be authorized to use the requested spectrum. For example, as previously explained if the predicted degree, amount or level of spectrum interference is less than a spectrum interference threshold value then the requested spectrum usage is authorized and when the predicted degree, amount or level of spectrum interference is not below the spectrum interference threshold value the usage of spectrum is not authorized.

Figure 4:
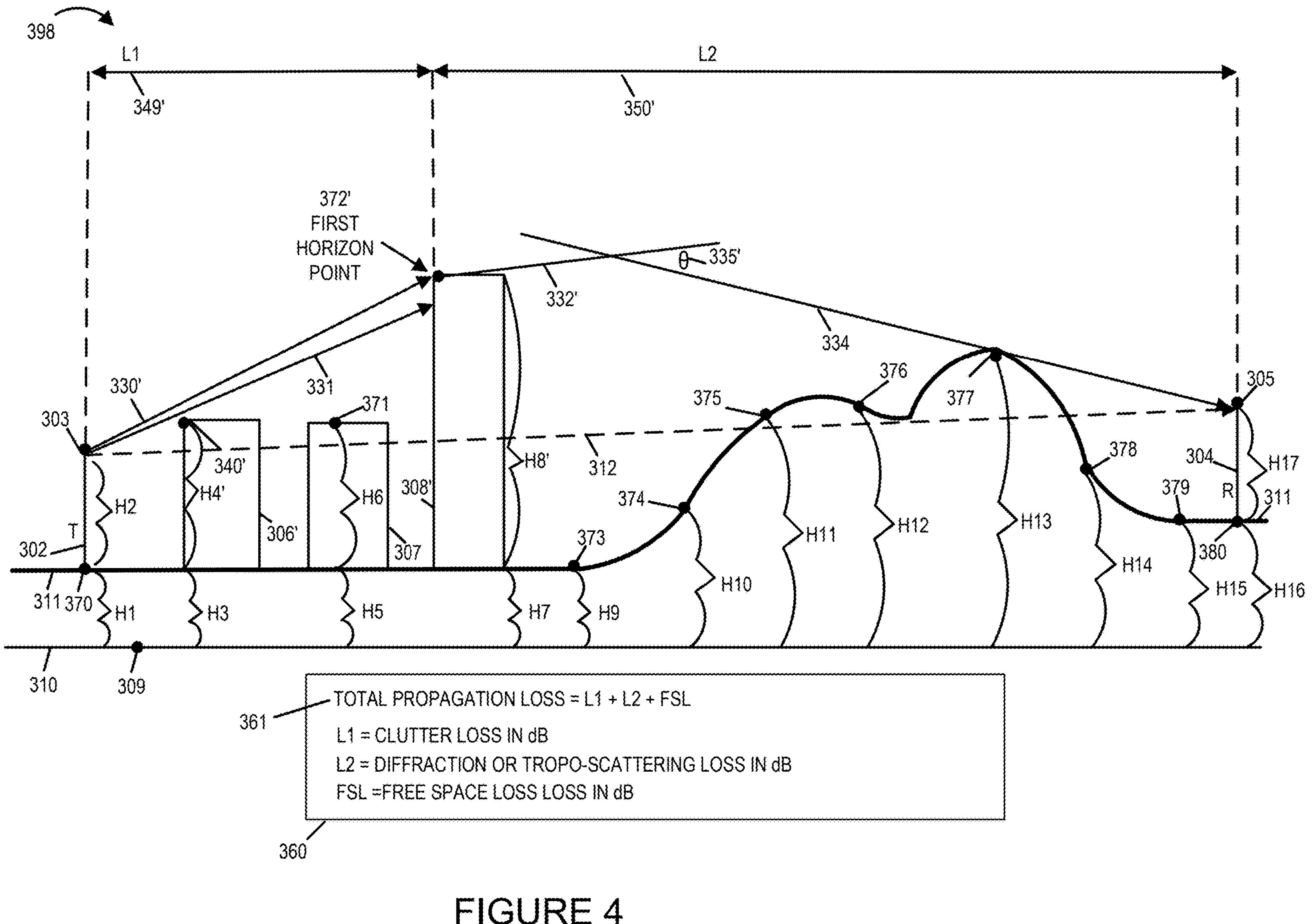
FIG. 4 illustrates an exemplary geographic area with information for generating a total propagation path loss between two points in the exemplary geographic area in accordance with an embodiment of the present invention.

FIG. 4 illustrates a geographic area 398 which is a modified geographic area 300. Elements or steps with the same reference numbers used in different figures are the same or similar and those elements or steps will not be described in detail again.

The geographic area 398 will be used to explain how the horizon point from the transmission point can change based on a change in the clutter heights which affect the first horizon as seen from the transmission point of the transmitter. In the geographic area 398 the clutter 306' and clutter 308' have been modified to have different heights. The height of clutter 308' (e.g., a building) has a larger or higher height with respect to sea level 310 than clutter 308 in geographic area 300. The height of point 372' on top of clutter 308' with respect to the terrain 310 on which it is located is height H8'. The height of point 372' on top of the clutter 308' with respect to sea level 310 is obtained by adding H7+H8'. The clutter 306' (e.g., a building) has a smaller or lower height with respect to sea level than clutter 306 in geographic area 300. The height of point 340' on top of clutter 306' with respect to the terrain on which it is located is height H4'. The height of point 340' on top of the clutter 306' with respect to sea level 310 is obtained by adding H3+H4'. While the height of point 340' is higher than the transmission point 303, it is no longer the first horizon point as shown by transmission path 331 which clears the clutter 306' and clutter 307 but is obstructed from reaching or seeing the horizon by clutter 308'. As a result, the first horizon point in geographic area 398 as seen from the transmission point 303 is shown at the top of clutter object 308' which is point 372'. The radio frequency propagation path loss now includes the propagation path loss along the path 330', 332', and 334. The total propagation path loss=the clutter loss L1+diffraction or tropo-scatter loss L2+FSL loss. While the FSL loss calculation remains the same, the L1 349' clutter loss is now determined from the transmission point 303 to the first horizon point 372'. The L2 350' loss is determined from the first horizon point 372' to the reception point 305. The change in the propagation path has resulted in a change in the scatter angle which is now scatter angle 335'.

Figure 5:
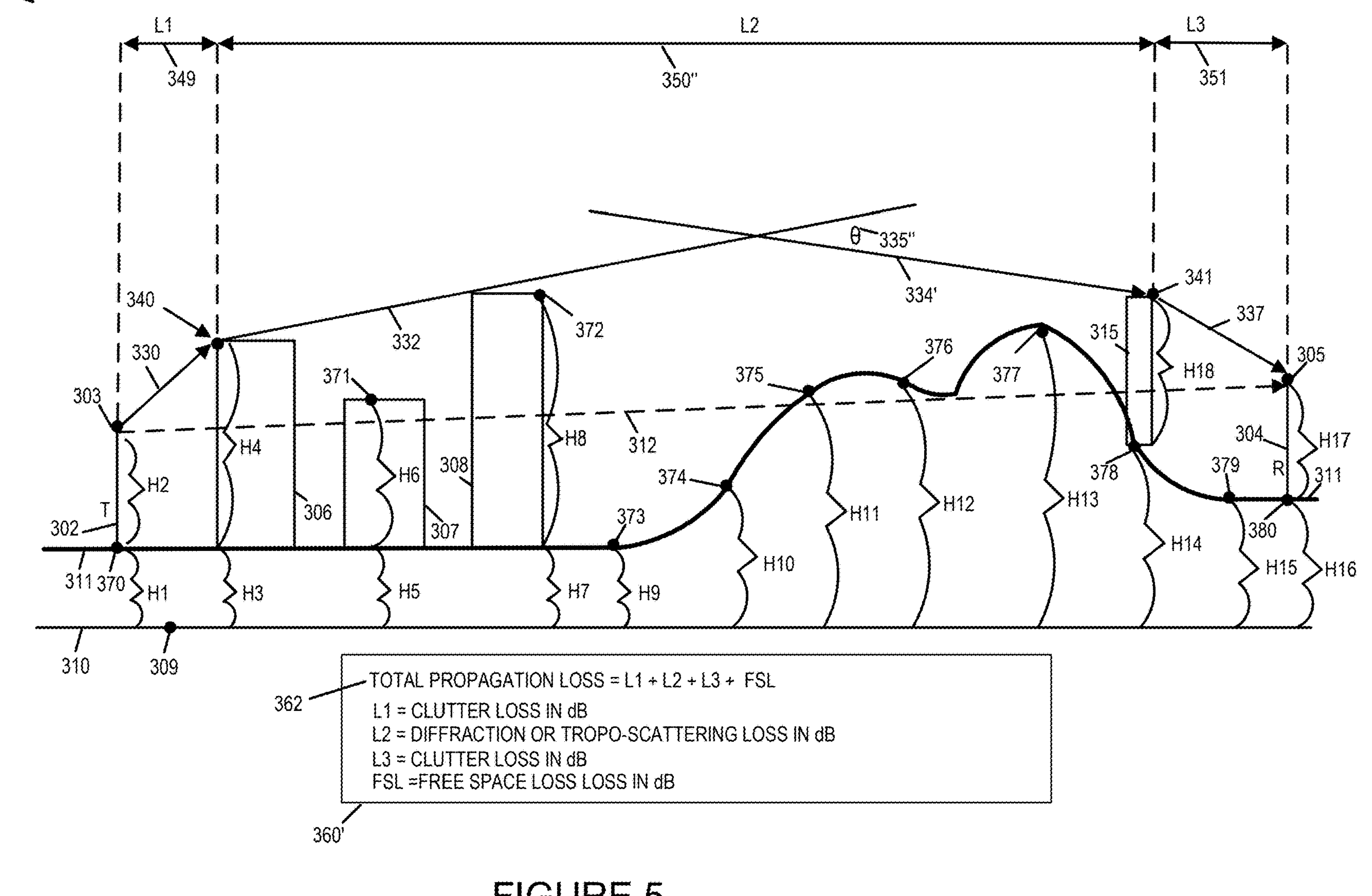
FIG. 5 illustrates an exemplary geographic area with information for generating a total propagation path loss between two points in the exemplary geographic area in accordance with an embodiment of the present invention.

FIG. 5 illustrates a geographic area 399 which is a modified geographic area 300. The geographic area 399 will be used to explain how to determine, generate and/or calculate the total radio frequency propagation path loss when both the transmitter and receiver are below clutter in accordance with an embodiment of the present invention. In the geographic area 399, a clutter object 315 (e.g., a building) has been placed atop the terrain 311 at point 378. A point 341 at the top of the clutter object 315 has a height of H18 with respect to the terrain point 378 atop which the clutter object 314 is located. The point 341 has a height of H14+H18 with respect to sea level 310. The transmission point 305 is below the clutter object 315. Point 341 is the horizon point from the reception point 305 as it is the first horizon seen from reception point 305. The propagation path from transmitter 302 to receiver 304 includes 330, 332, 334' and 337. The scatter angle 335" will be different than in either the geographic area 300 or 398.

Legend 360' shows an equation 362 for determining the total radio frequency propagation loss from the transmitter T 302 (point of transmission 303) to the receiver R 304 (point of reception 305).

The equation 362 is: Total Propagation Loss=L1+L2+L3+FSL, where L1 is the clutter loss in dB for the portion of the radio frequency signal path 330 (from transmission point 303 to horizon point 340), L2 is the diffraction or tropo-scattering loss in dB for the portion of the radio frequency signal path including 332 and 334' (from horizon point 340 to horizon point 341), L3 is the clutter loss in dB for the portion of the radio frequency signal path 337 (from the horizon point 341 to the reception point 305) and FSL is the Free Space Loss from the transmitter T2 302 to the receiver R 304.

The clutter loss L1 349 is generated, determined and/or calculated as previously described in connection with FIG. 3.

The clutter loss L3 351 is generated, determined and/or calculated using a clutter model from International Telecommunication Union (ITU) Recommendation ITU-R P.2108 entitled, "Prediction of clutter loss" or from the International Telecommunication Union Recommendation ITU-R P.452 entitled Prediction procedure for the evaluation of interference between stations on the surface of the Earth at frequencies above about 100 MHz. ITU-R P.452. The International Telecommunication Union Recommendation ITU-R P.2108-1 which was published in September 2021 is incorporated herein by reference in its entirety. The International Telecommunication Union Recommendation ITU-R P.452-18 which was published in August 2023 is incorporated herein by reference in its entirety.

The diffraction or tropo-scattering loss L2 350" is determined, calculated and/or generated for the portion of the propagation path from the horizon point 340 to the horizon point 341 as previously described in connection with the geographic area 300 for the L2 350 loss. The ITM or Longley Rice propagation path loss model is used with terrain and clutter information for points between the horizon point 340 and horizon point 341. It assumes that the transmitter transmission point is at horizon point 340 and the receiver reception point is at horizon point 341.

The FSL propagation path loss is determined, generated and/or calculated in the same as the FSL loss. The FSL propagation path loss will remain the same as in the geographic area 300.

Once each of the losses L1 349 clutter loss at the transmitter, L2 350" diffraction or tropo-scattering loss, L3 351 clutter loss at the receiver, and FSL loss have determined, calculated and/or generated, the total radio frequency propagation loss is determined, generated and/or calculated by summing or adding up the L1 349, L2 350", L3 351, and FSL losses. As previously described once, the total propagation path loss has been determined for the propagation path from the transmitter 302 T to the receiver 304 R, the information may be used to predict spectrum interference at the receiver and determine and/or make spectrum usage decisions (e.g., based on the total propagation path loss information and/or the predicted spectrum interference which is based on the total propagation path loss information).

When the transmission point of the transmitter is not below the clutter but the receiver is below the clutter, the total propagation path loss equation in such a situation is: Total propagation path loss=L2+L3+FSL, where L2 is the diffraction or tropo-scattering loss from the transmission point of the transmitter to the horizon point as seen from the receiver, L3 is the clutter loss at the receiver, and the FSL loss is the same as previously described. L2 is generated, calculated and/or determined using the ITM or Longley Rice model as previously described. The L3 clutter loss at the receiver is determined for the portion of the propagation path from the horizon point as seen from the receiver to the reception point as previously described. The FSL loss is determined as previously described. For example, if the geographic area 399 where modified so that clutter 306, 307 and 308 had obstruction heights (clutter height+terrain height) which where all below the height of the transmission point 303 and the receiver had a reception point height 305 as shown which is below the clutter 315, then there would be no L1 clutter loss at the transmitter, the L2 loss would be calculated from the transmission point 303 to the horizon point 341, the L3 clutter loss at the receiver would be calculated from the horizon point 341 to the reception point 305 of the receiver 304, and the FSL loss would be calculated from the transmission point 303 to the reception point 305. The total propagation path loss would then generated, calculated and/or determined by summing up or adding up the L2, L3, and FSL losses. The total propagation loss information would then be used as previously described to predict interference at the receiver and to make spectrum usage decisions.

The total propagation path loss in addition to being used to make spectrum usage decision can also be used to determine maximum transmission levels for the transmitting device so as to restrict the predicted amount of spectrum interference at the receiving point to be below a threshold amount.

In addition, the total propagation path loss information can be used in determining base station locations so as to increase and/or maximize wireless coverage while decreasing and/or minimizing interference between base stations.

Figure 6:
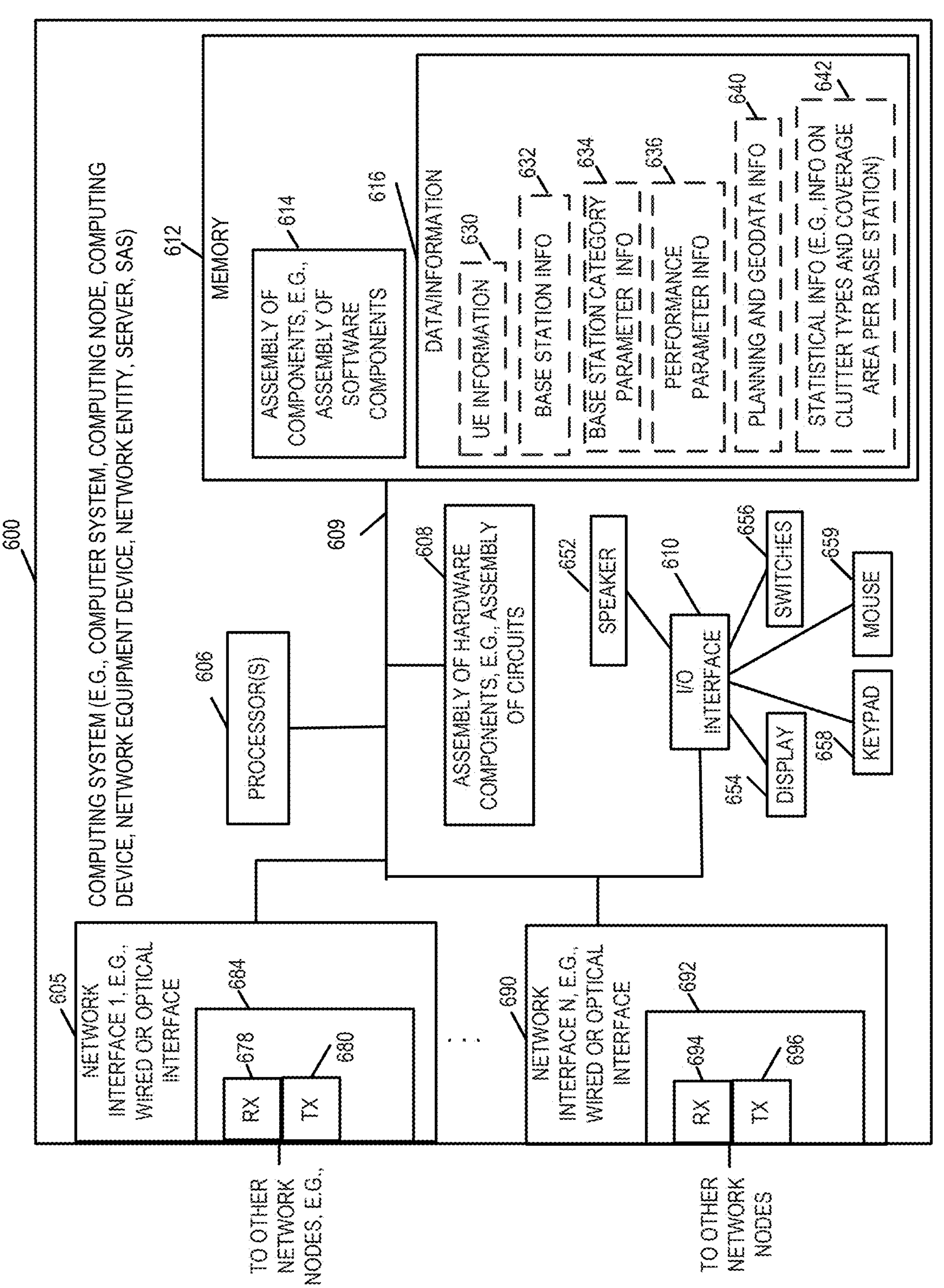
FIG. 6 illustrates an exemplary computing system in accordance with an embodiment of the present invention.
Figure 7:
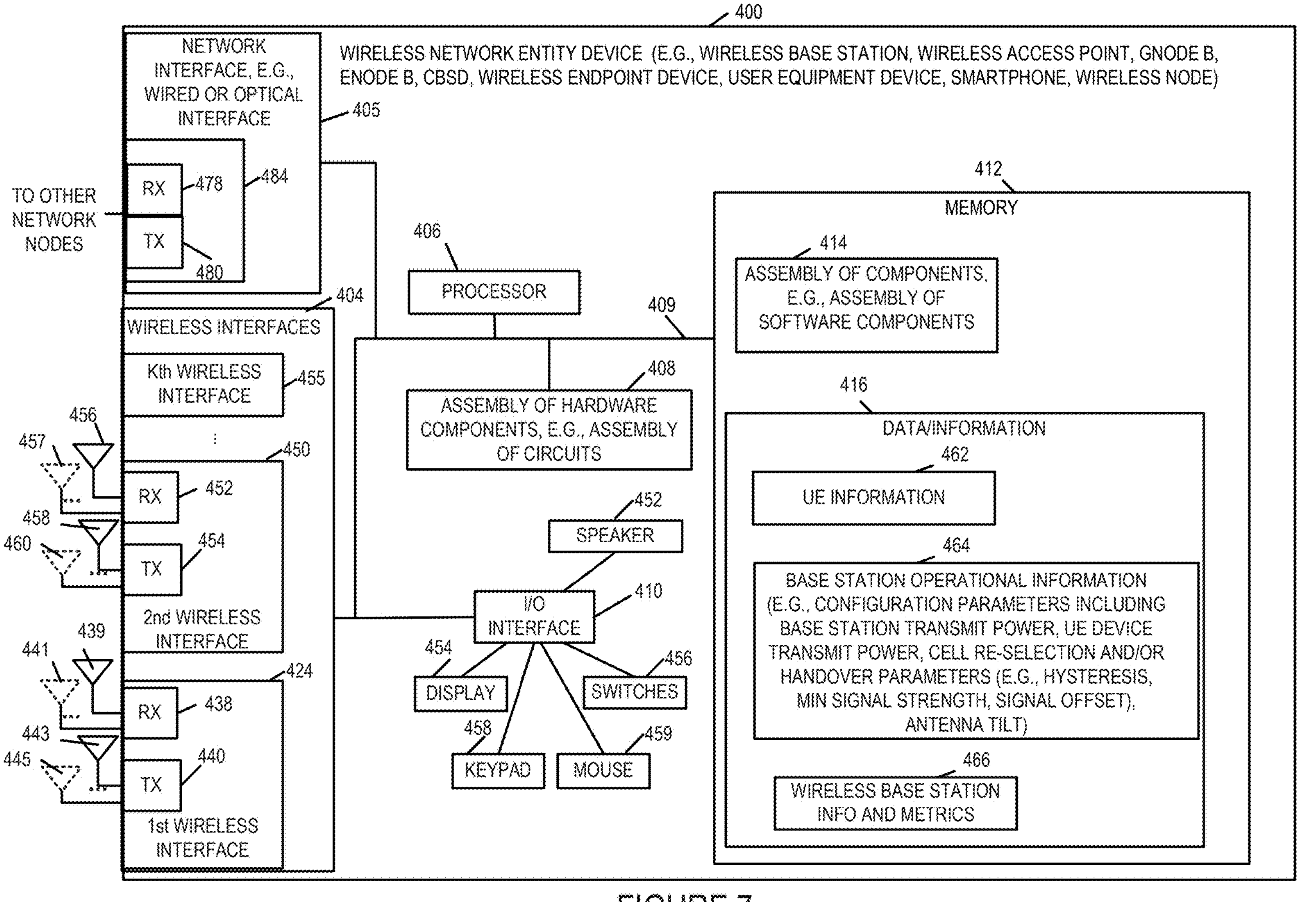
FIG. 7 illustrates a wireless network entity device in accordance with an embodiment of the present invention.
Figure 8:
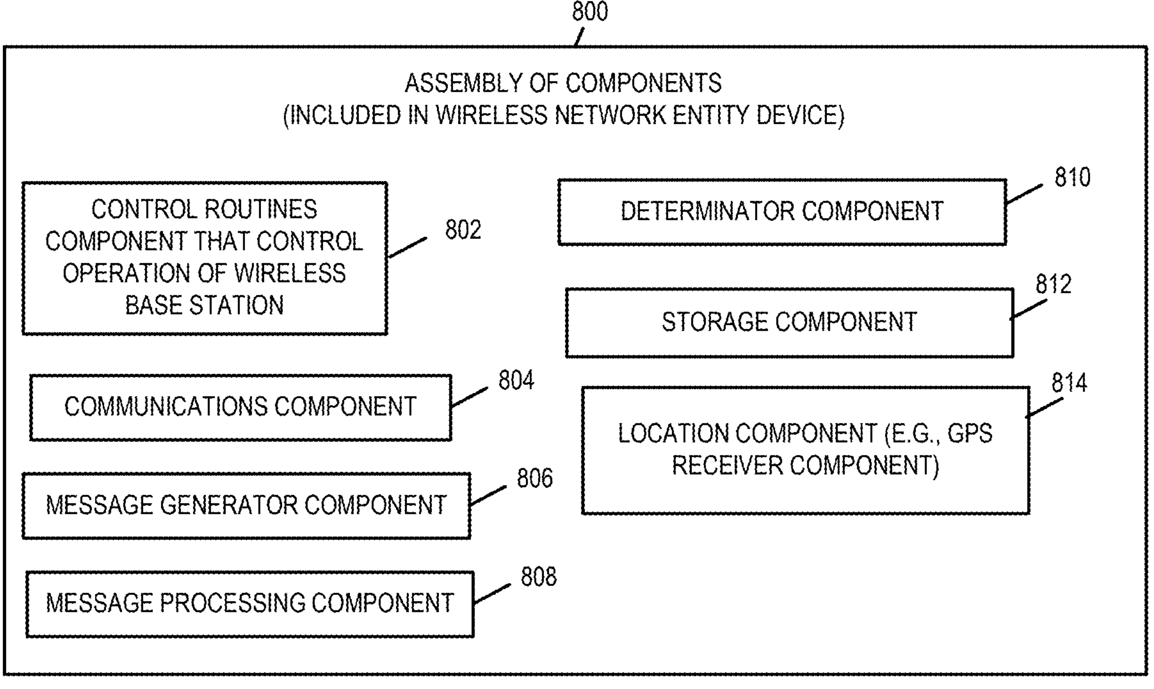
FIG. 8 illustrates an exemplary assembly of components for a wireless network entity device in accordance with an embodiment of the present invention.
Figure 9:
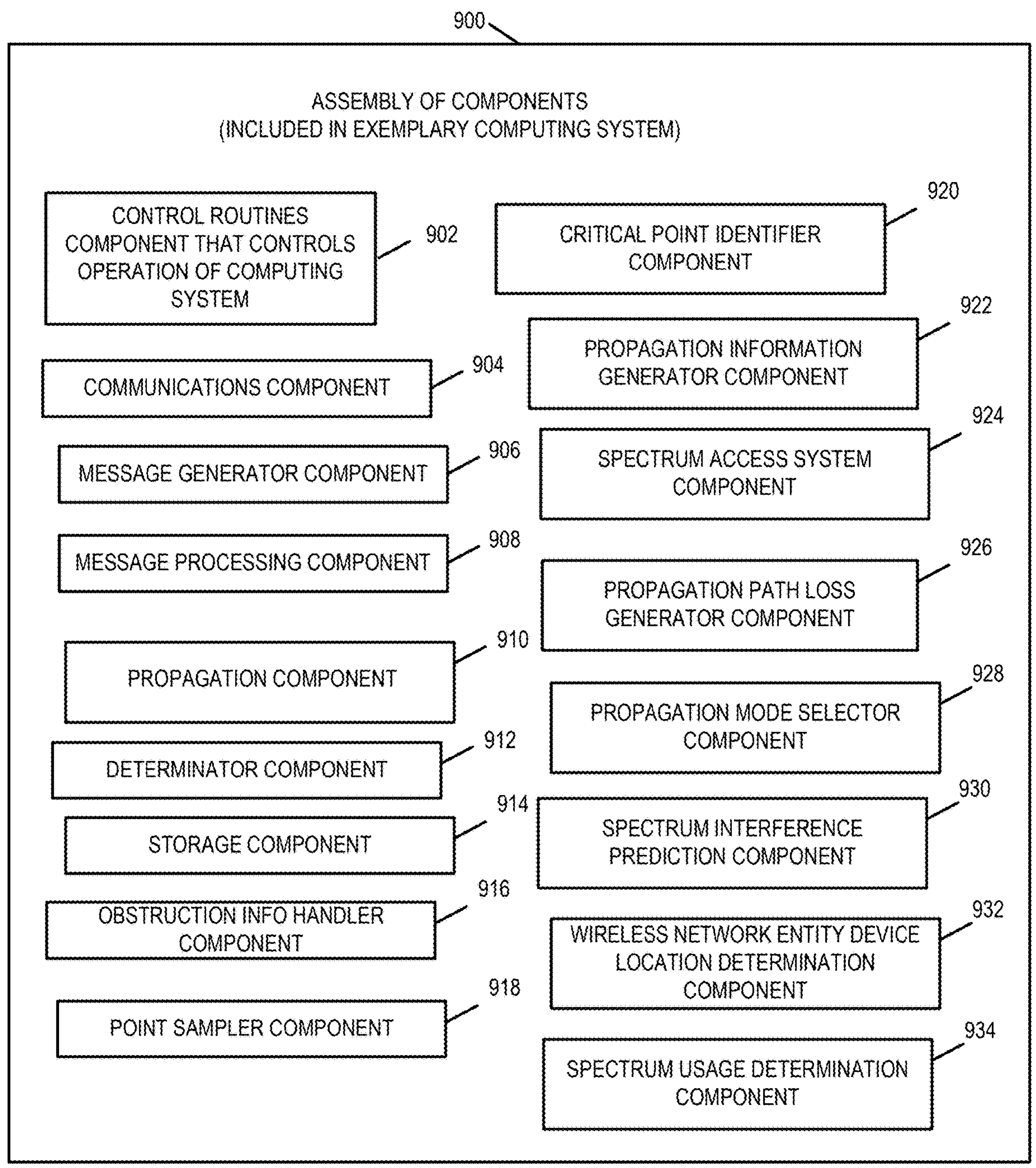
FIG. 9 illustrates an exemplary assembly of components for a computing system in accordance with an embodiment of the present invention.

FIG. 6 which is discussed in further detail below illustrates an exemplary computing system in accordance with an embodiment of the present invention. FIG. 7 which is discussed in further detail below illustrates a wireless network entity device in accordance with an embodiment of the present invention. FIG. 8 which is discussed in detail below illustrates an exemplary assembly of components for a wireless network entity device in accordance with an embodiment of the present invention. FIG. 9 which is discussed in detail below illustrates an exemplary assembly of components for a computing system in accordance with an embodiment of the present invention.

Figure 10A:
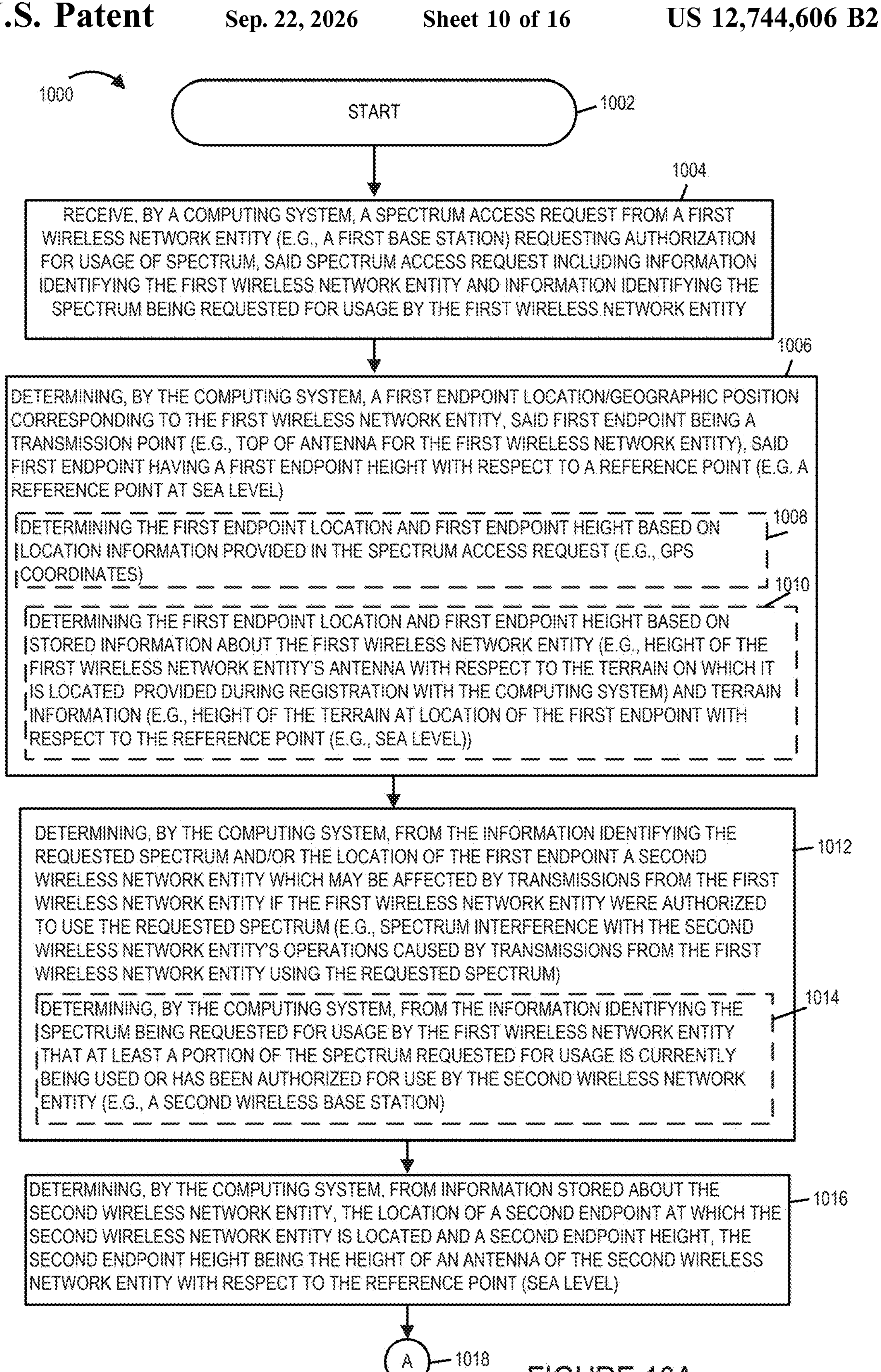
FIG. 10A is the first part of a flowchart of an exemplary method in accordance with an embodiment of the present invention.
Figure 10B:
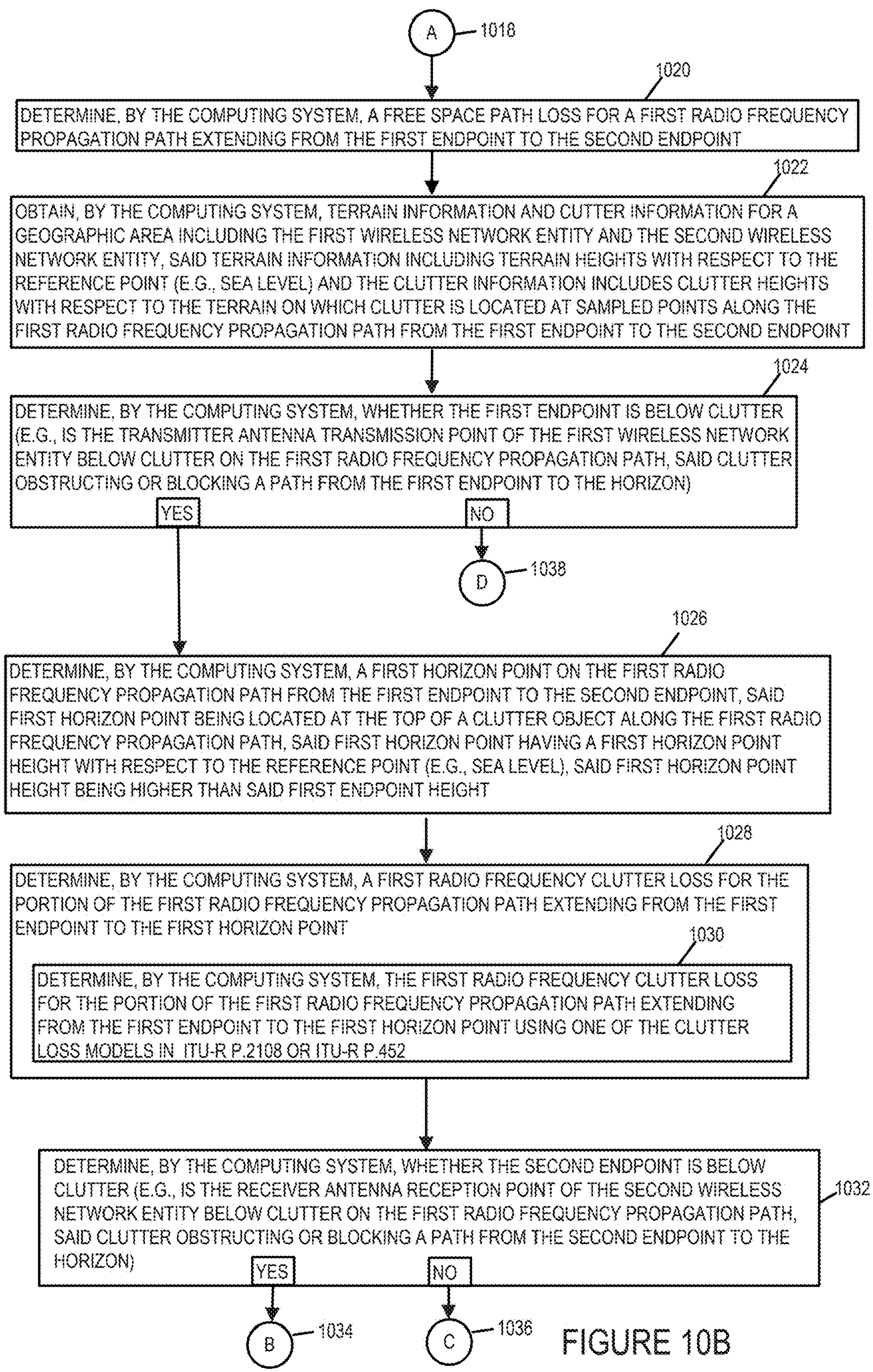
FIG. 10B is the second part of a flowchart of an exemplary method in accordance with an embodiment of the present invention.
Figure 10D:
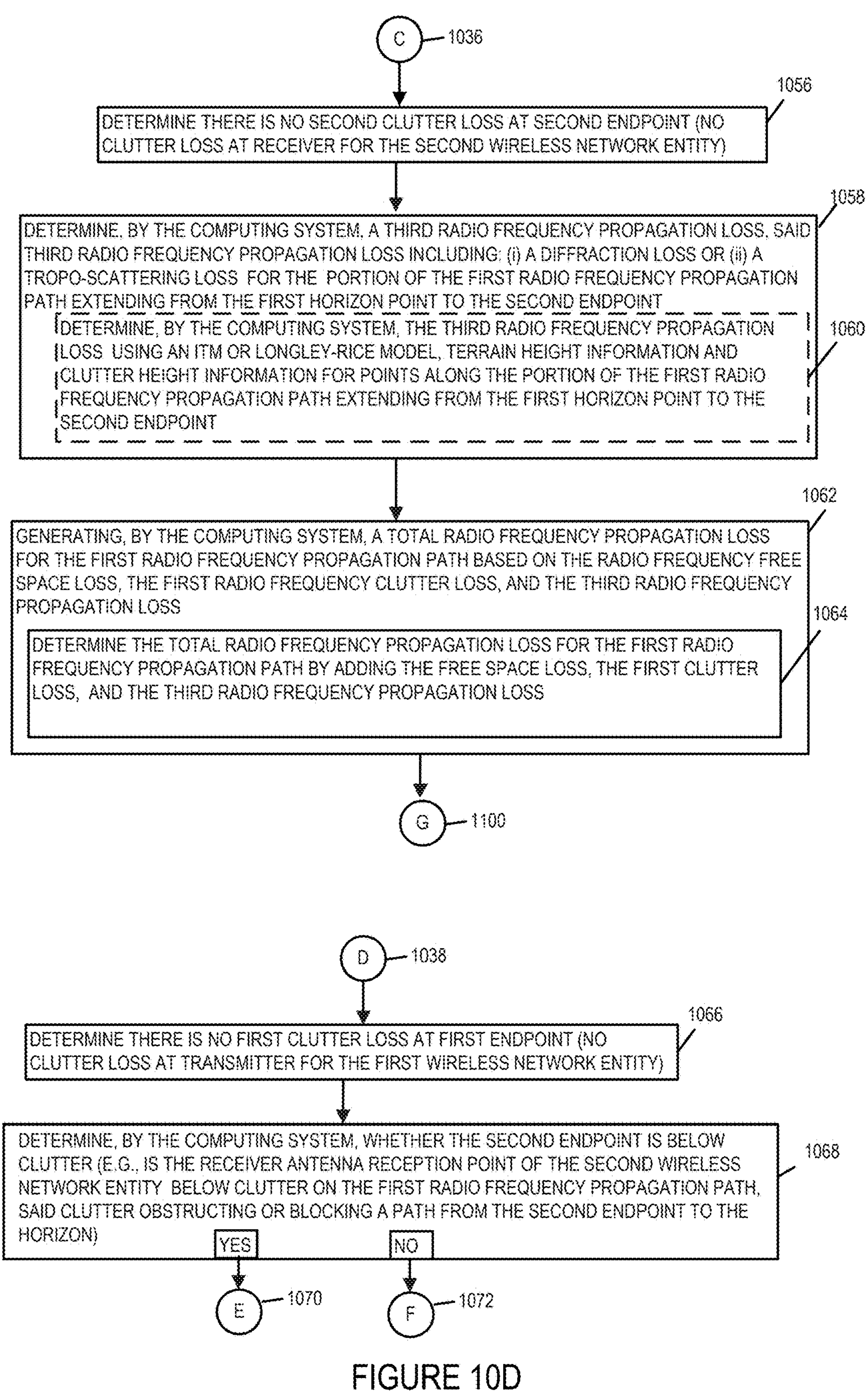
FIG. 10D is the fourth part of a flowchart of an exemplary method in accordance with an embodiment of the present invention.
Figure 10G:
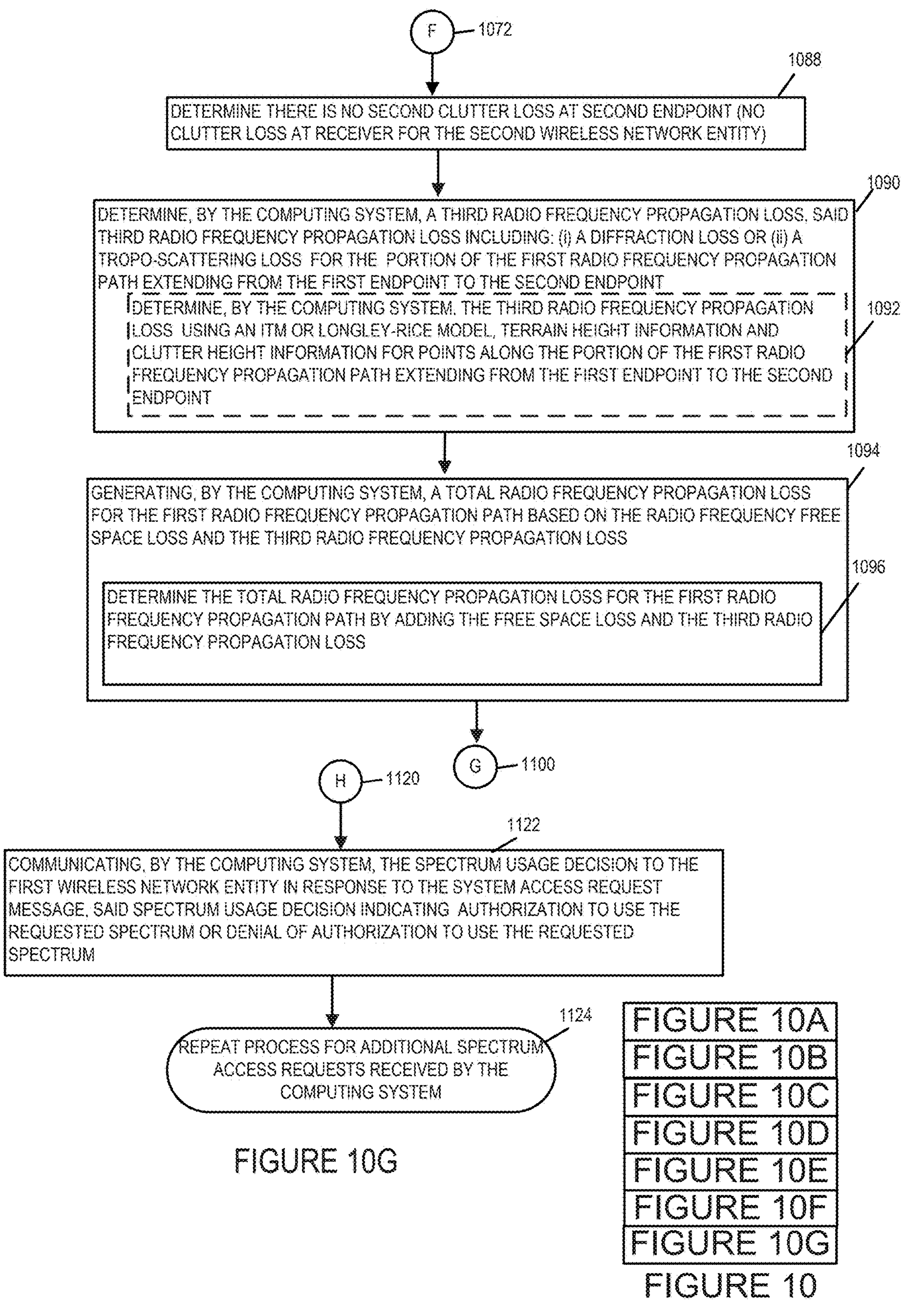
FIG. 10G is a seventh part of a flowchart of an exemplary method in accordance with an embodiment of the present invention.

FIG. 10 comprises FIG. 10A, FIG. 10B, FIG. 10C, FIG. 10D, FIG. 10E, FIGS. 10F, and 10G. FIG. 10A is the first part of a flowchart of an exemplary method 1000 in accordance with an embodiment of the present invention. FIG. 10B is the second part of a flowchart of an exemplary method 1000 in accordance with an embodiment of the present invention. FIG. 10C is the third part of a flowchart of an exemplary method 1000 in accordance with an embodiment of the present invention. FIG. 10D is the fourth part of a flowchart of an exemplary method 1000 in accordance with an embodiment of the present invention. FIG. 10E is the fifth part of a flowchart of an exemplary method 1000 in accordance with an embodiment of the present invention. FIG. 10F is the sixth part of a flowchart of an exemplary method 1000 in accordance with an embodiment of the present invention. FIG. 10G is the seventh part of a flowchart of an exemplary method 1000 in accordance with an embodiment of the present invention.

While it will be readily understood that additional steps are performed in connection with communicating information, data, and messages between devices, the method 1000 focuses on and discusses the steps for understanding the invention. The method 1000 will be discussed in connection with the exemplary system 100 but is not limited to being implemented on system 100 and can be implemented on other systems. The computing system of the method 1000 may be, and in some embodiments is, the computing system 10 of the exemplary environment/system 100 illustrated in FIG. 1. The first wireless network entity in the method 1000 may be, and in some embodiments is, the first wireless network entity device 18 of the exemplary environment/system 100 illustrated in FIG. 1. The second wireless network entity in the method 1000 may be, and in some embodiments is, the base station network entity 30 of the exemplary environment/system 100 illustrated in FIG. 1.

Method 1000 begins in start step 1002 shown on FIG. 10A. Operation proceeds from step 1002 to step 1004. In step 1004, the computing system receives a spectrum access request from a first wireless network entity (e.g., a first base station) requesting authorization for usage of spectrum, said spectrum access request including information identifying the first wireless network entity (e.g., manufacturer ID information and/or registration identifier information) and information identifying the spectrum being requested for usage by the first wireless network entity (e.g., spectrum frequency information, spectrum range, spectrum channel, etc.) Operation proceeds from step 1004 to step 1006.

In step 1006, the computing device determines a first endpoint location/geographic position corresponding to and/or for the first wireless network entity, said first endpoint being a transmission point (e.g., top of an antenna for the first wireless network entity). The first endpoint has a first endpoint height with respect to a reference point (e.g., a reference point at sea level). In some embodiments step 1006 includes one or more sub-steps 1008 and 1010. In sub-step 1008, the computing system determines the first endpoint location and first endpoint height based on location information provided in the spectrum access request (e.g., GPS coordinates, longitudinal, latitude and height of antenna with respect to the terrain on which the first wireless network entity is located). In sub-step 1010, the computing system determines the first endpoint location and first endpoint height based on stored information about the first wireless network entity (e.g., location and height of the first wireless network entity's antenna with respect to the terrain on which it is located provided during registration of the first wireless network entity with the computing system prior to receipt of the spectrum access request at the computing system) and terrain information (e.g., height of the terrain at location of the first endpoint with respect to the reference point (e.g., sea level). Operation proceeds from step 1006 to step 1012.

In step 1012, the computing system determines from the information identifying the requested spectrum and/or the location of the first endpoint a second wireless network entity which may be affected by transmission from the first wireless network entity if the first wireless network entity were authorized to use the requested spectrum (e.g., spectrum interference with the second wireless network entity's operations caused by transmissions from the first wireless network entity using the requested spectrum). In some embodiments, step 1012 includes sub-step 1014. In sub-step 1014, the computing system determines from the information identifying the spectrum being requested for usage by the first wireless network entity that at least a portion of the spectrum requested for usage is currently being used or has been authorized for use by the second wireless network entity (e.g., a second wireless base station). Operation proceeds from step 1012 to step 1016.

In step 1016, the computing system determines from information stored about the second wireless network entity, the location of a second endpoint at which the second wireless network entity is located and a second endpoint height, the second endpoint height being the height of an antenna of the second wireless network entity with respect to the reference point (e.g., sea level). Operation proceeds form step 1016 via connection A 1018 to step 1020 shown on FIG. 10B.

In step 1020, the computing system determines a free space path loss also referred to as a free space loss (FSL) for a first radio frequency propagation path extending from the first endpoint to the second endpoint. Operation proceeds from step 1020 to step 1022. In step 1022, the computing system obtains terrain information and clutter information for a geographic area including the first wireless network entity and the second wireless network entity. The terrain information includes terrain heights with respect to the reference point (e.g., reference point at sea level) and the clutter information includes clutter heights with respect to the terrain on which clutter is located at sampled points along the first radio frequency propagation path from the first endpoint to the second endpoint. Operation proceeds from step 1022 to step 1024.

In step 1024, the computing device determines whether the first endpoint location is below clutter (e.g., is the transmitter antenna transmission point of the first wireless network entity below clutter on the first radio frequency propagation path?) such that the clutter obstructs or blocks a path (e.g., a line of sight path) from the first endpoint to the horizon. When the determination is yes that the first endpoint is located below the clutter then operation proceeds from step 1024 to step 1026. When the determination is no that the first endpoint is not located below the clutter then operation proceeds from step 1024 to step 1066 shown on FIG. 10D via connection node D 1038.

In step 1026, the computing system determines a first horizon point on the first radio frequency propagation path from the first endpoint to the second endpoint. The first horizon point is located at the top of a clutter object along the first radio frequency propagation path. The first horizon point having a first horizon point height with respect to the reference point (e.g., sea level reference point). The first horizon point height being higher than said first endpoint height. In some embodiments, the first horizon endpoint height is determined by adding the clutter height with respect to the terrain at the location of the first horizon point to the terrain height at the location of the first horizon point with respect to the reference point (e.g., sea level). Operation proceeds from step 1026 to step 1028.

In step 1028, the computing system determines a first radio clutter loss for the portion of the first radio frequency propagation path extending from the first endpoint to the first horizon point. In some embodiments, step 1028 includes sub-step 1030. In sub-step 1030, the computing system determines the first radio frequency clutter loss for the portion of the first radio frequency propagation path extending from the first endpoint to the first horizon point using and/or based on one or more of the clutter models in ITU-R P.2108 or ITU-R P.452. Operation proceeds from step 1028 to step 1032.

In step 1032, the computing device determines whether the second endpoint is below clutter (e.g., is the receiver antenna reception point of the second wireless network entity below clutter on the first radio frequency propagation path such that the clutter obstructs or blocks a path (e.g., a line of sight path) from the second endpoint to the horizon looking in the direction of the first endpoint. When the answer is yes that the second endpoint is below clutter then operation proceeds from step 1032 via connection node B 1034 to step 1040 shown on FIG. 10C. When the answer is no that the second endpoint is not below clutter then operation proceeds from step 1032 via connection node C 1036 to step 1056 shown on FIG. 10D.

In step 1040, the computing system determines a second horizon point on the first radio frequency propagation path from the first endpoint to the second endpoint. The second horizon point is located at the top of a clutter object along the first radio frequency propagation path and is determined from the perspective of the second endpoint line of sight to the horizon looking along the first radio frequency propagation path toward the first endpoint. The second horizon point having a second horizon point height with respect to the reference point (e.g., sea level). The second horizon point height is higher than second endpoint height. The second horizon point height is determined in some embodiments, by adding the clutter height of the clutter object on which the second horizon point is located to the terrain height on which the clutter object is situated or located. The terrain height being with respect to the reference point and the clutter height being respect to the terrain. Operation proceeds from step 1040 to step 1042.

In step 1042, the computing system determines a second clutter loss for the portion of the first radio frequency propagation path extending from the second horizon point to the second endpoint. In some embodiments, step 1042 includes sub-step 1044. In sub-step 1044, the computing system determines the second radio frequency clutter loss for the portion of the first radio frequency propagation path extending from the second horizon point to the second endpoint using and/or based on one or more of the clutter loss models in ITU-R P.2108 or ITU-R P.452. Operation proceeds from step 1042 to step 1046.

In step 1046, the computing system determines a third radio frequency propagation loss, said third radio frequency propagation loss being for the portion of the first radio frequency propagation path extending from the first horizon point to the second horizon point. The third radio frequency propagation loss including: (i) a diffraction loss or (ii) a tropo-scattering loss for the portion of the first radio frequency propagation path extending from the first horizon point to the second horizon point. In some embodiments, step 1046 includes sub-step 1048. In sub-step 1048, the computing system determines the third radio frequency propagation loss using and/or based on an ITM or Longley-Rice model, terrain height information and clutter height information for points along the portion of the first radio frequency propagation path extending from the first horizon point to the second horizon point. Operation proceeds from step 1046 to step 1050.

In step 1050, the computing system generates a total radio frequency propagation loss for the first radio frequency propagation path based on the radio frequency free space loss, the first radio frequency clutter loss, the second radio frequency clutter loss, and the third radio frequency propagation loss. In some embodiments, step 1050 includes sub-step 1052. In sub-step 1052, the total radio frequency propagation loss for the first radio frequency propagation path is determined, generated and/or calculated by adding the free space loss, the first clutter loss, the second clutter loss, and the third radio frequency propagation loss together. Operation proceeds from step 1050 via connection node G 1100 to step 1102 shown on FIG. 10F.

In step 1056 shown on FIG. 10D, the computing device determines there is no second clutter loss at the second endpoint (i.e., no clutter loss at the receiver for the second wireless network entity). Operation proceeds from step 1056 to step 1058. In step 1058, the computing device determines a third radio frequency propagation loss for the portion of the first radio frequency propagation path extending from the first horizon point to the second endpoint, said third radio frequency propagation loss including: (i) a diffraction loss or (ii) a tropo-scattering loss for the portion of the first radio frequency propagation path extending from the first horizon point to the second endpoint. In some embodiments, step 1058 includes sub-step 1060. In sub-step 1060, the computing system determines the third radio frequency propagation loss using and/or based on an ITM or Longley-Rice model, terrain height information and clutter height information for points along the portion of the first radio frequency propagation path extending from the first horizon point to the second endpoint. Operation proceeds from step 1068 to step 1062.

In step 1062, the computing system generates a total radio frequency propagation loss for the first radio frequency propagation path based on the radio frequency free space loss, the first radio frequency clutter loss, and the third radio frequency propagation loss. In some embodiments, the step 1062 includes sub-step 1064. In sub-step 1064, the computing device generates, determines and/or calculates the total radio frequency propagation loss for the first radio frequency propagation path by adding the free space loss, the first clutter loss, and the third radio frequency propagation loss together. Operation proceeds from step 1062 via connection node G 1100 to step 1102 shown on FIG. 10F.

In step 1066 shown on FIG. 10D, the computing system determines that there is no first clutter loss at the first endpoint (i.e., there is no clutter loss at the transmitter for the first wireless network entity). Operation proceeds from step 1066 to step 1068.

In step 1068, the computing device determines whether the second endpoint is below clutter (e.g., is the receiver antenna reception point of the second wireless network entity below clutter on the first radio frequency propagation path such that the clutter obstructs or blocks a path (e.g., a line of sight path) from the second endpoint to the horizon looking in the direction of the first endpoint. When the answer is yes that the second endpoint is below clutter then operation proceeds from step 1068 via connection node E 1070 to step 1074 shown on FIG. 10E. When the answer is no that the second endpoint is not below clutter then operation proceeds from step 1068 via connection node F 1072 to step 1088 shown on FIG. 10G.

In step 1074, the computing system determines a second horizon point on the first radio frequency propagation path from the first endpoint to the second endpoint. The second horizon point is located at the top of a clutter object along the first radio frequency propagation path and is determined from the perspective of the second endpoint line of sight to the horizon looking along the first radio frequency propagation path toward the first endpoint. The second horizon point having a second horizon point height with respect to the reference point (e.g., sea level). The second horizon point height is higher than second endpoint height. The second horizon point height is determined in some embodiments, by adding the clutter height of the clutter object on which the second horizon point is located to the terrain height on which the clutter object is situated or located. The terrain height being with respect to the reference point and the clutter height being respect to the terrain. Operation proceeds from step 1074 to step 1076.

In step 1076, the computing system determines a second clutter loss for the portion of the first radio frequency propagation path extending from the second horizon point to the second endpoint. In some embodiments, step 1076 includes sub-step 1078. In sub-step 1078, the computing system determines the second radio frequency clutter loss for the portion of the first radio frequency propagation path extending from the second horizon point to the second endpoint using and/or based on one or more of the clutter loss models in ITU-R P.2108 or ITU-R P.452. Operation proceeds from step 1076 to step 1080.

In step 1080, the computing system determines a third radio frequency propagation loss, said third radio frequency propagation loss being for the portion of the first radio frequency propagation path extending from the first endpoint to the second horizon point. The third radio frequency propagation loss including: (i) a diffraction loss or (ii) a tropo-scattering loss for the portion of the first radio frequency propagation path extending from the first endpoint to the second horizon point. In some embodiments, step 1080 includes sub-step 1082. In sub-step 1082, the computing system determines the third radio frequency propagation loss using and/or based on an ITM or Longley-Rice model, terrain height information and clutter height information for points along the portion of the first radio frequency propagation path extending from the first endpoint to the second horizon point. Operation proceeds from step 1080 to step 1084.

In step 1084, the computing system generates a total radio frequency propagation loss for the first radio frequency propagation path based on the radio frequency free space loss, the second radio frequency clutter loss, and the third radio frequency propagation loss. In some embodiments, step 1084 includes sub-step 1086. In sub-step 1086, the total radio frequency propagation loss for the first radio frequency propagation path is determined, generated and/or calculated by adding the free space loss, the second clutter loss, and the third radio frequency propagation loss together. Operation proceeds from step 1084 via connection node G 1100 to step 1102 shown on FIG. 10F.

In step 1088 shown on FIG. 10G, the computing system determines that there is no second clutter loss at the second endpoint (i.e., no clutter loss at the receiver for the second wireless network entity). Operation proceeds from step 1088 to step 1090. In step 1090, the computing device determines a third radio frequency propagation loss. The third radio frequency propagation loss being for the portion of the first radio frequency propagation path extending from the first endpoint to the second endpoint and including: (i) a diffraction loss, or (ii) a tropo-scattering loss for the portion of the first radio frequency propagation path extending from the first endpoint to the second endpoint. In some embodiments, step 1090 includes sub-step 1092. In sub-step 1092, the computing system determines the third radio frequency propagation loss using and/or based on an ITM or Longley-Rice model, terrain height information and clutter height information for points along the portion of the first radio frequency propagation path extending from the first endpoint to the second endpoint. Operation proceeds from step 1090 to step 1094.

In step 1094, the computing system generates a total radio frequency propagation loss for the first radio frequency propagation path based on the radio frequency free space loss and the third radio frequency propagation loss. In some embodiments, the step 1094 includes sub-step 1096. In sub-step 1096, the computing device generates, determines and/or calculates the total radio frequency propagation loss for the first radio frequency propagation path by adding the free space loss and the third radio frequency propagation loss together. Operation proceeds from step 1094 via connection node G 1100 to step 1102 shown on FIG. 10F.

In step 1102 shown on FIG. 10F, the computing system makes a spectrum usage decision based on the generated total radio frequency propagation loss for the first radio frequency propagation path (e.g., a decision to authorize or deny (i.e., not authorize) usage of the requested spectrum by the first wireless network entity. In some embodiments, step 1102 includes one or more sub-steps 1104, 1106, 1108, 1110, 1112, 1114, 1116, 1118. In sub-step 1104, the computing system determines a predicted amount of spectrum interference based on the total radio frequency propagation loss. In sub-step 1106, the computing system determines whether the predicted amount of spectrum interference is below a first interference threshold level. In sub-step 1108, the computing system (e.g., the SAS component of the computing system) determines to authorize the use of the requested spectrum by first wireless network entity when the predicted amount of spectrum interference is below the first interference threshold level. In sub-step 1110, the computing system determines not to authorize use of the requested spectrum by the first wireless network entity when the predicted amount of spectrum interference is not below the first interference threshold level.

In sub-step 1112, the computing system determines a predicted amount of spectrum interference, based on the total radio frequency propagation, that will occur at the second endpoint and/or which the second wireless network entity will experience from radio frequency transmission emanating from the first endpoint at which the first wireless network entity is located. The radio frequency transmissions using the requested spectrum (e.g., the portion of the requested spectrum also being used and/or authorized for use by the second wireless network entity). In sub-step 1114, the computing system determines a predicted amount of spectrum interference, based on the total radio frequency propagation loss, that will occur at the first endpoint and/or which the first wireless network entity will experience from transmission emanating from the second endpoint at which the second wireless network entity is located. In sub-step 1116, the computing system determines whether or not to authorize the first wireless network entity to use the requested spectrum based on: (i) the predicted amount of interference at the first endpoint (e.g., from radio frequency transmission emanating from the second wireless network entity at the second endpoint), (ii) the predicted amount of spectrum interference at the second endpoint (e.g., from transmissions from the first wireless network entity at the first endpoint, or (iii) the predicted amount of spectrum interference at the both first endpoint and the second endpoint.

In sub-step 1118, the computing system determines to authorize the first wireless network entity to use the requested spectrum (e.g., for communications with one or more other wireless network entities such as for example user equipment devices when the first wireless network entity is a first wireless base station) when both: (i) the predicted amount of spectrum interference at the second endpoint is below a first threshold level of interference and (ii) predicted amount of spectrum interference at the first endpoint is below a second threshold level of interference. The first and second threshold levels of interference may be, and in some embodiments, are the same. The first and second threshold levels of interference may be, and in some embodiments, are different. In some embodiments, whether the first and second threshold levels are the same or different depends on tier or priority of the first wireless network and the second wireless network entity. The first threshold level in some embodiments is higher for wireless network entities belonging to a higher tier or priority grouping (e.g., incumbent user devices being in a higher tier or priority grouping than priority access licensee user devices). Operation proceeds from step 1102 via connection node H 1120 to step 1122 shown on FIG. 10G.

In step 1122, the computing device communicates the spectrum usage decision to the first wireless network entity in response to the system access request message. The spectrum usage decision indicating authorization to use the requested spectrum or denial of authorization to use the requested spectrum. In some embodiments, the spectrum usage decision also includes a maximum transmission power that may be used when transmitting using the requested spectrum. The maximum transmission power being determined by the computing device based on the total radio frequency propagation loss for the first radio frequency propagation loss. The maximum transmission power being determined to avoid spectrum interference at the second endpoint from exceeding a spectrum interference threshold level. Operation proceeds from strep 1122 to step 1124. In step 1124, the process is repeated for addition spectrum access requests received by the computing system (e.g., addition spectrum access requests from the first wireless network entity).

It is to be understood that while the method 1000 only addresses potential interference at a second endpoint, the computing system may identify other wireless network entities that may be affected by the first wireless network entity using the requested spectrum and the computing system may determine for each of these other wireless network entities that may be affected a total propagation path loss for a propagation path from the first endpoint to a reception endpoint at each of the other wireless network entities and make the spectrum usage decision based on predicted amount of spectrum interference at each of these other reception endpoints of the other wireless network entities.

When an exemplary method 1000 is implemented in a shared wireless spectrum network it improves the spectral efficiency as well as the operation of the wireless network by being able to more accurately predict the degree, amount and/or level of spectral interference between wireless network entities and those not have to use spectrum interference analysis which ignores and/or minimizes the affect of clutter and terrain.

FIG. 6 is a drawing of an exemplary computing system/device (e.g., computer system, compute node, network equipment device, network entity, system, server, node, Spectrum Access System, Propagation Path Loss Determination System, Spectrum Interference Determination/Prediction System) in accordance with an embodiment of the present invention.

The computing system/device 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing system/device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the computing system/device 600. Network interface 605 includes a receiver 678 and a transmitter 680. The network interface 605 is typically used to communicate with other devices, e.g., core network equipment, OSS, databases, wireless base stations, network management system, planning and geodata server, statistical calculation server, performance parameter application server, performance data feedback collector server, decision tree server, cloud system. In some embodiments, receiver 678 and transmitter 680 are part of a transceiver 684. Network interface 690 includes a receiver 694 and a transmitter 696. The network interface 690 is typically used to communicate with other devices, e.g., network nodes in a core, wireless base stations, OSS elements, cloud system, servers, etc. In some embodiments, receiver 694 and transmitter 696 are part of a transceiver 692. Memory 612 includes an assembly of component 614, e.g., an assembly of software components, and data/information 616. Data/information 616 includes UE (or wireless device) information 630, wireless base station information 632, base station category parameter information 634, performance parameter and metrics information 636, planning and geodata server information (e.g., propagation model(s) and geographical information including clutter information) 640, statistical information (e.g., information and/or analysis of clutter types, signaling information, user equipment location/density per coverage area per base station) 642. The specific information included in data/information 616 depends on the specific network equipment device implemented. For example, planning and geodata information such as clutter type per location for the wireless system's coverage area would be included if the network equipment device was a planning and geodata server but would not be included if the network equipment device was a decision tree server. In some embodiments, the computing system 600 also includes a wireless interface through which it can communicate with other devices for example through which it can obtain information (e.g., terrain and clutter information), spectrum access requests for spectrum usage, and communicate responses to spectrum access requests for spectrum usage.

In some embodiments, the computing system/devices/entities discussed in the Figures and/or in connection with the embodiments of the present invention described are implemented in accordance with computing system/device 600. For example, the computing system 10, may be, and in some embodiments is, implemented in accordance with the computing system/device 600. In such embodiments, the processor device(s) 12 are the processor(s) 606 of computing system 600. The propagation module 16, objection information handler 24, point sampler 2, critical point identifier 40, propagation information generator 44, and Spectrum Access System 22 of computing system 10 are implemented as software components 616, hardware components 608, and/or a combination of software components 616 and hardware components 608. The memory 16 is memory 612 of computing system 600. While various types of information are disclosed in computing system 10 as being stored in the memory 16, one or more pieces of information may be, and in some embodiments is, stored in a separate storage device (e.g., a database server). For example, topographic information and clutter information may be, and in some embodiments is, stored in a separate database which responds to queries from the computing system when the information for a specific propagation path or geographic area is needed. Parameters and formulas for calculating, determining and/or generating propagation path losses between locations, e.g., fixed locations of the base stations, in a geographic area, antenna heights, elevation angle of transmission point above sea level, obstruction heights along propagation paths between fixed location base station, etc. may be stored in advance so that only spectrum information needs to be inputted in the propagation model to determine a propagation loss. In some embodiments, the propagation path loss formulas are determined in advance using known location information of transmission points and reception points of fixed locations wireless network entity devices (e.g., base stations), terrain information, and clutter information along the radio frequency propagation paths so that upon receipt of a request for spectrum usage identifying the spectrum frequency, channel, and/or band for usage, an identified frequency (e.g., center frequency of requested spectrum) can be input into the formula and a propagation path loss (e.g., a total propagation path loss) can be determined for the fixed location wireless network entity devices (e.g., base stations) without performing the steps of obtaining and/or generating obstruction information, topographic information, clutter information, critical point identification information along a propagation path between the fixed location wireless network entities as these steps will have been performed in advance. The computing system 10 can include a monitoring module or component which monitors for updates to clutter information and/or terrain information (e.g., release of updated survey information in the NCLD) and in response learning of updated information availability obtaining the updated information and re-calculating the total propagation path loss formulas using the updated information.

FIG. 7 is a drawing of an exemplary wireless network entity device 400 (e.g., a wireless base station, wireless node, wireless device) in accordance with an exemplary embodiment. The wireless network entity device 400 may be, and in some embodiments is an eNodeB, gNodeB, Citizens Broadband Radio Service Device (CBSD), a wireless user equipment device, radar system, in accordance with an exemplary embodiment. Exemplary wireless network entity device 400 includes wireless interfaces 404, a network interface 405, e.g., a wired or optical interface, a processor 406, e.g., a CPU, an assembly of hardware components 408, e.g., an assembly of circuits, and I/O interface 410, and memory 412 coupled together via a bus 409 over which the various elements may interchange data and information. Wireless network entity device 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless network entity device 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455, K being an integer greater than 2. The wireless interfaces are used to communicate with the wireless devices, e.g., user equipment device. The first wireless interface 424 is used for example to communicate with a first user equipment device using a first spectrum band. The second wireless interface can be used to communicate with a second user equipment device using a second spectrum band. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, receive antenna M 441), via which wireless network entity device 400 can receive wireless signals from other wireless communications devices including a second wireless communications device, e.g., a user equipment device. Wireless transmitter 440 is coupled to a plurality of wireless transmit antennas (transmit antenna 1 443, . . . , transmit antenna N 445) via which the wireless network entity device 400 can transmit signals to other wireless communications devices including a second wireless communications device, e.g., a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless network entity device 400 can receive wireless signals from other wireless communications devices including a second wireless communications device, e.g., a UE device, using the same or a different wireless protocol than the first wireless interface. Wireless transmitter 454 is coupled to one or more wireless transmit antennas (transmit antenna 1 458, . . . , transmit antenna N 460) via which the wireless network entity device 400 can transmit signals to other wireless communications devices including a second wireless communications device, e.g., UE device. The wireless base station network interface 405 may be coupled to a cable modem, a core network, other networks, e.g., internet, or other wireless base stations. In some embodiments, the wireless network entity device 400 includes multiple network interfaces so that it can connect to multiple networks (e.g., a cable network and a core network) via the different interfaces.

Memory 412 includes an assembly of components 414, e.g., an assembly of software components, and data/information 416. Data/information 416 includes UE information 462 (e.g., wireless device information including location information and configuration parameters, session information, reporting signaling information, reported performance metrics) for the UE devices to which it is providing services, wireless base station operational information 464 (e.g., set of configuration parameters used for operating the wireless base station including for example base station transmit power level (e.g., max power level), user equipment device transmit power level (e.g., UE max transmission power level), cell reselection and/or handover parameters (e.g., hysteresis, minimum signal strength, signal offset), and antenna tilt information, spectrum information (e.g., spectrum such as CBRS spectrum to use for wireless communications with UE devices when the wireless base station is a CBRS wireless base station). The data/information 416 also includes wireless base station information and metrics (e.g., wireless base station performance metrics collected and reported to the OSS of the wireless system such as for example successful connections, failed connections, successful handovers, failed handovers, signaling information such as signaling interference information, etc.). In some embodiments, wireless network entity device 400 includes a software and/or hardware a control routines component which controls the operation of the wireless network entity device. In some embodiments, the wireless network entity device 400 includes a Global Position System (GPS) receiver component which generates GPS coordinates corresponding to the location of the wireless network entity device 400.

While the details of the first and second wireless interfaces are shown, the other wireless interfaces of the wireless base station, e.g., wireless interface K where K is an integer greater than 2 also include multiple receivers and transmitters so that the wireless network entity device 400 can provide wireless services to for example a plurality of wireless devices such as user equipment devices. In some embodiments, one or more of the wireless base stations discussed and/or shown in the Figures and/or in connection with the methods discussed herein are implemented in accordance with the wireless network entity device 400. For example, the first wireless network entity device 18, second wireless network entity device 58, third wireless network entity device 59, and base station network entity 30 of exemplary environment/system 100 of FIGS. 1 and 2 may be, and in some embodiments are, implemented in accordance with the wireless network entity device 400. In some embodiments, the transmitter 302 and receiver 304 of FIGS. 3, 4, and 5 are part of a wireless network entity device implemented in accordance with wireless network entity device 400.

FIG. 8 is a drawing of an exemplary assembly of components 800 which may be included in an exemplary wireless network entity device (e.g., exemplary wireless network entity device 400 of FIG. 7), in accordance with an exemplary embodiment. The components in the assembly of components 800 can, and in some embodiments are, implemented fully in hardware within a processor, e.g., processor 406, e.g., as individual circuits. The components in the assembly of components 800 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless network entity device 400, with the components controlling operation of wireless network entity device 400 to implement the functions corresponding to the components when the components are executed by a processor e.g., processor 406. In some such embodiments, the assembly of components 800 is included in the memory 412 as assembly of software components 414. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 800 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the wireless network entity device 400 or elements therein such as the processor 406, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a storage component 812, and a location determination component (e.g., a GPS receiver component) 814.

The control routines component 802 is configured to control operation of the wireless network entity device (e.g., base station, smartphone, wireless access point, gNodeB, eNodeB, CBSD, wireless node, etc.).

The communication component 704 is configured to handle communications, e.g., transmission and reception of messages, and protocol signaling for the wireless network entity device (e.g., communications with other wireless devices and other network equipment (e.g., Spectrum Access System), components, functions, devices, and servers in its network, other networks and/or OSS).

The message generator component 806 is configured to generate messages for transmission to other devices, e.g., spectrum access request messages, heartbeat request messages, spectrum usage request messages, response messages, notification messages, messages for sharing information (e.g., spectrum channels to utilize and power transmission instructions such as maximum transmission power levels), communications messages with network equipment devices, communications messages with user equipment devices. In some embodiments, the message generator component 806 is a sub-component of the communications component 804.

The message processing component 808 is configured to process messages received from other devices and implement operations in response to instructions and/or information included in the processed message, e.g., processing and implementing operations in connection with messages authorizing or denying access and/or usage of spectrum. In some embodiments, the message processing component 808 is a sub-component of the communications component 804.

The determinator component 810 is configured to make determinations and decisions for the wireless network entity device including for example: determining what spectrum range and/or channels to request for utilization, determining whether a response indicates authorization to utilize requested spectrum, determination of whether a response indicates denial of authorization to utilize requested spectrum.

The storage component 812 is configured to manage the storage, and retrieval of data and/or instructions to/and from memory, buffers in memory, hardware buffers and/or storage device coupled and/or connected to the wireless base station such as for example, obstruction information, clutter information, terrain information, high-fidelity obstruction height information, critical point information, propagation information (e.g., propagation path loss models, formulas, equations, determined/calculated/generated propagation path loss for portions of propagation paths and/or total propagation path loss for propagation paths, clutter propagation path losses, diffraction propagation path losses, tropo-scattering paths), predicted spectrum interference information), path loss information (e.g., determined/calculated/generated propagation path loss for portions of propagation paths and/or total propagation path loss for propagation paths, clutter propagation path losses, diffraction propagation path losses, tropo-scattering paths), authorized spectrum usage information).

The location component 814 can determine the location of the wireless network entity device and provide the information with spectrum access and/or usage requests and/or in response to queries received for the location of the wireless network entity device. In some embodiments, the location component 814 determines the information from GPS coordinates received from a GPS receiver. In some embodiments, the location component 814 is a GPS receiver component that determines GPS coordinates for the device from received GPS signals. In some embodiments, the location component device 814 determines its location from registration information (e.g., CBSD registration information which include location information, antenna height, etc. stored in its memory for registering with an SAS).

FIG. 9 is a drawing of an exemplary assembly of components 900 which may be included in a computing system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the computing system 600, with the components controlling operation of the computing system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the computing system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a propagation component 910, a determinator component 912, a storage component 914, an obstruction information handler component 916, a point sampler component 918, a critical point identifier component 920, aa propagation information generator component 922, a spectrum access system component 924, a propagation path loss generator component 926, a propagation mode selector component 928, a spectrum interference prediction component 930, a wireless network entity device location determination component 932, and a spectrum usage determination component 934.

The control routines component 902 is configured to control operation of the computing system. The communication component 904 is configured to handle communications, e.g., transmission and reception of messages, and protocol signaling for the computing system. The message generator component 906 is configured to generate messages for transmission to other devices. Exemplary messages which are generated include spectrum access response messages which includes decisions on spectrum usage and response to spectrum access/usage requests. The message processing component 908 is configured to process messages and implement procedures/operations in response to messages or based on the contents of messages. This includes messages received from other devices, e.g., messages from wireless network entities, UEs, wireless base stations, core network, OSS, geographical mapping databases.

The propagation component 910 performs the operations for generating and/or determining a total propagation loss between two endpoints and/or a prediction of a degree/amount/level of spectrum interference based on the determined total propagation loss. The propagation component 910 further performs the operations described in connection with the propagation module 16 of system 10.

The determinator component 912 is configured to make determinations and decisions for the system including for example: determining point heights, critical points, sampled points, clutter losses, Free Space Loss for path, ITM propagation loss for a path and/or a portion of radio frequency propagation path (e.g., using point data, critical point data, obstruction height data, terrain and clutter information), total propagation loss for a radio reference propagation path between two endpoints, determine whether or not to authorize use of spectrum, determine horizon points, determine critical points along a propagation path, determine heights of points and/or clutter with respect to a reference point, determine height of terrain with respect to a reference point, determine high fidelity obstruction information).

The storage component 914 is configured to manage the storage, and retrieval of data and/or instructions to/and from memory, and/or storage devices e.g., storage and retrieval of geographical information, terrain information, clutter information, spectrum usage information, wireless network entity devices information such as for example (identity, location, antenna height, spectrum authorized to use, device type, device owner type (tier or priority for spectrum usage (e.g., incumbent, priority access licensee, general authorized access), high fidelity obstruction height information, propagation information (e.g., propagation loss information for a path between two endpoints), path loss information, propagation model information (e.g., ITM model), spectrum usage by device with spectrum to managed spectrum, etc.)

The obstruction information handler component 916 performs the operations described in connection with the obstruction information handler 24 of computing system 10. The point sampler component 918 performs the operations described in connection with the point sampler 32 of computing system 10. The critical point identifier component 920 performs the operations described in connection with the critical point identifier 40 of computing system 10. The propagation information generator 922 generates propagation path loss information (e.g., total propagation path loss for a radio frequency path between two endpoints). The propagation information generator 922 also performs the operations described in connection with the propagation information generator 922 of computing system 10. The spectrum access system component 924 manages spectrum access and usage for a network's spectrum (e.g., shared shared). The spectrum access system component makes spectrum access and/or usage decisions with respect to a region of spectrum (e.g., CBRS shared spectrum). The spectrum access system performs the operations of a CBRS spectrum access system when managing a CBRS system's spectrum. The spectrum access system also determines the maximum transmission level a wireless network entity is authorized to transmit at. The spectrum access system determines predicted spectrum interference levels based on total propagation loss between two endpoints (e.g., transmitter and receiver). The spectrum access system component 924 also performs the operation described of the SAS 22 of computing system 10. The propagation path loss generator component 926 generates propagation path losses for propagation paths. In some embodiments the propagation path loss generator is a sub-component of the propagation component 910 and/or the propagation information generator component 922. The propagation mode selector component 928 performs the operations described in connection with propagation mode selector 48 of computing system 10. The spectrum interference prediction component 930 determines predicted spectrum interference degrees, amounts, and/or levels based on propagation path loss information. The wireless network entity device location determination component 932 determines a wireless network entity device's location and height information (e.g., antenna height) (e.g., based on device identification information, location information received from the device, device registration information, pre-stored location information). The spectrum usage determination component 934 determines spectrum usage for wireless network entities based on user tier or priority, spectrum interference levels, propagation loss information. In some embodiments, spectrum usage determination component is a sub-component of the spectrum access system component 924.

The specific components of the assembly of components 900 included in any particular computing system may, and typically does vary depending on the specific system/device and the functionality required for the system/device and/or the operations the system/device is responsible for performing.

Various exemplary numbered embodiments illustrating different features of the present invention will now be discussed. The various features discussed may be used in variety of different combinations. It should be appreciated that not necessarily all embodiments include the same features and some of the features described below are not necessary but can be desirable in some embodiments. The numbered embodiments are only exemplary and are not meant to be limiting to the scope of the invention. The various method embodiments may be, and in some embodiments are, implemented on system 100 of FIG. 1.

LIST OF EXEMPLARY NUMBERED METHOD EMBODIMENTS

Method Embodiment 1. A method comprising: determining, by a computing system, a radio frequency free space path loss for a first radio frequency propagation path extending from a first endpoint (e.g., transmission point 303 of geographic area 300 of FIG. 3) to a second endpoint (e.g., reception endpoint 305 of geographic area 300 of FIG. 3), said first endpoint having a first endpoint height with respect to a reference point (e.g., reference point at sea level or mean sea level (e.g., reference point 309 of geographic area 300 of FIG. 3)); determining, by the computing system, a radio frequency clutter loss for a first portion of the first radio frequency propagation path (e.g., L1 349 of FIG. 3), said first portion of the first radio frequency propagation path extending from the first endpoint to a first horizon point, the first horizon point being located at the top of a clutter object (e.g., horizon point 340 at top of clutter object 306) along the first radio frequency propagation path, said first horizon point having a first horizon point height with respect to the reference point (e.g., first horizon point 340 has a height H3+H4), said first horizon point height being higher than said first endpoint height; determining, by the computing system, a third radio frequency propagation loss for a second portion of the first radio frequency propagation path (L2 350 of FIG. 3), said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint (e.g., horizon point 340 to second endpoint 305 of geographic area 300 of FIG. 3); generating, by the computing system, a total radio frequency propagation path loss for the first radio frequency propagation path based on the radio frequency free space path loss, the radio frequency clutter loss, and the third radio frequency propagation loss (e.g., formula 361 of FIG. 3); and making, by the computing system, a spectrum usage decision (e.g., decision information 54 of FIG. 1) based on the generated total radio frequency propagation path loss for the first radio frequency propagation path.

Method Embodiment 1A. The method of Method Embodiment 1, wherein said determining a radio frequency clutter loss for a first portion of the first radio frequency propagation path includes utilizing at least one of the models included in the ITU-R P.2108 or the ITU-R P.452.

Method Embodiment 1AA. The method of Method Embodiment 1A, wherein said determining a radio frequency clutter loss for a first portion of the first radio frequency propagation path includes: (i) determining a radio frequency clutter loss for the first portion of the first radio frequency propagation path using a loss model included in the ITU-R P.2108, (ii) determining a radio frequency clutter loss for the first portion of the first radio frequency propagation path using a loss model included in the ITU-R P.452, (iii) comparing the determined radio frequency clutter loss for the first portion of the first radio frequency propagation path determined using a loss model included in the ITU-R P.2108 to the determined radio frequency clutter loss for the first portion of the first radio frequency propagation path determined using a loss model included in the ITU-R P.452 to determine which resulted in a larger loss; and (iv) selecting whichever of the radio frequency clutter loss for the first portion of the first radio frequency propagation path determined using a loss model included in the ITU-R P.2108 or the radio frequency clutter loss for the first portion of the first radio frequency propagation path determined using a loss model included in the ITU-R P.452 that had the larger determined loss as the clutter loss for the first portion of the first radio frequency propagation path loss.

Method Embodiment 1AAA. The method of Method Embodiment 1, wherein said determining a radio frequency clutter loss for a first portion of the first radio frequency propagation path uses and/or is based on at least one of the models included in the ITU-R P.2108 or the ITU-R P.452.

Method Embodiment 1AAAA. The method of Method Embodiment 1, wherein said determining a radio frequency clutter loss for a first portion of the first radio frequency propagation path uses and/or is based on one or more or all of the models included in the ITU-R P.2108 and/or the ITU-R P.452.

Method Embodiment 1B. The method of Method Embodiment 1, wherein the first endpoint and the second endpoint are separated by a distance greater than or equal to 5 kilometers. (The ITU-R P.2108, ITU-R P.452, and ITM Longley-Rice models are intended to be used for long distances (e.g., distances equal to or greater than 5 kilometers) between endpoints).

Method Embodiment 1BB. The method of Method Embodiment 1, wherein the second endpoint has a second endpoint height with respect to the reference point (e.g., second endpoint 305 height is H16+H17 in geographic area 300 of FIG. 3); and wherein the second endpoint height is not below the height of clutter (e.g., clutter does not block or obstruct a propagation path to the horizon from the second endpoint, the second endpoint can see the horizon from its position).

Method Embodiment 1C. The method of Method Embodiment 1 or 1B, wherein the first horizon point and the second endpoint are separated by a distance greater than or equal to 5 kilometers (Propagation formulas/equations/models (e.g., ITM Longley-Rice models) are intended to be used for long distances (e.g., 5 kilometers)).

Method Embodiment 1D. The method of Method Embodiment 1A, wherein the third radio frequency propagation loss is determined using and/or based an Irregular Terrain Model propagation loss model.

Method Embodiment 1E. The method of Method Embodiment 1A, wherein the third radio frequency propagation loss is determined using and/or based on a Longley-Rice Irregular Terrain Model propagation loss model.

Method Embodiment 1F. The method of Method Embodiment 1, wherein the clutter loss is determined based on a frequency of a radio frequency transmission, a width of a street (e.g., 27 meters) closest to the first endpoint along the first radio frequency propagation path, the first endpoint height (point of transmission which is height of antenna in meters with respect to the reference point and the first horizon endpoint height (height with respect to reference point).

Method Embodiment 1G. The method of Method Embodiment 1, wherein the clutter loss is determined based on the difference in the height between the first horizon point height and the first endpoint height.

Method Embodiment 1H. The method of Method Embodiment 1G, wherein the clutter loss is determined based on an elevation angle or clutter angle.

Method Embodiment 1H1. The method of Method Embodiment 1H, further comprising: determining, by the computer system, the elevation angle from the first endpoint to the first horizon point (e.g., draw a vertical line from the first horizon point down toward the terrain, draw a horizontal line from the first endpoint to the vertical line (where the two lines meet will create a 90 degree angle, draw a straight line from the first endpoint to the first horizon point, the angle between the horizontal line and the straight line from the first endpoint to the first horizon point is the elevation angle.

Method Embodiment 1H2. The method of Method Embodiment 1H, wherein the clutter angle is the elevation angle.

Method Embodiment 2. The method of Method Embodiment 1, wherein a first wireless network entity (e.g., a first wireless base station) is located at the first endpoint, said first endpoint height being the height of an antenna of the first wireless network entity; wherein a second wireless network entity (e.g., a second wireless base station) is located at the second endpoint, said second endpoint height being the height of an antenna of the second wireless network entity.

Method Embodiment 2A. The method of Method Embodiment 2, further comprising: receiving, at the computer system, a spectrum access request from the first wireless network entity requesting authorization for usage of spectrum, said spectrum access request including information identifying the first wireless network entity and information identifying the spectrum being requested for usage by the first wireless network entity; determining, by the computing system, from information stored about the first wireless network entity the first endpoint location and the first endpoint height; determining, by the computing system, from the information identifying the spectrum being requested for usage that at least a portion of the spectrum requested for usage is currently being utilized by the second wireless network entity or has been authorized for usage by the second wireless network entity; determining, by the computing system, from information stored about the second wireless network entity, the location of the second endpoint and the second endpoint height.

Method Embodiment 2B. The method of Method Embodiment 2A, further comprising: receiving, by the computer system, registration information for the first wireless network entity, said registration information including identification information for the first wireless network entity, the location of the first wireless network entity and height of the first wireless network entity with respect to the terrain (e.g., antenna height with respect to the terrain identifying point of transmission); storing, by the computer system, the received registration information; receiving, by the computer system, registration information for the second wireless network entity, said registration information including identification information for the second wireless network entity, the location of the first wireless network entity and height of the first wireless network entity with respect to the terrain (e.g., antenna height with respect to the terrain identifying point of transmission); storing, by the computer system, the received registration information.

Method Embodiment 2D. The method of Method Embodiment 2B, further comprising: determining, by the computer system, the total radio frequency propagation path loss for the first radio frequency propagation path between the first endpoint and the second endpoint in response to determining that at least a portion of the spectrum requested for usage by the first wireless network entity is currently being utilized or authorized for usage by the second wireless network entity.

Method Embodiment 2E. The method of Method Embodiment 2D further comprising: determining a predicted amount of spectrum interference that will occur at the second endpoint from radio frequency transmissions emanating from the first endpoint (e.g., determining a predicted amount of spectrum interference that will occur at the second wireless network entity from radio frequency transmissions emanating from the first wireless network entity).

Method Embodiment 2F. The method of Method Embodiment 2E, wherein the radio frequency transmissions emanating from the first endpoint utilize spectrum in the portion of the requested spectrum which is being used or has been authorized for use by the second wireless network entity.

Method Embodiment 2G. The method of Method Embodiment 2E, wherein said making, by a computing system, a spectrum usage decision based on the generated total radio frequency propagation path loss for the first radio frequency propagation path includes: determining that the first wireless network entity is authorized to use the requested spectrum (e.g., for communicating with one or more other wireless network entities such as user equipment devices when the first wireless network entity is a first wireless base station) when the predicted amount of interference is below a first interference threshold level; and determining that the first wireless network entity is not authorized to use the requested spectrum (e.g., for communicating with one or more other wireless network entities such as user equipment devices when the first wireless network entity is a first wireless base station) when the predicted amount of interference is not below the first interference threshold level.

Method Embodiment 2H. The method of Method Embodiment 2G, further comprising: communicating, by the computer system, the spectrum usage decision to the first wireless network entity in response to the system access request.

Method Embodiment 21. The method of Method Embodiment 2, wherein said making a spectrum usage decision based on the generated total radio frequency propagation path loss for the first radio frequency propagation path includes: determining that a first wireless network entity (e.g., incumbent user) is authorized to communicate using spectrum being requested for use by the first network entity or spectrum detected as being used by the first wireless network entity (e.g., from sensor detection of radar signals); determining a predicted amount of spectrum interference that will occur at the first endpoint from radio frequency transmissions emanating from the second endpoint based on the total radio frequency propagation loss; determining the second wireless network entity (non-incumbent user) is no longer authorized to utilize spectrum requested by the first wireless network entity; notifying the second wireless network entity it is no longer authorized to utilize spectrum which has been requested for usage by the first wireless network entity.

Method Embodiment 3. The method of Method Embodiment 1, wherein said making a spectrum usage decision based on the generated total radio frequency propagation path loss for the first radio frequency propagation path includes: determining a predicted amount of spectrum interference that will occur at the second endpoint from radio frequency transmissions emanating from the first endpoint; and determining that a wireless network entity located at the first endpoint is authorized to communicate using spectrum with one or more wireless network entities located at a different position from the first endpoint.

Method Embodiment 3A. The method of Method Embodiment 1, wherein said making a spectrum usage decision based on the generated total radio frequency propagation path loss for the first radio frequency propagation path includes: determining a predicted amount of spectrum interference for a range of spectrum frequencies that will occur at the second endpoint from radio frequency transmissions emanating from the first endpoint based on the total radio frequency propagation path loss; and determining whether or not a wireless network entity located at the first endpoint is authorized to communicate using the range of spectrum frequencies based on the predicted amount of spectrum interference.

Method Embodiment 3B. The method of Method Embodiment 3A, wherein said making a spectrum usage decision based on the generated total radio frequency propagation path loss for the first radio frequency propagation path further includes: determining that the wireless network entity located at the first endpoint is authorized to communicate using the range of spectrum frequencies based on the predicted amount of spectrum interference in response to determining that the predicted amount of spectrum interference is below a spectrum interference threshold level.

Method Embodiment 3C. The method of Method Embodiment 3A of claim 3, wherein said making a spectrum usage decision based on the generated total radio frequency propagation path loss for the first radio frequency propagation path further includes: determining that the wireless network entity located at the first endpoint is not authorized to communicate using the range of spectrum frequencies based on the predicted amount of spectrum interference in response to determining that the predicted amount of spectrum interference is not below a spectrum interference threshold level.

Method Embodiment 4. The method of Method Embodiment 2, wherein said making a spectrum usage decision based on the generated total radio frequency propagation path loss for the first radio frequency propagation path includes: determining that the first wireless network entity is authorized to utilize spectrum to communicate with a third wireless network entity (e.g., a user equipment device such as a smartphone) in response to determining that a predicted amount of spectrum interference that will occur at the second endpoint from radio frequency transmissions emanating from the first endpoint is below a first threshold level of interference.

Method Embodiment 4A. The method of Method Embodiment 4, wherein the third wireless network entity is not located at the second end point or along the first radio frequency propagation path.

Method Embodiment 5. The method of Method Embodiment 2, wherein said determining a third radio frequency propagation loss for a second portion of the first radio frequency propagation path includes utilizing terrain information (e.g., terrain height information) and clutter information (e.g., clutter height information) for one or more additional points along the second portion of the first radio frequency propagation path.

Method Embodiment 6. The method of Method Embodiment 5, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300); wherein the terrain information includes terrain height information with respect to the reference point (e.g., sea level) for points (e.g., the additional points) on the first radio frequency propagation path; and wherein the clutter information includes clutter height information with respect to the terrain on which the clutter is located for points on the first radio frequency propagation path (e.g., for the one or more of additional points along the second portion of the first radio frequency propagation path having clutter).

Method Embodiment 7. The method of Method Embodiment 6, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300); and wherein the terrain information includes terrain height information with respect to the reference point (e.g., sea level) for points on the first radio frequency propagation path; wherein the clutter information includes clutter height information with respect to the terrain on which the clutter is located for points on the first radio frequency propagation path; and wherein the height of a point on the propagation path is determined by adding the clutter height corresponding to the point to the terrain height at the point.

Method Embodiment 7A. The method of Method Embodiment 6, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300 of FIG. 3); and wherein the terrain information includes terrain height information with respect to the reference point (e.g., sea level) for points on the first radio frequency propagation path; wherein the clutter information includes clutter height information with respect to the terrain on which the clutter is located for points on the first radio frequency propagation path.

Method Embodiment 7B. The method of Method Embodiment 7A, further comprising: determining, by the computing system, obstruction heights for points along the second portion of the first radio frequency propagation path by adding the clutter height corresponding to a point to the terrain height corresponding to the same point (a point's height is the height of the clutter at the point with respect to the terrain the clutter is atop plus the height of the terrain on which the clutter is atop with respect to the reference point (e.g., sea level) (e.g., obstruction height of clutter 307 in geographic area 300 is height H5+height H6).

Method Embodiment 7C. The method of Method Embodiment 7B, further comprising: using, by the computing system, one or more of the determined obstruction heights for points along the second portion of the first radio frequency propagation path to determine the third radio frequency propagation path loss.

Method Embodiment 8. The method of Method Embodiment 7, further comprising: determining, by the computing system, from the plurality of additional points along the second portion of the first radio frequency propagation path a set of critical points from the plurality of additional points; and utilizing, by the computing system, point height information for one or more or all of the critical points from the set of critical points to determine the third radio frequency propagation path loss.

Method Embodiment 9. The method of Method Embodiment 1, further comprising: receiving, by the computing system, a spectrum access request message from a first wireless network entity (e.g., first wireless base station) located at the first endpoint (e.g., antenna of first wireless base station has transmission point at the first endpoint), said spectrum access request message requesting authorization for use of spectrum and providing information identifying the spectrum requested for usage (e.g., spectrum frequency, range of frequencies, channel, band, etc.); generating, by the computing system, the total radio frequency propagation path loss for the first radio frequency propagation path based on the radio frequency free space path loss, the radio frequency clutter loss, and the third radio frequency propagation loss in response to the received spectrum access request message using the information identifying the spectrum requested for usage (e.g., frequency or frequencies of requested spectrum for usage).

Method Embodiment 10. The method of Method Embodiment 1, further comprising: determining, by the computer system, the first endpoint height with respect to the reference point; determining, by the computer system, the second endpoint height with respect to the reference point; determining, by the computer system, the first horizon point from terrain information and clutter information about the first radio frequency propagation path from the first endpoint to the second endpoint; determining, by the computer system, the first horizon point height with respect to the reference point.

Method Embodiment 11. The method of Method Embodiment 1, further comprising: prior to determining, by the computing system, the radio frequency clutter loss for the first portion of the first radio frequency propagation path: determining, by the computing system, that the first horizon point is higher than the first endpoint height; wherein said determining, by the computer system, the first endpoint height with respect to the reference point includes determining the height of terrain on which the first endpoint is located with the respect to the height of the reference point and determining the height of first endpoint with respect to the terrain on which it is located; determining, by the computer system, the second endpoint height with respect to the reference point.

Method Embodiment 12. The method of Method Embodiment 1, wherein the computing system is a spectrum access system.

Method Embodiment 13. The method of Method Embodiment 1, wherein the computing system includes a propagation information generator; and wherein said Free Space Loss, said clutter loss, said third loss and said total radio frequency propagation path loss for the first radio frequency propagation path is determined by the propagation information generator.

Method Embodiment 14. The method of Method Embodiment 1, wherein said computing system includes a spectrum access system, said spectrum access system making said spectrum usage decision based on the generated total radio frequency propagation path loss for the first radio frequency propagation path.

Method Embodiment 15. A method comprising: determining, by a computing system, a radio frequency free space path loss for a first radio frequency propagation path extending from a first endpoint (e.g., transmission point 303 of geographic area 399 of FIG. 5) to a second endpoint (e.g., reception endpoint 305 of geographic area 399 of FIG. 5), said first endpoint having a first endpoint height with respect to a reference point (e.g., height of point 303 is H1+H2 with respect to reference point 309 of geographic area 399 of FIG. 5), said second endpoint having a second endpoint height with respect to the reference point (e.g., point 305 has height H16+H17 of geographic area 399 of FIG. 5); determining, by the computing system, a first radio frequency clutter loss for a first portion of the first radio frequency propagation path (e.g., L1 349 of geographic area 399 of FIG. 5), said first portion of the first radio frequency propagation path extending from the first endpoint to a first horizon point, the first horizon point being located at the top of a clutter object (e.g., horizon point 340 at top of building 306 of geographic area 399 of FIG. 5) along the first radio frequency propagation path, said first horizon point having a first horizon point height with respect to the reference point (e.g., horizon point 340 has height H3+H4 with respect sea level reference point 309), said first horizon point height being higher than said first endpoint height; determining, by the computing system, a second radio frequency clutter loss (e.g., L3 351 of geographic area 399 of FIG. 5) for a second portion of the first radio frequency propagation path, said second portion of the first radio frequency propagation path extending from the second endpoint to a second horizon point, the second horizon point being located at the top of a clutter object (e.g., horizon point 341 at top of clutter building 315 of geographic area 399 of FIG. 5) along the first radio frequency propagation path, said second horizon point having a second horizon point height with respect to the reference point (e.g., second horizon point 341 having a height H14+H18 with respect to reference point 309 of geographic area 399 of FIG. 5), said second horizon point height being higher than said second endpoint height; determining, by the computing system, a third radio frequency propagation loss (e.g., L2 350" of geographic area 399 of FIG. 5) for a third portion of the first radio frequency propagation path, said third radio frequency propagation loss including: (i) a loss from radio frequency propagation diffraction, or (ii) a loss from radio frequency propagation tropo-scattering, said third portion of the first radio frequency propagation path extending from the first horizon point to the second horizon point; generating, by the computing system, a total radio frequency propagation path loss for the first radio frequency propagation path based on the radio frequency free space path loss, the first radio frequency clutter loss, the second radio frequency clutter loss, and the third radio frequency propagation loss; and making, by the computing system, a spectrum usage decision based on the generated total radio frequency propagation path loss for the first radio frequency propagation path.

LIST OF EXEMPLARY NUMBERED SYSTEM EMBODIMENTS

System Embodiment 1. A system comprising: memory; and one or more processors, said one or more processors controlling the system to perform the following operations: determining a radio frequency free space path loss for a first radio frequency propagation path extending from a first endpoint (e.g., transmission point 303 of geographic area 300 of FIG. 3) to a second endpoint (e.g., reception endpoint 305 of geographic area 300 of FIG. 3), said first endpoint having a first endpoint height with respect to a reference point (e.g., reference point at sea level or mean sea level (e.g., reference point 309 of geographic area 300 of FIG. 3)); determining a radio frequency clutter loss for a first portion of the first radio frequency propagation path (e.g., L1 349 of FIG. 3), said first portion of the first radio frequency propagation path extending from the first endpoint to a first horizon point, the first horizon point being located at the top of a clutter object (e.g., horizon point 340 at top of clutter object 306) along the first radio frequency propagation path, said first horizon point having a first horizon point height with respect to the reference point (e.g., first horizon point 340 has a height H3+H4), said first horizon point height being higher than said first endpoint height; determining a third radio frequency propagation loss for a second portion of the first radio frequency propagation path (L2 350 of FIG. 3), said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint (e.g., horizon point 340 to second endpoint 305 of geographic area 300 of FIG. 3); generating a total radio frequency propagation path loss for the first radio frequency propagation path based on the radio frequency free space path loss, the radio frequency clutter loss, and the third radio frequency propagation loss (e.g., formula 361 of FIG. 3); and making a spectrum usage decision (e.g., decision information 54 of FIG. 1) based on the generated total radio frequency propagation path loss for the first radio frequency propagation path.

System Embodiment 1A. The system of System Embodiment 1, wherein said determining a radio frequency clutter loss for a first portion of the first radio frequency propagation path includes utilizing at least one of the models included in the ITU-R P.2108 or the ITU-R P.452.

System Embodiment 1AA. The system of System Embodiment 1A, wherein said determining a radio frequency clutter loss for a first portion of the first radio frequency propagation path includes: (i) determining a radio frequency clutter loss for the first portion of the first radio frequency propagation path using a loss model included in the ITU-R P.2108, (ii) determining a radio frequency clutter loss for the first portion of the first radio frequency propagation path using a loss model included in the ITU-R P.452, (iii) comparing the determined radio frequency clutter loss for the first portion of the first radio frequency propagation path determined using a loss model included in the ITU-R P.2108 to the determined radio frequency clutter loss for the first portion of the first radio frequency propagation path determined using a loss model included in the ITU-R P.452 to determine which resulted in a larger loss; and (iv) selecting whichever of the radio frequency clutter loss for the first portion of the first radio frequency propagation path determined using a loss model included in the ITU-R P.2108 or the radio frequency clutter loss for the first portion of the first radio frequency propagation path determined using a loss model included in the ITU-R P.452 that had the larger determined loss as the clutter loss for the first portion of the first radio frequency propagation path loss.

System Embodiment 1AAA. The system of System Embodiment 1, wherein said determining a radio frequency clutter loss for a first portion of the first radio frequency propagation path uses and/or is based on at least one of the models included in the ITU-R P.2108 or the ITU-R P.452.

System Embodiment 1AAAA. The system of System Embodiment 1, wherein said determining a radio frequency clutter loss for a first portion of the first radio frequency propagation path uses and/or is based on one or more or all of the models included in the ITU-R P.2108 and/or the ITU-R P.452.

System Embodiment 1B. The system of System Embodiment 1, wherein the first endpoint and the second endpoint are separated by a distance greater than or equal to 5 kilometers. (The ITU-R P.2108, ITU-R P.452, and ITM Longley-Rice models are intended to be used for long distances (e.g., distances equal to or greater than 5 kilometers) between endpoints).

System Embodiment 1BB. The system of System Embodiment 1, wherein the second endpoint has a second endpoint height with respect to the reference point (e.g., second endpoint 305 height is H16+H17 in geographic area 300 of FIG. 3); and wherein the second endpoint height is not below the height of clutter (e.g., clutter does not block or obstruct a propagation path to the horizon from the second endpoint, the second endpoint can see the horizon from its position).

System Embodiment 1C. The system of System Embodiment 1 or 1B, wherein the first horizon point and the second endpoint are separated by a distance greater than or equal to 5 kilometers (Propagation formulas/equations/models (e.g., ITM Longley-Rice models) are intended to be used for long distances (e.g., 5 kilometers)).

System Embodiment 1D. The system of System Embodiment 1A, wherein the third radio frequency propagation loss is determined using and/or based an Irregular Terrain Model propagation loss model.

System Embodiment 1E. The system of System Embodiment 1A, wherein the third radio frequency propagation loss is determined using and/or based on a Longley-Rice Irregular Terrain Model propagation loss model.

System Embodiment 1F. The system of System Embodiment 1, wherein the clutter loss is determined based on a frequency of a radio frequency transmission, a width of a street (e.g., 27 meters) closest to the first endpoint along the first radio frequency propagation path, the first endpoint height (point of transmission which is height of antenna in meters with respect to the reference point and the first horizon endpoint height (height with respect to reference point).

System Embodiment 1G. The system of System Embodiment 1, wherein the clutter loss is determined based on the difference in the height between the first horizon point height and the first endpoint height.

System Embodiment 1H. The system of System Embodiment 1G, wherein the clutter loss is determined based on an elevation angle or clutter angle.

System Embodiment 1H1. The system of System Embodiment 1H, wherein said one or more processors further control the system to perform the following additional operation: determining the elevation angle from the first endpoint to the first horizon point (e.g., draw a vertical line from the first horizon point down toward the terrain, draw a horizontal line from the first endpoint to the vertical line (where the two lines meet will create a 90 degree angle, draw a straight line from the first endpoint to the first horizon point, the angle between the horizontal line and the straight line from the first endpoint to the first horizon point is the elevation angle.

System Embodiment 1H2. The system of System Embodiment 1H, wherein the clutter angle is the elevation angle.

System Embodiment 2. The system of System Embodiment 1, wherein a first wireless network entity (e.g., a first wireless base station) is located at the first endpoint, said first endpoint height being the height of an antenna of the first wireless network entity; wherein a second wireless network entity (e.g., a second wireless base station) is located at the second endpoint, said second endpoint height being the height of an antenna of the second wireless network entity.

System Embodiment 2A. The system of System Embodiment 2, wherein said one or more processors further control the system to perform the following additional operations: receiving a spectrum access request from the first wireless network entity requesting authorization for usage of spectrum, said spectrum access request including information identifying the first wireless network entity and information identifying the spectrum being requested for usage by the first wireless network entity; determining from information stored about the first wireless network entity the first endpoint location and the first endpoint height; determining from the information identifying the spectrum being requested for usage that at least a portion of the spectrum requested for usage is currently being utilized by the second wireless network entity or has been authorized for usage by the second wireless network entity; and determining from information stored about the second wireless network entity, the location of the second endpoint and the second endpoint height.

System Embodiment 2B. The system of claim 2A, wherein said one or more processors further control the system to perform the following additional operations: receiving registration information for the first wireless network entity, said registration information including identification information for the first wireless network entity, the location of the first wireless network entity and height of the first wireless network entity with respect to the terrain (e.g., antenna height with respect to the terrain identifying point of transmission); storing the received registration information; receiving registration information for the second wireless network entity, said registration information including identification information for the second wireless network entity, the location of the first wireless network entity and height of the first wireless network entity with respect to the terrain (e.g., antenna height with respect to the terrain identifying point of transmission); storing the received registration information.

System Embodiment 2D. The system of System Embodiment 2B, wherein said one or more processors further control the system to perform the following additional operation: determining, by the computer system, the total radio frequency propagation path loss for the first radio frequency propagation path between the first endpoint and the second endpoint in response to determining that at least a portion of the spectrum requested for usage by the first wireless network entity is currently being utilized or authorized for usage by the second wireless network entity.

System Embodiment 2E. The system of System Embodiment 2D, wherein said one or more processors further control the system to perform the following additional operation: determining a predicted amount of spectrum interference that will occur at the second endpoint from radio frequency transmissions emanating from the first endpoint (e.g., determining a predicted amount of spectrum interference that will occur at the second wireless network entity from radio frequency transmissions emanating from the first wireless network entity).

System Embodiment 2F. The method of System Embodiment 2E, wherein the radio frequency transmissions emanating from the first endpoint utilize spectrum in the portion of the requested spectrum which is being used or has been authorized for use by the second wireless network entity.

System Embodiment 2G. The system of System Embodiment 2E, wherein said making a spectrum usage decision based on the generated total radio frequency propagation path loss for the first radio frequency propagation path includes: determining that the first wireless network entity is authorized to use the requested spectrum (e.g., for communicating with one or more other wireless network entities such as user equipment devices when the first wireless network entity is a first wireless base station) when the predicted amount of interference is below a first interference threshold level; and determining that the first wireless network entity is not authorized to use the requested spectrum (e.g., for communicating with one or more other wireless network entities such as user equipment devices when the first wireless network entity is a first wireless base station) when the predicted amount of interference is not below the first interference threshold level.

System Embodiment 2H. The system of System Embodiment 2G, further comprising: communicating, by the computer system, the spectrum usage decision to the first wireless network entity in response to the system access request.

System Embodiment 21. The system of System Embodiment 2, wherein said making a spectrum usage decision based on the generated total radio frequency propagation path loss for the first radio frequency propagation path includes: determining that a first wireless network entity (e.g., incumbent user) is authorized to communicate using spectrum being requested for use by the first network entity or spectrum detected as being used by the first wireless network entity (e.g., from sensor detection of radar signals); determining a predicted amount of spectrum interference that will occur at the first endpoint from radio frequency transmissions emanating from the second endpoint based on the total radio frequency propagation loss; determining the second wireless network entity (non-incumbent user) is no longer authorized to utilize spectrum requested by the first wireless network entity; notifying the second wireless network entity it is no longer authorized to utilize spectrum which has been requested for usage by the first wireless network entity.

System Embodiment 3. The system of System Embodiment 1, wherein said making a spectrum usage decision based on the generated total radio frequency propagation path loss for the first radio frequency propagation path includes: determining a predicted amount of spectrum interference for a range of spectrum frequencies that will occur at the second endpoint from radio frequency transmissions emanating from the first endpoint based on the total radio frequency propagation path loss; and determining whether or not a wireless network entity located at the first endpoint is authorized to communicate using the range of spectrum frequencies based on the predicted amount of spectrum interference.

System Embodiment 3A. The system of System Embodiment 3, wherein said making a spectrum usage decision based on the generated total radio frequency propagation path loss for the first radio frequency propagation path further includes: determining that the wireless network entity located at the first endpoint is authorized to communicate using the range of spectrum frequencies based on the predicted amount of spectrum interference in response to determining that the predicted amount of spectrum interference is below a spectrum interference threshold level.

System Embodiment 3B. The system of System Embodiment 3, wherein said making a spectrum usage decision based on the generated total radio frequency propagation path loss for the first radio frequency propagation path further includes: determining that the wireless network entity located at the first endpoint is not authorized to communicate using the range of spectrum frequencies based on the predicted amount of spectrum interference in response to determining that the predicted amount of spectrum interference is not below a spectrum interference threshold level.

System Embodiment 4. The system of System Embodiment 2, wherein said making a spectrum usage decision based on the generated total radio frequency propagation path loss for the first radio frequency propagation path includes: determining that the first wireless network entity is authorized to utilize spectrum to communicate with a third wireless network entity (e.g., a user equipment device such as a smartphone) in response to determining that a predicted amount of spectrum interference that will occur at the second endpoint from radio frequency transmissions emanating from the first endpoint is below a first threshold level of interference.

System Embodiment 4A. The system of System Embodiment 4, wherein the third wireless network entity is not located at the second end point or along the first radio frequency propagation path.

System Embodiment 5. The system of System Embodiment 2, wherein said determining a third radio frequency propagation loss for a second portion of the first radio frequency propagation path includes utilizing terrain information (e.g., terrain height information) and clutter information (e.g., clutter height information) for one or more additional points along the second portion of the first radio frequency propagation path.

System Embodiment 6. The system of System Embodiment 5, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300); and wherein the terrain information includes terrain height information with respect to the reference point (e.g., sea level) for points (e.g., the additional points) on the first radio frequency propagation path; wherein the clutter information includes clutter height information with respect to the terrain on which the clutter is located for points on the first radio frequency propagation path (e.g., for the one or more of additional points along the second portion of the first radio frequency propagation path having clutter).

System Embodiment 7. The system of System Embodiment 6, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300); and wherein the terrain information includes terrain height information with respect to the reference point (e.g., sea level) for points on the first radio frequency propagation path; wherein the clutter information includes clutter height information with respect to the terrain on which the clutter is located for points on the first radio frequency propagation path; and wherein the height of a point on the propagation path is determined by adding the clutter height corresponding to the point to the terrain height at the point.

System Embodiment 7A. The system of System Embodiment 6, wherein the one or more additional points along the second portion of the first radio frequency propagation path includes a plurality of additional points (e.g., spaced approximately the same distance apart (e.g., every 30 meters) along the first radio frequency propagation path) (e.g., points 371, 372, 373, 374, 375, 376, 377, 378, 379 of geographic area 300 of FIG. 3); and wherein the terrain information includes terrain height information with respect to the reference point (e.g., sea level) for points on the first radio frequency propagation path; wherein the clutter information includes clutter height information with respect to the terrain on which the clutter is located for points on the first radio frequency propagation path.

System Embodiment 7B. The system of System Embodiment 7A, wherein said one or more processors further control the system to perform the following additional operation: determining, by the computing system, obstruction heights for points along the second portion of the first radio frequency propagation path by adding the clutter height corresponding to a point to the terrain height corresponding to the same point (a point's height is the height of the clutter at the point with respect to the terrain the clutter is atop plus the height of the terrain on which the clutter is atop with respect to the reference point (e.g., sea level) (e.g., obstruction height of clutter 307 in geographic area 300 is height H5+height H6).

System Embodiment 7C. The system of System Embodiment 7B, wherein said one or more processors further control the system to perform the following additional operation: using one or more of the determined obstruction heights for points along the second portion of the first radio frequency propagation path to determine the third radio frequency propagation path loss.

System Embodiment 8. The system of System Embodiment 7, wherein said one or more processors further control the system to perform the following additional operations: determining, by the computing system, from the plurality of additional points along the second portion of the first radio frequency propagation path a set of critical points from the plurality of additional points; and utilizing, by the computing system, point height information for one or more or all of the critical points from the set of critical points to determine the third radio frequency propagation path loss.

System Embodiment 9. The system of System Embodiment 1, wherein said one or more processors further control the system to perform the following additional operations: receiving, by the computing system, a spectrum access request message from a first wireless network entity (e.g., first wireless base station) located at the first endpoint (e.g., antenna of first wireless base station has transmission point at the first endpoint), said spectrum access request message requesting authorization for use of spectrum and providing information identifying the spectrum requested for usage (e.g., spectrum frequency, range of frequencies, channel, band, etc.); generating, by the computing system, the total radio frequency propagation path loss for the first radio frequency propagation path based on the radio frequency free space path loss, the radio frequency clutter loss, and the third radio frequency propagation loss in response to the received spectrum access request message using the information identifying the spectrum requested for usage (e.g., frequency or frequencies of requested spectrum for usage).

System Embodiment 10. The system of System Embodiment 1, wherein said one or more processors further control the system to perform the following additional operations: determining, by the computer system, the first endpoint height with respect to the reference point; determining, by the computer system, the second endpoint height with respect to the reference point; determining, by the computer system, the first horizon point from terrain information and clutter information about the first radio frequency propagation path from the first endpoint to the second endpoint; determining, by the computer system, the first horizon point height with respect to the reference point.

System Embodiment 11. The system of System Embodiment 1, wherein said one or more processors further control the system to perform the following additional operations: prior to determining, by the computing system, the radio frequency clutter loss for the first portion of the first radio frequency propagation path: determining, by the computing system, that the first horizon point is higher than the first endpoint height; wherein said determining the first endpoint height with respect to the reference point includes determining the height of terrain at the first endpoint with respect to the reference point and the height of the first endpoint with respect to the terrain on it is located; determining, by the computer system, the second endpoint height with respect to the reference point.

System Embodiment 12. The system of System Embodiment 1, wherein the system is a spectrum access system.

System Embodiment 13. The system of System Embodiment 1, wherein the system includes a propagation information generator; and wherein said Free Space Loss, said clutter loss, said third loss and said total radio frequency propagation path loss for the first radio frequency propagation path is determined by the propagation information generator.

System Embodiment 14. The system of System Embodiment 1, wherein said system includes a spectrum access system, said spectrum access system making said spectrum usage decision based on the generated total radio frequency propagation path loss for the first radio frequency propagation path.

System Embodiment 14A. The system of System Embodiment 2, wherein the first wireless network entity is a first wireless base station serving a first coverage area; wherein the second wireless network entity is a second wireless base station serving a different coverage area, said first coverage area and said second coverage area not overlapping; and wherein said system includes a spectrum access system which manages the usage of shared wireless spectrum for the first wireless base station and the second wireless base station.

System Embodiment 15. A system comprising: memory; and one or more processors, said one or more processors controlling the system to perform the following operations: determining a radio frequency free space path loss for a first radio frequency propagation path extending from a first endpoint (e.g., transmission point 303 of geographic area 399 of FIG. 5) to a second endpoint (e.g., reception endpoint 305 of geographic area 399 of FIG. 5), said first endpoint having a first endpoint height with respect to a reference point (e.g., height of point 303 is H1+H2 with respect to reference point 309 of geographic area 399 of FIG. 5), said second endpoint having a second endpoint height with respect to the reference point (e.g., point 305 has height H16+H17 of geographic area 399 of FIG. 5); determining a first radio frequency clutter loss for a first portion of the first radio frequency propagation path (e.g., L1 349 of geographic area 399 of FIG. 5), said first portion of the first radio frequency propagation path extending from the first endpoint to a first horizon point, the first horizon point being located at the top of a clutter object (e.g., horizon point 340 at top of building 306 of geographic area 399 of FIG. 5) along the first radio frequency propagation path, said first horizon point having a first horizon point height with respect to the reference point (e.g., horizon point 340 has height H3+H4 with respect sea level reference point 309), said first horizon point height being higher than said first endpoint height; determining a second radio frequency clutter loss (e.g., L3 351 of geographic area 399 of FIG. 5) for a second portion of the first radio frequency propagation path, said second portion of the first radio frequency propagation path extending from the second endpoint to a second horizon point, the second horizon point being located at the top of a clutter object (e.g., horizon point 341 at top of clutter building 315 of geographic area 399 of FIG. 5) along the first radio frequency propagation path, said second horizon point having a second horizon point height with respect to the reference point (e.g., second horizon point 341 having a height H14+H18 with respect to reference point 309 of geographic area 399 of FIG. 5), said second horizon point height being higher than said second endpoint height; determining a third radio frequency propagation loss (e.g., L2 350" of geographic area 399 of FIG. 5) for a third portion of the first radio frequency propagation path, said third radio frequency propagation loss including: (i) a loss from radio frequency propagation diffraction, or (ii) a loss from radio frequency propagation tropo-scattering, said third portion of the first radio frequency propagation path extending from the first horizon point to the second horizon point; generating a total radio frequency propagation path loss for the first radio frequency propagation path based on the radio frequency free space path loss, the first radio frequency clutter loss, the second radio frequency clutter loss, and the third radio frequency propagation loss; and making a spectrum usage decision based on the generated total radio frequency propagation path loss for the first radio frequency propagation path.

List of Exemplary Numbered Non-Transitory Computer Readable Medium Embodiments Non-transitory Computer Readable Medium Embodiment 1. A non-transitory computer readable medium including a first set of computer executable instructions which when executed by a processor of a system cause the system to perform the steps of: determining a radio frequency free space path loss for a first radio frequency propagation path extending from a first endpoint (e.g., transmission point 303 of geographic area 300 of FIG. 3) to a second endpoint (e.g., reception endpoint 305 of geographic area 300 of FIG. 3), said first endpoint having a first endpoint height with respect to a reference point (e.g., reference point at sea level or mean sea level (e.g., reference point 309 of geographic area 300 of FIG. 3)); determining a radio frequency clutter loss for a first portion of the first radio frequency propagation path (e.g., L1 349 of FIG. 3), said first portion of the first radio frequency propagation path extending from the first endpoint to a first horizon point, the first horizon point being located at the top of a clutter object (e.g., horizon point 340 at top of clutter object 306) along the first radio frequency propagation path, said first horizon point having a first horizon point height with respect to the reference point (e.g., first horizon point 340 has a height H3+H4), said first horizon point height being higher than said first endpoint height; determining a third radio frequency propagation loss for a second portion of the first radio frequency propagation path (L2 350 of FIG. 3), said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint (e.g., horizon point 340 to second endpoint 305 of geographic area 300 of FIG. 3); generating a total radio frequency propagation path loss for the first radio frequency propagation path based on the radio frequency free space path loss, the radio frequency clutter loss, and the third radio frequency propagation loss (e.g., formula 361 of FIG. 3);

and making a spectrum usage decision (e.g., decision information 54 of FIG. 1) based on the generated total radio frequency propagation path loss for the first radio frequency propagation path.

The techniques of various embodiments may be implemented using software, hardware and/or a combination of software and hardware. Various embodiments are directed to apparatus, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements. Various embodiments are also directed to methods, e.g., method of controlling and/or operating systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements described herein are implemented using one or more components to perform the steps corresponding to one or more methods, for example, generating or creating messages, message reception, message transmission, signal processing, sending, comparing, determining and/or transmission steps, generating/determining/calculating propagation loss, predicting spectrum interference, making spectrum usage decisions, utilizing terrain information and clutter information to determine propagation losses, etc., Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a computing system, SAS, controller or apparatus, including a processor configured to implement one, multiple or all of the steps of one or more methods of the invention.

In some embodiments, the processor or processors, e.g., CPUs, of one or more devices, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements are configured to perform the steps of the methods described as being performed by the systems, wireless systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements, with a processor which includes a component corresponding to each of the steps of the various described methods performed by the device in which the processor is included. In some but not all embodiments a device, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., systems, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a system, network entity devices, wireless network entities, wireless network entity devices, wireless base stations, wireless devices, mobile terminals, network equipment, eNBs, gNBs, CBSDs, smart devices, user equipment devices, user devices, computers, smartphones, subscriber devices, computing systems, Spectrum Access Systems, wireless access points, computing devices, servers, nodes, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention. As used herein of ordinals in conjunction with an element is solely for distinguishing what might otherwise be similar or identical labels, such as "first loss" and "second loss," and does not imply an initial occurrence, a quantity, a priority, a type, an importance, or other attribute, unless otherwise stated herein.

What is claimed is:

1. A method comprising:

determining, by a computing system, a radio frequency free space path loss for a first radio frequency propagation path extending from a first endpoint to a second endpoint, said first endpoint having a first endpoint height with respect to a reference point;

determining, by the computing system, a radio frequency clutter loss for a first portion of the first radio frequency propagation path, said first portion of the first radio frequency propagation path extending from the first endpoint to a first horizon point, the first horizon point being located at the top of a clutter object along the first radio frequency propagation path, said first horizon point having a first horizon point height with respect to the reference point, said first horizon point height being higher than said first endpoint height;

determining, by the computing system, a third radio frequency propagation loss for a second portion of the first radio frequency propagation path, said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint;

generating, by the computing system, a total radio frequency propagation path loss for the first radio frequency propagation path based on the radio frequency free space path loss, the radio frequency clutter loss, and the third radio frequency propagation loss; and making, by the computing system, a spectrum usage decision based on the generated total radio frequency propagation path loss for the first radio frequency propagation path.

2. The method of claim 1, wherein the radio frequency clutter loss for the first portion of the first radio frequency propagation path is determined based on an International Telecommunication Union-Recommendation (ITU-R) P.2108 model or an ITU-R P.452 model.

3. The method of claim 2, wherein the third radio frequency propagation loss is determined based on an Irregular Terrain Model propagation loss model.

4. The method of claim 1, wherein a first wireless network entity is located at the first endpoint, said first endpoint height being the height of an antenna of the first wireless network entity; and wherein a second wireless network entity is located at the second endpoint, said second endpoint's height being the height of an antenna of the second wireless network entity.

5. The method of claim 4, wherein said making a spectrum usage decision based on the generated total radio frequency propagation path loss for the first radio frequency propagation path includes: determining that the first wireless network entity is authorized to utilize spectrum to communicate with a third wireless network entity in response to determining that a predicted amount of spectrum interference that will occur at the second endpoint from radio frequency transmissions emanating from the first endpoint is below a first threshold level of interference.

6. The method of claim 4, wherein said making a spectrum usage decision based on the generated total radio frequency propagation path loss for the first radio frequency propagation path includes: determining that the first wireless network entity is authorized to utilize spectrum to communicate with a third wireless network entity in response to determining that a predicted amount of spectrum interference that will occur at the first endpoint from radio frequency transmissions emanating from the second endpoint is below a first threshold level of interference.

7. The method of claim 4, wherein said determining a third radio frequency propagation loss for a second portion of the first radio frequency propagation path includes utilizing terrain information and clutter information for one or more additional points along the second portion of the first radio frequency propagation path.

8. The method of claim 7, wherein the one or more additional points along the second portion of the first radio frequency propagation path includes a plurality of additional points;

wherein the terrain information includes terrain height information with respect to the reference point for points on the first radio frequency propagation path; and wherein the clutter information includes clutter height information with respect to the terrain on which the clutter is located for points on the first radio frequency propagation path.

9. The method of claim 8, wherein the height of a point on the propagation path is determined by adding the clutter height corresponding to the point to the terrain height at the point.

10. The method of claim 9, further comprising:

determining, by the computing system, from the plurality of additional points along the second portion of the first radio frequency propagation path a set of critical points from the plurality of additional points; and utilizing, by the computing system, point height information for one or more or all of the critical points from the set of critical points to determine the third radio frequency propagation path loss.

11. The method of claim 1, wherein said making a spectrum usage decision based on the generated total radio frequency propagation path loss for the first radio frequency propagation path includes:

determining a predicted amount of spectrum interference for a range of spectrum frequencies that will occur at the second endpoint from radio frequency transmissions emanating from the first endpoint based on the total radio frequency propagation path loss; and determining whether or not a wireless network entity located at the first endpoint is authorized to communicate using the range of spectrum frequencies based on the predicted amount of spectrum interference.

12. The method of claim 1, wherein said making a spectrum usage decision based on the generated total radio frequency propagation path loss for the first radio frequency propagation path includes:

determining a predicted amount of spectrum interference for a range of spectrum frequencies that will occur at the first endpoint from radio frequency transmissions emanating from the second endpoint based on the total radio frequency propagation path loss; and determining whether or not a wireless network entity located at the second endpoint is authorized to communicate using the range of spectrum frequencies based on the predicted amount of spectrum interference.

13. A system comprising:

memory; and one or more processors, said one or more processors controlling the system to perform the following operations:

determining a radio frequency free space path loss for a first radio frequency propagation path extending from a first endpoint to a second endpoint, said first endpoint having a first endpoint height with respect to a reference point;

determining a radio frequency clutter loss for a first portion of the first radio frequency propagation path, said first portion of the first radio frequency propagation path extending from the first endpoint to a first horizon point, the first horizon point being located at the top of a clutter object along the first radio frequency propagation path, said first horizon point having a first horizon point height with respect to the reference point, said first horizon point height being higher than said first endpoint height;

determining a third radio frequency propagation loss for a second portion of the first radio frequency propagation path, said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint;

generating a total radio frequency propagation path loss for the first radio frequency propagation path based on the radio frequency free space path loss, the radio frequency clutter loss, and the third radio frequency propagation loss; and making a spectrum usage decision based on the generated total radio frequency propagation path loss for the first radio frequency propagation path.

14. The system of claim 13, wherein the third radio frequency propagation loss is determined based on an Irregular Terrain Model propagation loss model.

15. The system of claim 13, wherein a first wireless network entity is located at the first endpoint, said first endpoint height being the height of an antenna of the first wireless network entity; and wherein a second wireless network entity is located at the second endpoint, said second endpoint's height being the height of an antenna of the second wireless network entity.

16. The system of claim 15, wherein said making a spectrum usage decision based on the generated total radio frequency propagation path loss for the first radio frequency propagation path includes: determining that the first wireless network entity is authorized to utilize spectrum to communicate with a third wireless network entity in response to determining that a predicted amount of spectrum interference that will occur at the second endpoint from radio frequency transmissions emanating from the first endpoint is below a first threshold level of interference.

17. The system of claim 15, wherein said making a spectrum usage decision based on the generated total radio frequency propagation path loss for the first radio frequency propagation path includes: determining that the first wireless network entity is authorized to utilize spectrum to communicate with a third wireless network entity in response to determining that a predicted amount of spectrum interference that will occur at the first endpoint from radio frequency transmissions emanating from the second endpoint is below a first threshold level of interference.

18. The system of claim 15, wherein said determining a third radio frequency propagation loss for a second portion of the first radio frequency propagation path includes utilizing terrain information and clutter information for one or more additional points along the second portion of the first radio frequency propagation path.

19. The system of claim 18, wherein the one or more additional points along the second portion of the first radio frequency propagation path includes a plurality of additional points;

wherein the terrain information includes terrain height information with respect to the reference point for points on the first radio frequency propagation path; and wherein the clutter information includes clutter height information with respect to the terrain on which the clutter is located for points on the first radio frequency propagation path.

20. The system of claim 19, wherein the height of a point on the propagation path is determined by adding the clutter height corresponding to the point to the terrain height at the point.

21. The system of claim 20, wherein said one or more processors further control the system to perform the following operations:

determining, by the computing system, from the plurality of additional points along the second portion of the first radio frequency propagation path a set of critical points from the plurality of additional points; and utilizing, by the computing system, point height information for one or more or all of the critical points from the set of critical points to determine the third radio frequency propagation path loss.

22. The system of claim 13, wherein said making a spectrum usage decision based on the generated total radio frequency propagation path loss for the first radio frequency propagation path includes:

determining a predicted amount of spectrum interference for a range of spectrum frequencies that will occur at the second endpoint from radio frequency transmissions emanating from the first endpoint based on the total radio frequency propagation path loss; and determining whether or not a wireless network entity located at the first endpoint is authorized to communicate using the range of spectrum frequencies based on the predicted amount of spectrum interference.

23. The system of claim 13, wherein said making a spectrum usage decision based on the generated total radio frequency propagation path loss for the first radio frequency propagation path includes:

determining a predicted amount of spectrum interference for a range of spectrum frequencies that will occur at the first endpoint from radio frequency transmissions emanating from the second endpoint based on the total radio frequency propagation path loss; and determining whether or not a wireless network entity located at the second endpoint is authorized to communicate using the range of spectrum frequencies based on the predicted amount of spectrum interference.

24. A non-transitory computer readable medium including a first set of computer executable instructions which when executed by a processor of a system cause the system to perform the steps of:

determining a radio frequency free space path loss for a first radio frequency propagation path extending from a first endpoint to a second endpoint, said first endpoint having a first endpoint height with respect to a reference point;

determining a radio frequency clutter loss for a first portion of the first radio frequency propagation path, said first portion of the first radio frequency propagation path extending from the first endpoint to a first horizon point, the first horizon point being located at the top of a clutter object along the first radio frequency propagation path, said first horizon point having a first horizon point height with respect to the reference point, said first horizon point height being higher than said first endpoint height;

determining a third radio frequency propagation loss for a second portion of the first radio frequency propagation path, said third radio frequency propagation loss including: (i) a loss from radio frequency propagation diffraction, or (ii) a loss from radio frequency propagation tropo-scattering, said second portion of the first radio frequency propagation path extending from the first horizon point to the second endpoint;

generating a total radio frequency propagation path loss for the first radio frequency propagation path based on the radio frequency free space path loss, the radio frequency clutter loss, and the third radio frequency propagation loss; and making a spectrum usage decision based on the generated total radio frequency propagation path loss for the first radio frequency propagation path.

* * * * *